United States Patent [19]
Almquist et al.

[11] Patent Number: 5,902,537
[45] Date of Patent: May 11, 1999

[54] RAPID RECOATING OF THREE-DIMENSIONAL OBJECTS FORMED ON A CROSS-SECTIONAL BASIS

[75] Inventors: Thomas A. Almquist, San Gabriel; Charles W. Hull, Santa Clarita; Jeffrey S. Thayer, Simi Valley; Richard N. Leyden, Topanga Canyon; Paul F. Jacobs, La Crescenta; Dennis R. Smalley, Newhall, all of Calif.

[73] Assignee: 3D Systems, Inc., Valencia, Calif.

[21] Appl. No.: 08/790,005

[22] Filed: Jan. 28, 1997

Related U.S. Application Data

[63] Continuation of application No. 08/382,268, Feb. 1, 1995, abandoned.

[51] Int. Cl.⁶ .......................... B29C 35/08; B29C 41/02
[52] U.S. Cl. .................. 264/401; 264/40.1; 264/308; 364/468.27; 425/135; 425/174.4
[58] Field of Search .................. 264/40.1, 308, 264/401; 425/135, 174.4; 364/468.27

[56] References Cited

U.S. PATENT DOCUMENTS

| | | | |
|---|---|---|---|
| 2,621,808 | 12/1952 | Blakeney | 340/619 |
| 2,682,887 | 7/1954 | Getz | 261/70 |
| 3,957,015 | 5/1976 | Harris | 118/100 |
| 4,247,508 | 1/1981 | Housholder | 264/219 |
| 4,320,394 | 3/1982 | John, Jr. | 340/624 |
| 4,354,180 | 10/1982 | Harding | 73/293 |
| 4,508,970 | 4/1985 | Ackerman | 73/293 |
| 4,575,330 | 3/1986 | Hull | 425/174.4 |
| 4,658,149 | 4/1987 | Miranda et al. | 73/293 |
| 4,719,071 | 1/1988 | Capelle | 425/140 |
| 4,755,127 | 7/1988 | Becker | 425/140 |
| 4,796,559 | 1/1989 | Lohse | 118/210 |
| 4,809,201 | 2/1989 | Keklak | 364/518 |
| 4,863,538 | 9/1989 | Deckard . | |
| 4,938,816 | 7/1990 | Beaman et al. . | |
| 4,942,060 | 7/1990 | Grossa | 427/553 |
| 4,942,066 | 7/1990 | Fan et al. | 427/553 |
| 4,943,928 | 7/1990 | Campbell et al. | 364/477 |
| 4,961,154 | 10/1990 | Pomerantz et al. . | |
| 5,059,266 | 10/1991 | Yamane et al. | 156/64 |
| 5,071,337 | 12/1991 | Heller et al. . | |
| 5,096,530 | 3/1992 | Cohen . | |
| 5,198,159 | 3/1993 | Nakamura et al. . | |
| 5,204,823 | 4/1993 | Schlotterbeck . | |
| 5,238,497 | 8/1993 | Segawa . | |
| 5,238,614 | 8/1993 | Uchinono . | |
| 5,253,177 | 10/1993 | Saito . | |
| 5,321,622 | 6/1994 | Snead et al. | 395/119 X |
| 5,348,693 | 9/1994 | Taylor et al. | 264/401 |
| 5,358,673 | 10/1994 | Heller et al. . | |
| 5,432,045 | 7/1995 | Narukawa . | |
| 5,447,822 | 9/1995 | Hull et al. . | |

FOREIGN PATENT DOCUMENTS

| | | | |
|---|---|---|---|
| 2061125 | 8/1992 | Canada . | |
| 58056 | 8/1982 | European Pat. Off. | 73/293 |
| 450 762 | 10/1991 | European Pat. Off. . | |
| 515562 | 12/1992 | European Pat. Off. . | |
| 606 627 | 12/1993 | European Pat. Off. . | |
| 633 129 | 1/1995 | European Pat. Off. . | |
| 41 34 265 | 4/1993 | Germany . | |
| 43 08 189 | 3/1994 | Germany . | |
| 52-124065 | 10/1977 | Japan . | |
| 55-146015 | 11/1980 | Japan | 73/293 |
| 55-164117 | 12/1980 | Japan | 264/40.2 |
| 56-106900 | 8/1981 | Japan . | |
| 56-118859 | 9/1981 | Japan . | |
| 56-144478 | 11/1981 | Japan . | |
| 60-147615 | 8/1985 | Japan | 73/293 |
| 60-247515 | 12/1985 | Japan . | |
| 61-114817 | 6/1986 | Japan . | |
| 61-114818 | 6/1986 | Japan | 425/174.4 |
| 61-114817 | 9/1986 | Japan . | |
| 61-217219 | 9/1986 | Japan . | |
| 62-37109 | 2/1987 | Japan . | |
| 1-115620 | 5/1989 | Japan . | |
| 3-55225 | 3/1991 | Japan . | |
| 5-24120 | 2/1993 | Japan . | |
| 6-55643 | 3/1994 | Japan . | |
| 6-285998 | 4/1994 | Japan . | |
| 6-134873 | 5/1994 | Japan . | |
| 5-155589 | 6/1994 | Japan . | |
| 8-15760 | 2/1996 | Japan . | |
| 58-1004766 | 3/1983 | U.S.S.R. | 73/293 |
| WO 90/03893 | 4/1990 | WIPO . | |
| WO 91/12120 | 8/1991 | WIPO . | |
| 93/25336 | 12/1993 | WIPO . | |
| WO 93/25377 | 12/1993 | WIPO . | |
| 94/22664 | 10/1994 | WIPO . | |
| 95/18009 | 7/1995 | WIPO . | |
| WO 95/18715 | 7/1995 | WIPO . | |
| WO 95/25003 | 9/1995 | WIPO . | |

OTHER PUBLICATIONS

E. Sachs, "Three Dimensional Printing: Rapid Tooling and Prototypes Directly From a CAD Model," Dec. 1989.

T. Wohlers, "Roundup of Rapid Prototyping Systems Ranging From Stereolithography to 3–D Printing," Mar. 1991, pp. 44–49, Manufacturing Engineering.

S. Ashley, "Rapid Prototyping Systems," Apr. 1991, pp. 34–43, Mechanical Engineering.

Translation of German Patent 4308189 C1 (Published Mar. 24, 1994).

*Primary Examiner*—Leo B. Tentoni
*Attorney, Agent, or Firm*—Dennis R. Smalley; Forrest L. Collins

[57] ABSTRACT

Methods and apparatus for use in building three-dimensional objects on substantially a cross-sectional basis including methods and apparatus for forming successive layers using counter-rotating rollers, ink jet recoaters, spinning members which sling material, applicator bars that dispense material via a meniscus and/or independently dispensed streams, and also including methods and apparatus to determine a preferred region over which to form a layer and to check for building errors.

82 Claims, 23 Drawing Sheets

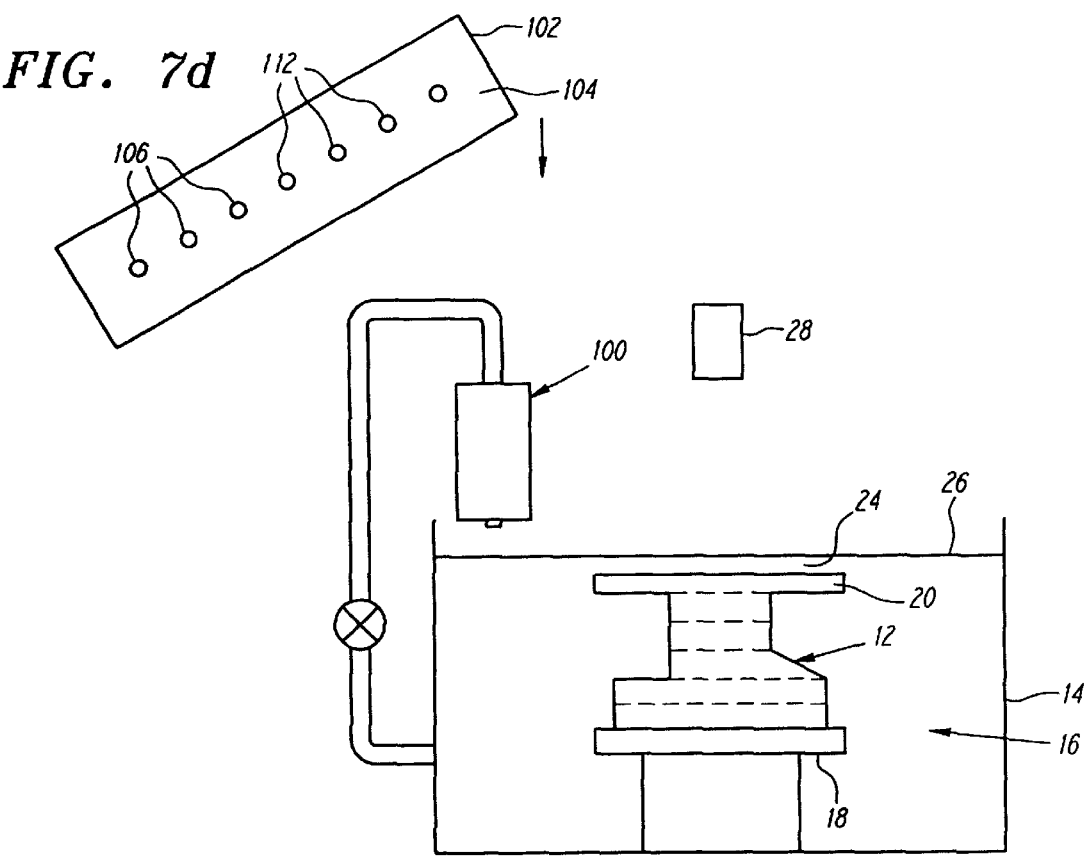
FIG. 7d
FIG. 7e
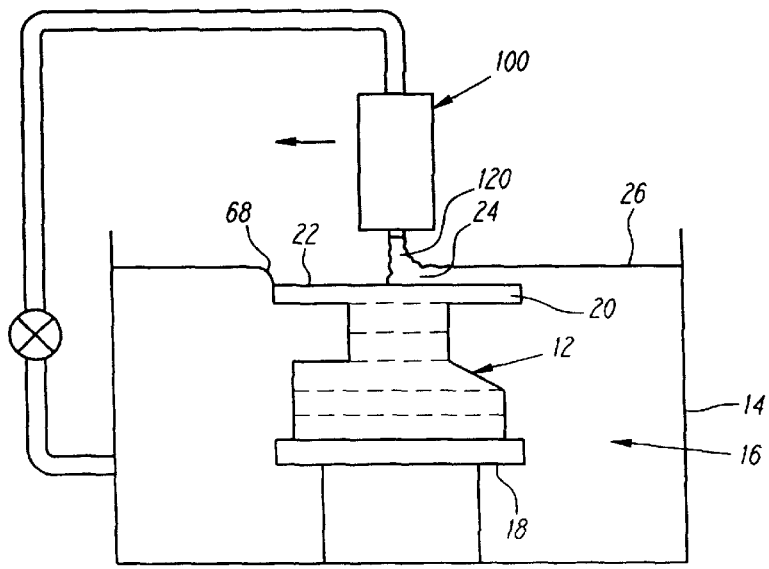
FIG. 7f
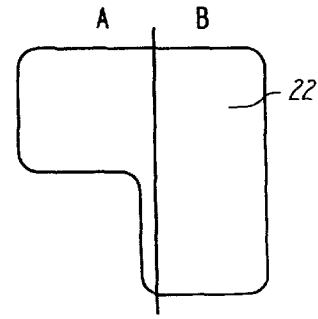
FIG. 7g

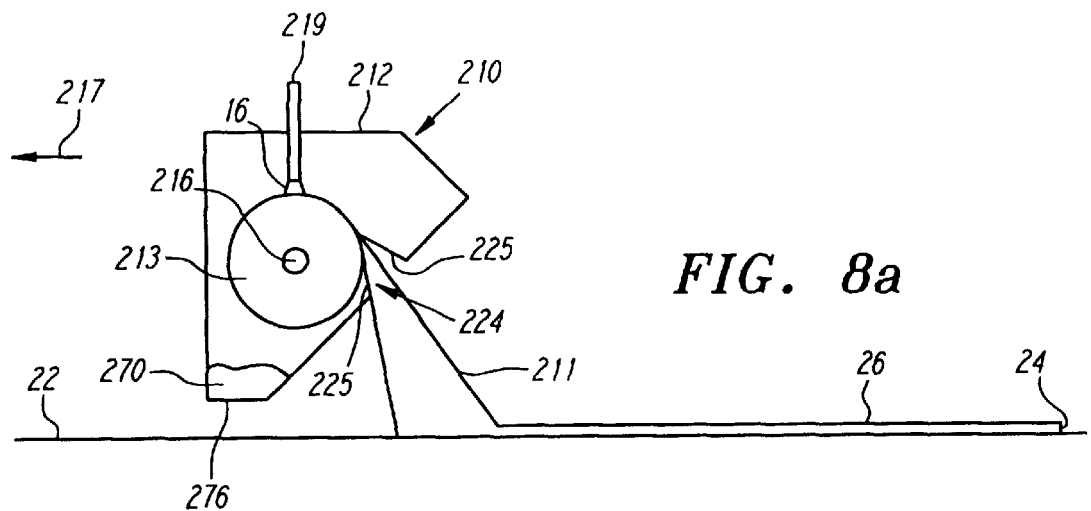
FIG. 8a
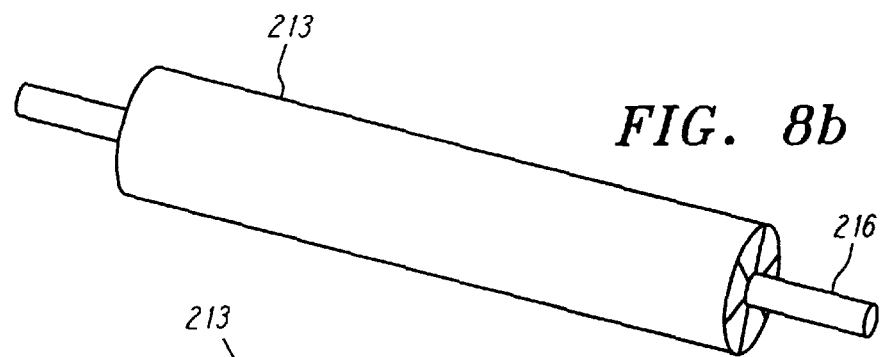
FIG. 8b
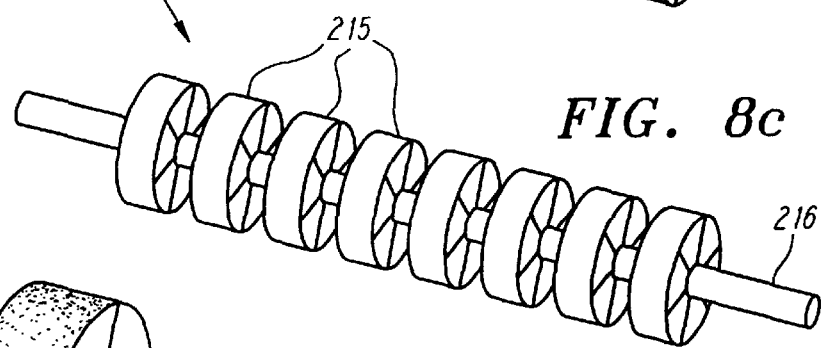
FIG. 8c
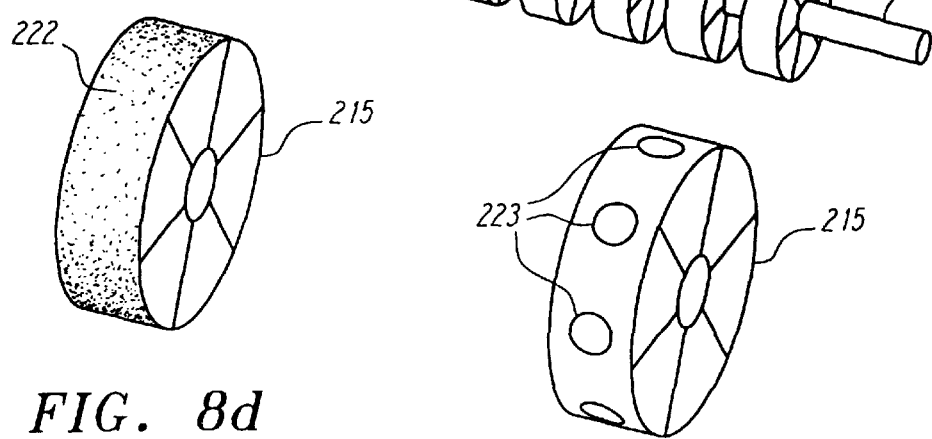
FIG. 8d
FIG. 8e

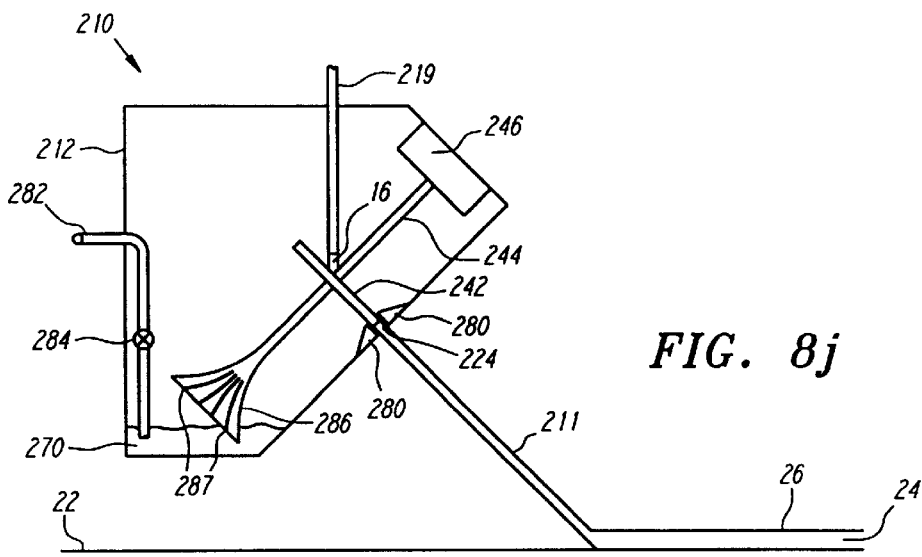
FIG. 8j
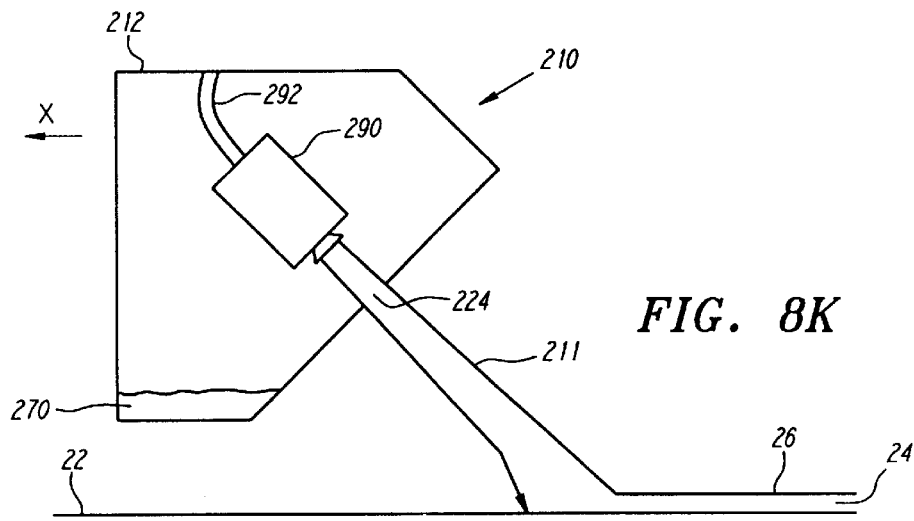
FIG. 8K
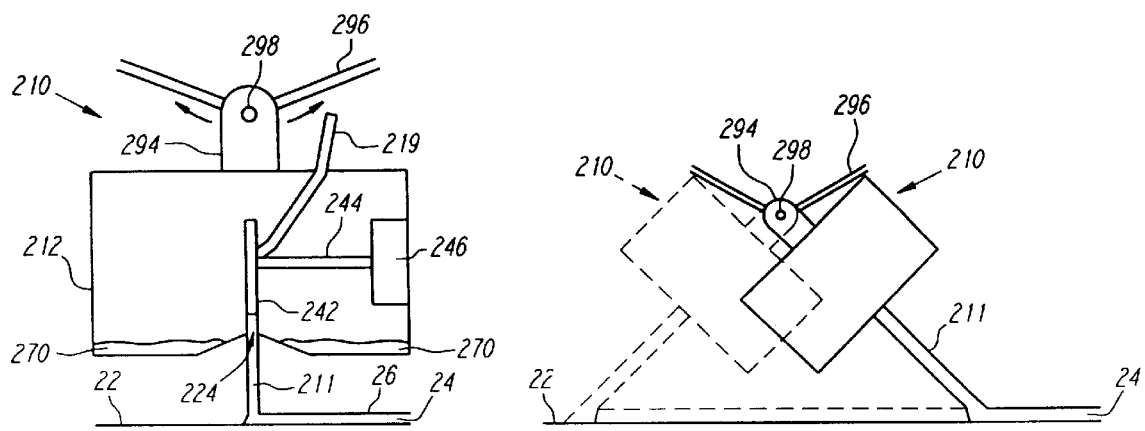
FIG. 8l
FIG. 8m ated, and data
RAPID RECOATING OF THREE-DIMENSIONAL OBJECTS FORMED ON A CROSS-SECTIONAL BASIS This application is a continuation of Ser. No. 08/382,268, filed Feb. 1, 1995, now abandoned.

1. FIELD OF THE INVENTION

The current invention relates generally to the field known as rapid prototyping and manufacturing ("RP&M"), stereolithography or solid imaging, which involves the fabrication of three-dimensional objects on substantially a cross-section by cross-section basis. More particularly, the current invention relates to improved methods and apparatus for providing a layer of building material adjacent to an already-formed object cross-section, in preparation for forming a successive object cross-section out of the layer of building material.

2. BACKGROUND OF THE INVENTION

Solid imaging generally involves the formation of three-dimensional objects according to computer commands based on a computer aided design ("CAD") or other three-dimensional representation of the object. One solid imaging technique recently developed is stereolithography which is described in U.S. Pat. Nos. 4,575,330 and 5,184,307, both of which are incorporated by reference as if fully set forth herein. Appearing below is a summary of the basic steps of a stereolithographic embodiment:

1. Generation of a three-dimensional object design in a CAD system and storage of the design data in a CAD file;
2. Compiling data from the CAD file into numerous thin "slices" each representing a thin cross-sectional layer of the three-dimensional object;
3. Transfer of the compiled CAD data to a StereoLithographic Apparatus ("SLA");
4. Coating a layer of building material adjacent to a previously formed object cross-section in preparation for forming a subsequent object cross-section. The building material layer is preferably uniformly coated at an appropriate thickness so that the subsequently formed object cross-section meets tolerance requirements;
5. Selectively exposing the building material layer to synergistic stimulation to solidify or otherwise physically transform the building material layer at those locations which collectively represent the object cross-section to be formed;
6. Repeating steps (4) and (5) to alternately form successive building material layers and object cross-sections until the three-dimensional object is formed; and
7. Post processing the newly-formed object by removing residual building material clinging to the object, removing the object from the platform on which it was formed, exposing the object to additional synergistic stimulation to ensure complete solidification of the building material and removing supports.

Building materials typically used in solid imaging may exhibit fluid-like characteristics but solidify or otherwise physically transform in response to synergistic stimulation. The fluid-like characteristics facilitate dispensing a building material layer adjacent to a previously formed object cross-section, as well as smoothing the building material layer surface in preparation of forming the next object cross-section. Depending on the coating technique used, suitable materials include transformable liquids such as thermally polymerizable resins, photopolymerizable resins, a first part of a two-part epoxy, sinterable powders, bindable powders or combinations thereof and the like. Liquid materials may also contain inert filler materials.

Various forms of synergistic stimulation may be used as long as the building material is responsive to the synergistic stimulation. These include certain wavelengths of electromagnetic radiation, such as infrared radiation, visible radiation and ultraviolet radiation. Other forms of synergistic stimulation which may be used are particle beams, reactive chemicals dispensed onto the building material such as a photoinitiator (the second element of a two-part epoxy), binder materials, and the like.

The design data, representative of the three-dimensional object can be obtained from various sources including CAD data, CAT scan data, manually programmed data, and data derived from techniques for scanning physical objects. If this data is initially in layer form, the compilation process may be reduced to creating appropriate layer fill data. However, additional compilation may be desired or required to transform the data into proper form to meet accuracy, process or other requirements such as how supports will be built along with the object. The procedures and apparatus described in U.S. Pat. Nos. 5,182,055, 5,184,307, 5,192,469, 5,209,878, 5,238,639, 5,256,340, 5,273,691 and 5,321,622, 5,345,391, and U.S. patent application Ser. No. 08/233,026, pending, and Ser. No.08/233,027, pending, both filed Apr. 25, 1994, address the generation of appropriate layer data. All of these patents and patent applications are incorporated by reference as if fully set forth herein. Also incorporated by reference as if fully set forth herein, is the publication entitled Rapid Prototyping & Manufacturing: Fundamentals of Stereolithography, First Edition, authored by Paul F. Jacobs, Ph.D., and published by the Society of Manufacturing Engineers, Dearborn, Mich., in 1992.

The current invention is directed primarily to step (4) above, i.e., coating a building material layer adjacent to a previously formed object cross-section in preparation for forming a subsequent object cross-section. Several approaches have been used in the past to perform this coating step, most often with a building material comprising a liquid photopolymerizable resin. However, these prior approaches have resulted in varying degrees of layer accuracy and nonuniformity, and/or have required excessive time to form the coatings, these problems have the following ramifications:

First, it is important that the building material layer is uniform and of appropriate thickness so that upon solidification, the resulting object cross-section exhibits dimensional accuracy. Indeed, the accuracy of the successive building material layers directly impacts the accuracy of the final object in view of potential misplacement of object features upon exposure to synergistic stimulation and potential accumulated errors which may result from errors on successive layers.

Second, it is desirable to minimize the time required to form a building material layer because the cumulative coating time of the successive layers represents a significant portion of the overall object build time. Indeed, photopolymer resins exhibit slow flow velocities due to viscosity and surface tension. If driven only by gravity, imperfections in photopolymer building material layer surfaces can take prohibitively long time periods to relax or otherwise become uniform with the rest of the building material layer surface. This in turn increases object build time, reduces machine throughput, and reduces the cost effectiveness of solid imaging.

Third, the extent of inaccuracy and nonuniformity of the building material layer as well as the amount of time necessary to form it may vary with the geometry of previously formed cross-sections. Accordingly, automated coating of building material layers is difficult because there may be no set correction parameters that might otherwise be used if coating inaccuracies were constant.

A description of several previous approaches is set forth in the following U.S. Patents and Patent Applications, the disclosures of which are all incorporated by reference as if fully set forth herein:

1) U.S. patent application Ser. No. 07/414,200, now abandoned, by Hull, et al filed Sep. 28, 1989, and its continuation Ser. No. 08/230,443 filed Apr. 20, 1994, now U.S. Pat. No. 5,447,882, are directed to covering the building material layer surface with a film which is then peeled from the surface. Before or after peeling, the surface is exposed to synergistic stimulation to form the next object cross-section.

2) U.S. patent application Ser. No. 07/495,791, now abandoned, by Jacobs et al filed Mar. 9, 1990, and its continuation Ser. No. 08/198,655, now abandoned, filed Feb. 18, 1994, are directed to the use of vibrational energy applied directly to the building material layer surface or to a previously formed object cross-section to decrease the time required for surface imperfections to vanish or level out to a tolerable level.

3) U.S. Pat. No. 5,174,931 issued to Almquist, et al. and its continuation Ser. No. 08/146,562 filed now abandoned Nov. 2, 1993 are directed to, among other things, using a member such as a doctor blade, to smooth or spread a coating of building material over a previously formed cross-section of the object.

4) U.S. Pat. No. 5,096,530 issued to Cohen, et al. is directed to forming a building material layer which is supported by a frame and the force of surface tension. The layer is then laid above a previously formed object cross-section.

5) U.S. Pat. No. 5,071,337 issued to Heller, et al. and its continuation-in-part Ser. No. 08/299,879 filed Sep. 1, 1994, now abandoned are directed to, among other things, using a dispensing device such as an applicator bar to form uniform building material layers.

The doctor blade approach listed above typically involves sweeping a bar or other device across the surface of a building material layer thereby smoothing it. Though this may reduce coating time, other problems remain such as those associated with leading edge bulge, trapped volumes, scoop-out and other problems described in previously incorporated U.S. Pat. No. 5,174,931.

Other coating approaches have been suggested beyond those listed above. An electrically charged or uncharged counter-rotating roller which spreads a mound of powder into uniform layers is disclosed in PCT Patent Application No. PCT/US87/02635, Publication No. WO 88/022677 by Deckard, and in U.S. Pat. No. 4,938,816 issued to Beaman et al. However, the roller disclosed therein is generally not suited for use with liquid building materials because liquids may cling to the roller unlike the powders described in the above references which are instead ejected in front of the roller. This clinging action may also cause building material to be carried over the roller and redeposited behind it thereby creating a nonuniform building layer. Furthermore, liquid mounds also tend to sink or spread out into previously dispensed volumes of unsolidified liquid. In any event, the Deckard and Beaman references do not address how such a roller might be used with liquid building materials.

Several basic aspects of using a dispensing slit or curtain coater in a stereolithographic process are disclosed in Japanese Patent Application 59-237054, laid open to the public as Japanese Publication 61-114817(A) on Jun. 2, 1986, filed by Morihara et al. The slit coater remains stationary as the container of liquid building material is moved back and forth beneath it. The slit coater dispenses building material having a thickness equal to that of the desired solidified object cross-section. However, Morihara's slit coater is not suitable for producing high-resolution objects for at least the following reasons.

First, forming building material layers having a thickness equal to that of the desired object cross-section does not account for the shrinkage which typically occurs as the building material solidifies. This in turn leads to inaccuracies in the vertical dimensions of the object, formation of nonplanar object cross-sections especially in transitional regions between supported and unsupported portions of a cross-section, and uncontrolled positioning of the working surface.

Second, Morihara's slit coater does not account for the volumetric difference of material dispensed when the container moves at constant velocity versus when it accelerates and decelerates near the ends of its line of travel. This results in a nonuniform thickness across the building material layer.

Third, Morihara's slit coater cannot dispense material at locations of the container which are inaccessible to the slit coater. This either reduces the accuracy of the overall coating formed or the usable working area of the container.

Fourth, Morihara's slit coater does not recognize that in certain stereolithographic embodiments, one must coat a building material layer over the entire surface of the liquid bounded by the container before the building material layer achieves the desired thickness. This is because when building material is dispensed in regions that are not closely supported by solidified material, the building material will not simply remain at the surface of the liquid in the container. Instead, it serves to raise the liquid level in the entire container thereby decreasing the thickness of the building material layer at the point it was just dispensed at. Only after material has been dispensed over all such unsupported regions will the building material surface level reach the desired level. In certain circumstances however, such as when coating very thin building material layers on the order of 0.004 inches or less, one may ignore this problem.

Fifth, the building material in Morihara's container is likely to shift due to the repeated to and fro container motion. Such shifting would likely result in nonuniform coating thicknesses and/or increased layer formation times. In fact, even if the container is moved to and fro at moderate speeds, the material in the container may slosh out of the container. For all the foregoing, it appears that Morihara does not disclose an apparatus or method to rapidly and accurately recoat building material layers.

Beyond the problems of the particular approaches discussed above, other problems involve the dispensing of a known quantity of building material, or avoiding the accumulation of small errors into large cumulative errors as successive layers are coated. Accordingly, there is a need in the RP&M art for methods and apparatus which overcome the problems discussed in this background section as well as other problems.

3. SUMMARY OF THE INVENTION

The current invention regards improved apparatus and methods for forming successive building material layers in preparation of forming successive cross-sections of an object built on substantially a cross-sectional basis.

In a first embodiment, a counter rotating roller is swept across an initial building material layer to form a building material layer of desired thickness and uniformity. Several variations of this embodiment are disclosed.

In a second embodiment, an ink jet print head dispenses building material from a plurality of ink jets to form a building material layer. Several variations of this embodiment are disclosed.

In a third embodiment, an applicator includes a plurality of spinning wheels on which building material is delivered and then ejected from the applicator to form a building material layer. Several variations of this embodiment are disclosed.

In a fourth embodiment, an applicator is used to apply a building material layer from above the object being formed. Several variations of the applicator are disclosed.

In a fifth embodiment, an applicator dispenses a plurality of building material streams from above the object, which streams merge upon contacting the object or other surface to form a building material layer. Several variations of this embodiment are disclosed.

In the foregoing embodiments, variations on how building material is supplied to the applicator or other device used to dispense building material are disclosed. Also disclosed are methods and apparatus to monitor the overall dimensions of the object as it is being built to avoid and/or correct accumulated errors. Also disclosed are methods and apparatus to determine the extent to which a building material layer should be formed when taking trapped volumes into account. Each of the above embodiments may be used independently of the other embodiments to achieve an improvement in coating accuracy or in coating formation time or both. Alternatively, combinations of the above embodiments or combinations of different elements of the above embodiments may be used for favorable recoating results.

4. BRIEF DESCRIPTION OF THE DRAWINGS

FIG. 4b is a top view of the screw of FIG. 4a.

FIGS. 7b–7d show alternate ink jet array configurations.

FIG. 7e shows a building material layer and a working surface formed after dispensing.

FIG. 7f shows an ink jet print head dispensing building material.

FIG. 7g is a top surface of a previously formed object cross-section.

FIG. 8a shows an applicator including a roller dispensing building material.

FIG. 8b shows a roller.

FIG. 8c shows an alternate roller including a plurality of wheels.

FIG. 8d shows a wheel comprising a porous material.

FIG. 8e shows a wheel including holes.

FIG. 8j shows an applicator including an array of spinning wheels and impeller dispensing building material.

FIG. 8k shows an applicator including a piston sprayer dispensing building material.

FIGS. 8l–8m show a rotating applicator including a spinning wheel array dispensing building material.

5. DESCRIPTION OF THE PREFERRED EMBODIMENTS

Figure 1:
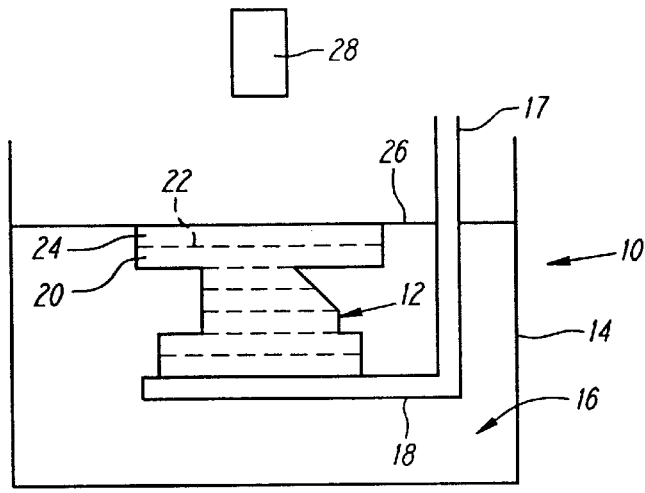
FIG. 1 is a cross-section of a stereolithographic apparatus forming a building material layer.

FIG. 1 generally depicts a stereolithographic apparatus ("SLA") 10 in which object 12 is formed, and is set forth to familiarize the reader with terms used herein. SLA 10 may include a vat 14 which contains a volume of the building material 16 used to form object 12. Object 12 may be built on platform 18 which may be vertically movable and coupled to support arms 17 that may be coupled to a computer-controlled elevator (not shown). Object 12 is formed of successive cross-sections which are shown by the dashed lines. The last-formed object cross-section 20 has a top surface 22 on which the next layer of building material 24 is formed.

In preparation of forming the next object cross-section, building material layer 24 may be formed in several ways. Platform 18 may be lowered while maintaining the surface of the volume of material 16, i.e., working surface 26, at a fixed level. The term working surface 26 typically refers to the surface of the volume of building material 16 in vat 14. Preferably, working surface 26 is at a desired level or plane, and is thus a "desired working surface" that is located at a specified distance from the source 28 of synergistic stimulation during exposure to synergistic stimulation. Throughout the disclosure below, the actual working surface and desired working surface are both denoted with reference numeral 26 but where the actual and desired working surfaces may deviate from each other, the disclosure explains such deviation.

Alternatively, platform 18 and thus top surface 22 may remain stationary at a fixed level, and the volume of material 16 in vat 14 may be increased thereby raising working surface 26. This may occur by pumping more material into vat 14 from below working surface 26, or by dispensing more material into vat 14 from above working surface 26. A combination of the foregoing approaches is also possible.

Alternatively, building material layer 24 of FIG. 1 may be formed by "deep-dipping" platform 18. That is, platform 18 and thus surface 22 may be lowered more than the intended thickness of the next object cross-section below working surface 26 so that material 16 flows over surface 22 more easily. Platform 18 is then raised so that the thickness of layer 24 approximates the desired thickness. Alternatively, working surface 26 may be raised in excess and then lowered. Deep-dipping is used because if platform 18 is lowered or working surface 26 raised an amount equal to only one layer thickness, material 16 may not flow, or at least not flow in a reasonable time period, over surface 22 due to viscosity and surface tension effects. Instead, material 16 will typically form a boundary around the periphery of surface 22 (see boundary 68 in FIG. 5a). As explained later, the configuration of object cross-sections below the last-formed cross-section 20 may affect where boundary 68 is formed. This boundary may remain stationary or alternatively may move slowly inward toward the center of the previous cross-section. Deep-dipping is discussed in detail in previously incorporated U.S. Pat. No. 4,575,330 and 5,174,931. Working surface 26 may be raised relative to top surface 22 by other techniques which also help serve to form a building material layer 24.

The thickness of the building material layer 24 may substantially approximate the desired thickness of the next object cross-section or may vary from the desired thickness. One reason that the thickness of layer 24 may be varied from the thickness of the next object cross-section is to compensate for errors that may have arisen in connection with forming previous object cross-sections, or to compensate for anticipated errors.

For example, since liquids such as photopolymerizable resins typically shrink as they solidify, building material layer 24 may be formed thicker than the intended object cross-section to compensate for the thickness that will be lost to shrinkage. Also, to ensure that the actual working surface 26 remains a proper distance from the source of synergistic stimulation 28 so that it is desired working surface 26, and to rectify thickness errors that may have accumulated over successive layers, independent liquid leveling may occur in association with the recoating process for each layer or for periodic layers. Depending on the timing, amount and direction of level correction, a building material layer thickness may be somewhat greater or less than the desired thickness of the next object cross-section. Lastly, due to possible inaccuracies in the building material layer used to form the last formed object cross-section 20, or due to possible distortions in the last object cross-section 20 arising from shrinkage or curl, the current building material layer thickness may vary from the desired thickness.

Another reason why the thickness of layer 24 may be varied from the thickness of the next object cross-section, at least initially, is because building material layer 24 may be formed in several steps, i.e., it is initially formed at a certain thickness and then adjusted to a desired thickness. For example, when deep-dipping occurs, building material layer 24 may initially be thicker than desired because excess material 16 may remain over surface 22 after platform 18 is brought back up. This thicker-than-intended initial building material layer 24 may then be adjusted to the desired thickness by a doctor blade or other device as described below. Where a doctor blade or other smoothing device is used to form a building material layer 24, the thickness of layer 24 may end up being less than desired because the doctor blade may have swept away too much material 16. Alternatively, the thickness may be greater than desired because the doctor blade may not have swept away sufficient material. This results in the actual working surface not coinciding with the desired working surface.

In some circumstances the initial building material layer 24 may be adjusted to the desired thickness by raising or lowering working surface 26 relative to top surface 22 an additional increment to compensate. In any event, it is generally advantageous to determine the coating error on a first layer and to compensate for that error by adjusting the coating thickness of a subsequent layer of building material.

After a building material layer 24 of desired thickness is formed, it is exposed to synergistic stimulation from a source of synergistic stimulation 28. This causes building material layer 24 to solidify or otherwise physically transform thereby forming the next object cross-section. Successive building material layers 24 and object cross-sections 20 are then alternatingly formed to complete the object 12.

COUNTER-ROTATING ROLLER

Reference is now made to FIGS. 2a–2d, which show a first embodiment of the current invention in various stages of forming a building material layer 24. Elements common to FIG. 1 are similarly numbered. In this embodiment, a building material layer 24 is initially formed by raising working surface 26 relative to the top surface 22 as discussed above, and then a counter rotating roller 30 is swept across building material layer 24 thereby rendering it substantially uniform and of desired thickness. This embodiment may be used with a liquid building material such as a photopolymerizable resin, a preferred resin being SL 5170 manufactured by Ciba-Geigy, Ltd. and sold by 3D Systems, Inc. of Valencia, Calif. A preferred source of synergistic stimulation 28 is 325 nm radiation produced by a HeCd laser.

As discussed in more detail below, a counter rotating roller is one which translates across working surface 26 and which rotates counter to the direction of translation such that the net sum of (a) its rotational (tangential) velocity at a point near the working surface of the material, i.e., the angular velocity of roller 30 as measured in radians/unit time multiplied by the radius of the roller 30, and (b) its translational velocity, i.e., the velocity at which the center of the rotating roller 30 translates, is greater than either the rotational or translational velocities taken alone. In other words, the direction of rotation is opposite, i.e. counter, to the direction in which the roller would rotate if it were rolling along the plane of the working surface.

Figure 2A:
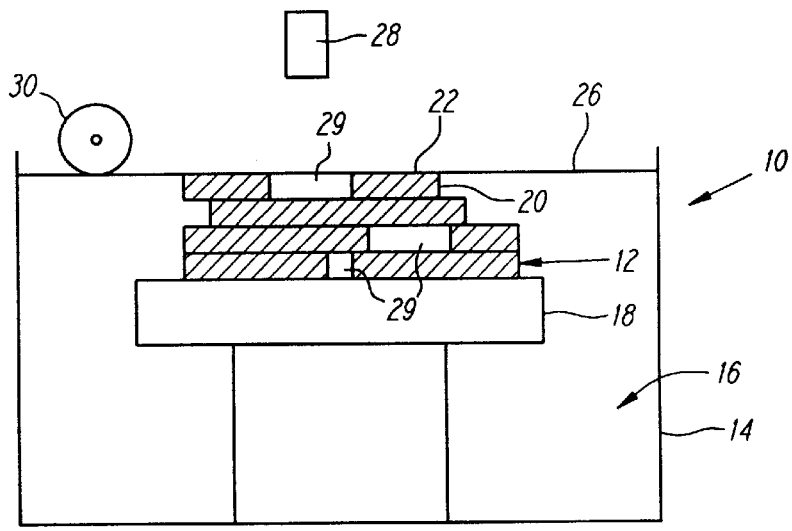
FIGS. 2a–2d show an apparatus and method for forming a building material layer using a counter rotating roller.

FIG. 2a depicts the stage of the building process where the last-formed object cross-section 20 has been formed by exposure to synergistic stimulation from a source 28. At this stage, top surface 22 of the last object cross-section 20 may be substantially co-planar with working surface 26 or slightly depressed due to shrinkage of material 16 upon its solidifying. As shown, object cross-section 20 includes void 29 which corresponds to a location where object 12 is not solid per the object's design or the design of the particular stereolithographic building style being used to form the object. Other voids 29 are also shown in previous object cross-sections.

At this stage, roller 30 is preferably located or parked near the periphery of vat 14 or at least beyond the area of surface 26 that was exposed to synergistic stimulation. In this manner, roller 30 and associated hardware were not located over object 12 and thus avoided interfering with the synergistic stimulation being directed towards object 12. The parking position of roller 30 during the exposure step depends on a number of factors. These factors include 1) whether or not roller 30 stops rotating during exposure, 2) whether or not successive sweeps of roller 30 across vat 14 are performed in opposite sweeping directions and therefore with successive reversals in rotational velocity, 3) the extents of the region to be exposed when exposing building material layer 24, 4) the extents of the last-formed object cross-section 20 just exposed and 5) the extents of the regions exposed in association with a number of preceding layers, e.g. layers corresponding to the last previously formed 1/25 to 1/4 inch of object cross-sections. Preferably, reverse roller 30 sweeps a minimum distance per layer so as to minimize the time associated with recoating. In any event, building material layer 24 may now be formed in preparation for forming the next object cross-section.

Figure 2B:
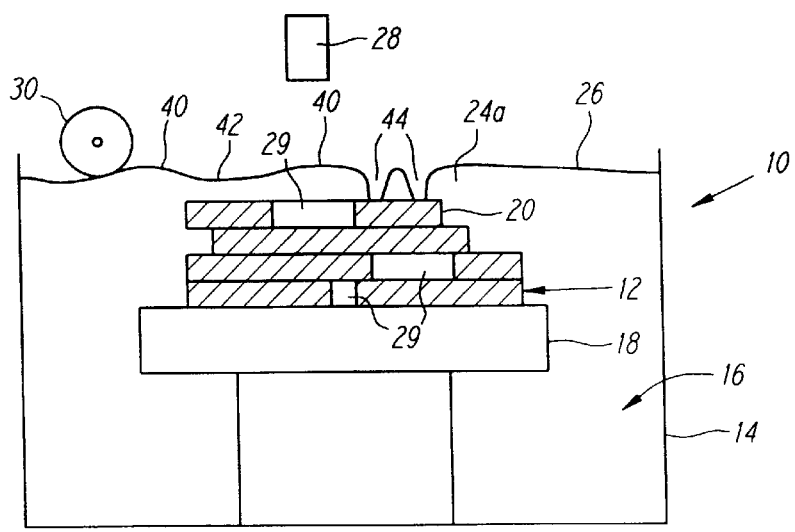

FIG. 2b shows building material layer 24a which has been initially formed by raising working surface 26 relative to top surface 22. This may be accomplished by lowering object 12 into vat 14 or by raising surface 26 while object 12 remains stationary. A doctor blade or other smoothing device may also have operated on surface 26. As discussed above, the initial thickness of layer 24a may vary from the desired thickness of the next object cross-section. In fact, the initial thickness of layer 24a is typically significantly greater than the desired thickness of the next object cross-section. However, the initial thickness of layer 24a may not be uniform wherein some regions are thinner than desired while other regions are thicker than desired.

After building material layer 24a is initially formed, imperfections in the working surface 26 may remain such as bulges 40, depressions 42 and holes 44 which if not reduced or eliminated, could create inaccuracies in the next object cross-section. If severe enough or if built-up from a number of layers, these imperfections could result in delamination between object cross-sections or a collision between the last-formed cross-section 20 and any coating device which is swept above the desired working surface 26. The size and origin of surface deformations depend largely on how building material layer 24a was initially formed. If deep dipping was used, bulges 40 and overall excess thickness over surface 22 would probably result. If layer 24a was initially formed by bulk dispensing from a sweeping hopper traversing above working surface 26, any variance in the dispensing rate could cause bulges 40 or depressions 42. If a doctor blade or other smoothing device was used in initially forming layer 24a, bulges 40 may be formed which result from leading edge bulge or underflow of material in trapped volumes, or depressions 42 and holes 44 may be formed which result from scoopout of material from shallow regions.

Figure 2C:
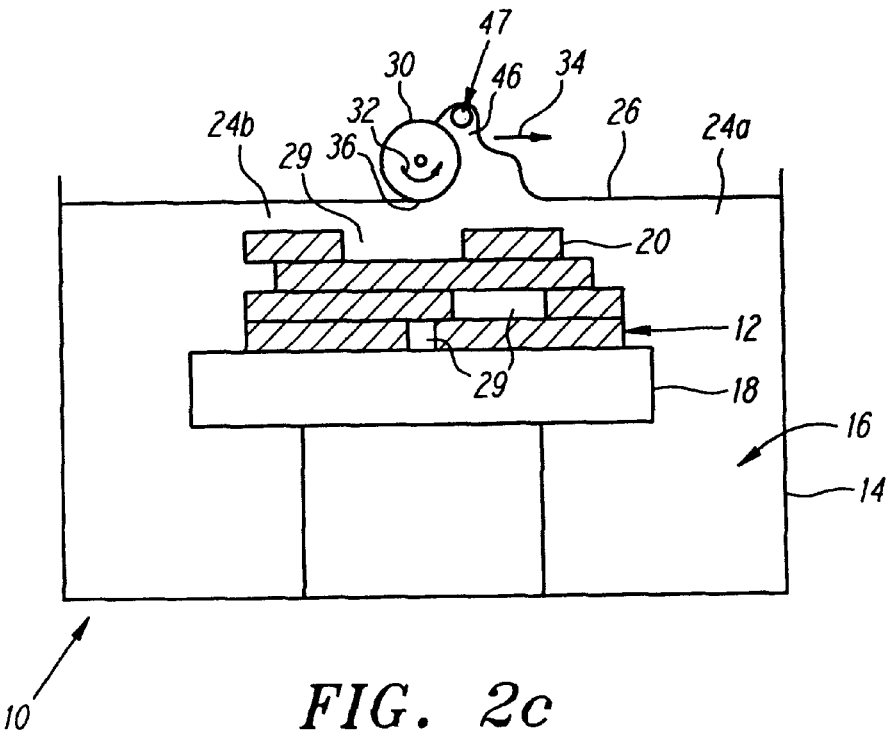
Figure 2D:
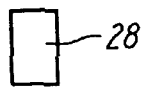
Figure 2D:
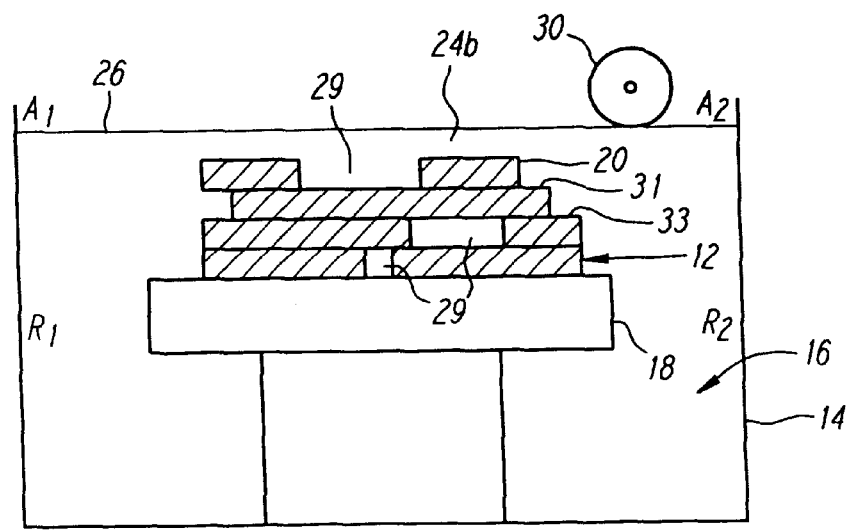

In any event, after layer 24a is initially formed, a counter-rotating roller 30 may then be used to form a building material layer 24 which is uniform and of desired thickness in preparation for forming the next or subsequent object cross-section. Alternatively, a reverse roller, i.e., counter-rotating roller, may be swept over the previously formed cross-section without first forming an initial layer 24a. FIG. 2c depicts the reverse roller 30 after having partially traversed the previously formed object cross-section 20 from left to right. FIG. 2d depicts the reverse roller 30 after having completed its traverse. A partially formed desired layer of building material 24b is shown to the left of the roller 30 in FIG. 2c while a completed desired layer of building material 24b is shown over the entire previously formed cross-section 20 in FIG. 2d.

Roller 30 is preferably cylindrical and its axial length may cover a substantial portion of the transverse dimension of vat 14 (dimension typically perpendicular to the sweeping direction of roller 30). This allows a significant portion of vat 14, and more importantly the entire portion of vat 14 which is within the transverse dimension of the next object cross-section, to be swept by a single pass of roller 30. Alternatively, multiple rollers 30 of shorter axial length may be used. This multiple roller configuration may be advantageous for building smaller objects because only one of the shorter rollers may actually be needed to act upon that portion of working surface 26 within the dimensions of the next object cross-section.

In a further alternative, roller 30 may be swept in a direction which is not perpendicular to the axis of roller 30. Here, the axis of roller 30 is oriented less than 90° from the sweeping direction but greater than 0°, the preferred axis of orientation being between 45° and 60°. If doctor blades such as those disclosed in the parent application, U.S. patent application Ser. No. 08/146,562, are used, either alone or in combination with a reverse roller when forming a layer of material, they may be similarly oriented to enhance recoating.

There is generally no need to smooth the entire working surface 26 of vat 14 with roller 30 because inaccuracies in those portions of surface 26 not exposed to synergistic stimulation generally do not occur. This is because large flow paths exist that allow rapid leveling out of any variation in the height of surface 26. Furthermore, it is preferred to actively smooth only those portions of surface 26 that contribute to object accuracy because to smooth the entire surface 26 increases recoating time, and in turn, overall object build time. Generally, three criteria determine the extent to which surface 26 should be smoothed by roller 30.

First, after sweeping roller 30 to form a uniform building material layer 24, roller 30 and its associated hardware should ultimately be located beyond the region of working surface 26 to be exposed to synergistic stimulation when forming the subsequent object cross-section from the layer 24 just formed. Second, enough of surface 26 should be smoothed to form a uniform layer 24 over the regions previously exposed when forming the last-formed object cross-section 20. Thus according to these first two criteria, roller 30 should be swept to a location beyond what was exposed in forming the previous cross-section and beyond what is to be exposed in forming the subsequent cross-section. In many instances if these two criteria are met, object formation may typically proceed. However if fail-safe recoating is desired, a third criteria should be considered which, as discussed below, involves considering the regions exposed in association with one or more cross-sections formed prior to the last-formed cross-section 20.

When working with a vat 14 containing liquid photopolymer, it has been found that all portions of regions which are deep and connected by large flow paths readily attain the same surface level. This is illustrated in FIG. 2d where surface areas $A_1$ and $A_2$ are located over deep regions $R_1$ and $R_2$, and where regions $R_1$ and $R_2$ are generally contiguous to each other such that the flow path therebetween is generally unobstructed. Here, if building material is added to surface area $A_1$, material 16 in vat 14 will generally flow between regions $R_1$ and $R_2$ such that surface area $A_2$ quickly attains the same level as surface area $A_1$.

However, it has been found that when material is added to surface areas over shallow regions such as void 29 and up-facing regions 31, 33, exorbitant amounts of time may be required for this surface area to attain the same level as that over deep regions. Thus any excess material thickness in shallow regions can take unacceptable amounts of time to reduce or rise to the desired level when acted upon by only the forces of gravity and surface tension. Likewise, any shallow regions with a coating thickness shortage may require an exorbitant amount of time to increase to the desired level.

The depth at which a shallow region becomes potentially troublesome depends on the viscosity and surface tension of the building material and on the surface energy of the building material which has already physically transformed. Shallow regions having a depth below the desired working surface 26 of between less than 40 mils (1 mm) to about 240 mils (6 mm) may exhibit the problem discussed above and may be considered troublesome. If an extremely viscous building material is used, e.g., viscosity exceeding 10,000 centipoise, depths considered troublesome may extend even deeper.

In any event, the third criteria is ensuring that roller 30 sweeps beyond all of these shallow regions. These shallow regions can be accounted for by storing the maximum cross-sectional dimensions for all previously formed object cross-sections which exist within the defined shallow troublesome depth, and ensuring that roller 30 not only sweeps to a location which fulfills criteria 1 and 2, but also to a location which is beyond the boundaries of all cross-sections within the troublesome depth range.

For example, if a troublesome depth range is defined to include shallow regions having a depth of less than 120 mils (3 mm) below working surface 26, and object 12 is being built with 4 mil layers (0.1 mm), then one needs to take into account not only criteria 1 and 2 but also the maximum longitudinal (direction of sweeping) dimensions of the 30 previous cross-sections formed. If all three criteria are met, roller 30 will sweep over all regions that may otherwise create problems in the recoating process. The foregoing analysis is applicable not only to the roller 30 and other embodiments described in this application below, but also to the doctor blade embodiments described in this application's parent application.

The counter rotation of roller 30 provides a shearing force to the surface of the initial building material layer 24a as it sweeps thereacross. In this manner, roller 30 preferably removes the excess thickness from the top of layer 24a as it translates, thereby removing bulges 40 and other surface imperfections. This shear force also preferably "pushes" material 16 into depressions 42 and holes 44 thereby eliminating them. As discussed below, it is desired that a small thickness of material 16 adhere to roller 30 to form a boundary layer thereon and it is believed that the shear force occurs between this roller boundary layer and working surface 26.

Because of the shear force, as roller 30 sweeps across vat 14 it does not induce submerged material 16 to flow along with it across vat 14. This is in contrast to current doctor blades which exhibit a certain amount of skin depth, i.e., the situation where material 16 attaches to the doctor blade, which attached material then causes additional submerged material 16 to flow along with it. Though a certain amount of material 16 will attach to roller 30, the shear force prevents this attached material from causing additional submerged material to flow. Thus, roller 30 exhibits little or no skin depth as it sweeps across vat 14 which is advantageous because skin depth dictates the depth at which submerged object configurations may affect the recoating process.

A large skin depth may make automated recoating difficult since recoating becomes dependent on the geometry of the object. For example, a large skin depth may result in damage to previously formed object cross-sections since forces can be transmitted from roller 30 or other recoating device to previously formed object cross-sections which might not have yet become sufficiently solidified and thus may be susceptible to damage. In severe circumstances, a large skin depth may result in a drag force on material located between a smoothing member and object 12 such that as material is pulled out of this region, a vacuum is formed. This vacuum may pull object 12 and smoothing member closer together thereby causing a collision therebetween. In contrast, a small skin depth facilitates automated recoating because the results of a recoating process have little dependence on the configuration of object 12.

If roller 30 were to rotate in a "noncounter" direction, it would merely "press down" on building material layer 24a and force any excess material encountered by roller 30 beneath and behind it. The ramification is that imperfections in surface 26 are essentially not corrected by roller 30, the end result being a nonuniform building material layer.

Roller 30 may generally be attached to SLA 10 by a frame having arms (not shown), which arms are attached at each end of roller 30. The frame preferably provides precise positioning of roller 30 with respect to working surface 26 so that the final building material layer 24 is of the desired thickness and so that working surface 26 is at the desired plane in preparation of forming the next object cross-section. Precise positioning of the frame and roller 30 relative to the desired working surface 26 may be manually set or it may occur under computer control. The frame which positions roller 30 may also be mounted on a multipoint, e.g., 3 or 4 point, stand (not shown) which may be manually or automatically adjustable based on manual or automatic sensing of the plane along which roller 30 is swept. The rotational velocity 32 and translational velocity 34 of roller 30 may be variable and controlled via a computer.

The frame preferably allows roller 30 to traverse vat 14 without touching working surface 26. This provides that after roller 30 has swept across working surface 26, it may be transported to its initial position, as shown in FIG. 2a, without disrupting working surface 26. Alternatively, roller 30 may be reversibly rotated such that after sweeping a first building material layer 24, it may sweep across the next layer 24 in the opposite direction and with the opposite rotation.

As an additional alternative, the system may be configured with two closely-shaped rollers rotating in opposite directions wherein only one roller is vertically positioned in the sweeping plane so that it contacts layer 24a depending on the sweeping direction. Alternatively, both rollers may be vertically positioned in the sweeping plane at all times with the lead roller preferably rotating in the noncounter direction and the second roller rotating in the counter direction. Here, the sweeping direction may alternate from layer-to-layer whereby a counter-rotating roller planarizes initial layer 24a to form final layer 24b. The order of the rollers may also be reversed since if the counter rotating roller sweeps first, a uniform coating will be formed which will not be significantly impacted by a following non-counter rotating roller. Roller 30 may be rotated by a chain and sprocket arrangement (not shown) or by other suitable means.

Alternatively, in preparing building material layer 24 for forming an object cross-section, roller 30 may be swept across the same layer 24 twice or some other number of times. For example, the first sweep may be a "rough" pass whereby layer 24 is brought near its desired thickness. To this end, the rough pass may be performed at a high speed because a second "fine tuning" pass may then be performed. The fine pass may then serve to bring layer 24 to its desired thickness.

After roller 30 has swept across working surface 26 as shown in FIG. 2d, building material layer 24 may be impinged by synergistic stimulation from the source of synergistic stimulation 28. At this stage, roller 30 is preferably positioned so as not to interfere with the synergistic stimulation's interaction with working surface 26. As described above, to form the next building material layer 24, roller 30 may sweep across the next-formed working surface in the opposite direction with its rotational direction reversed, or it may be transported to the position shown in FIG. 2a and swept in the same direction as in FIG. 2c.

FIG. 2c shows roller 30 smoothing the initially formed building material layer 24a after object 12 was deep-dipped and returned to a location one layer thickness below the desired working surface. As shown, because roller 30 preferably shears off all material from initially formed layer 24a which is more than one layer thickness above the previously formed object cross-section 20, e.g. above the desired working surface 26, a build-up 46 of building material 16 may occur forward of roller 30 as its sweeps across vat 14. Thus, the rotational velocity 32 is preferably kept low enough to avoid any of this build-up 46 from being transported over and redeposited behind roller 30 which would compromise the removal function just performed. It has been experimentally found that when material is carried over the top of roller 30 and redeposited therebehind, a uniform coating is still formed. However, the building material layer 24 so formed is typically too thick with a thickness equal to the average thickness of the non-uniform coating existing above the last-formed object cross-section 20 prior to the sweeping of roller 30. Thus, if the average thickness prior to sweeping was equal to the desired layer thickness, material being carried over the top of roller 30 may still yield a coating of the desired thickness.

Building materials exhibiting higher viscosities generally tend to adhere to roller 30 more so than less viscous materials. Accordingly, as building material 16 viscosity increases, the rotational velocity 32 of roller 30 is preferably reduced to avoid over-the-top transfer. While this basic counter-rotating roller embodiment may form a layer 24 of desired thickness, precautions should be taken to ensure that the amount of material accumulated in front of roller 30 is small enough to avoid over-the-top transfer. Care should also be taken to ensure that accumulation 46 is maintained in a buoyant enough state (force of upward drag created by roller 30 reasonably balances the downward pull of gravity) so that a pressure head is avoided which could otherwise result in accumulations 46 sinking into vat 14 and flowing under roller 30. Preferably, most excess material of accumulation 46 is pulled upward from the desired working surface 26 and is rotated into a "cigar roll" 47 in front of roller 30 wherein cigar roll 47 is not carried over the top of roller 30 and will also not slump back down into working surface 26.

Figure 2E:
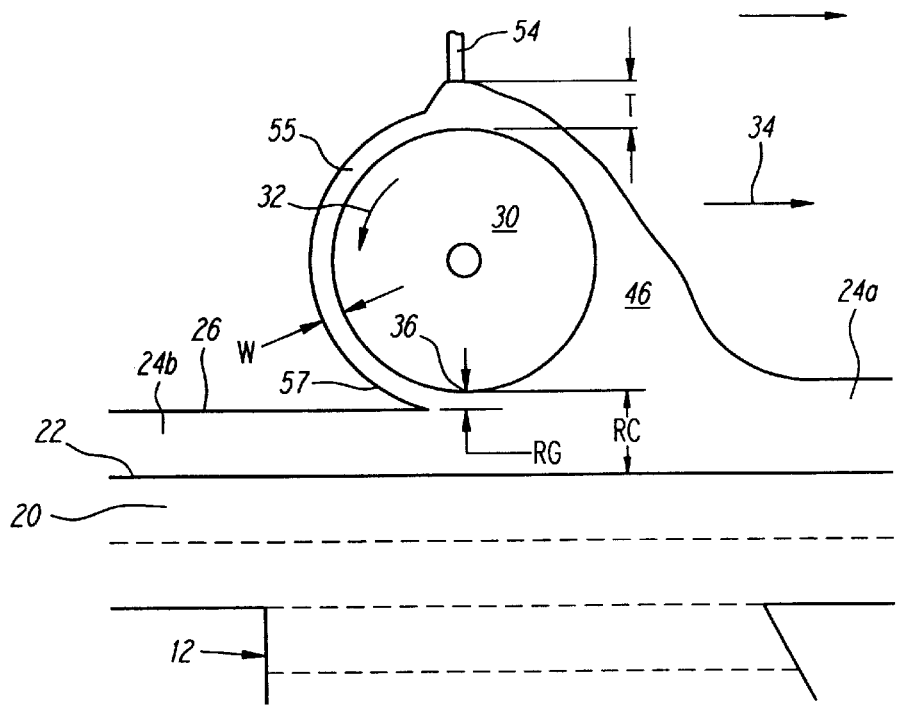
FIG. 2e shows the interaction between a counter rotating roller and building material layer.
Figure 3A:
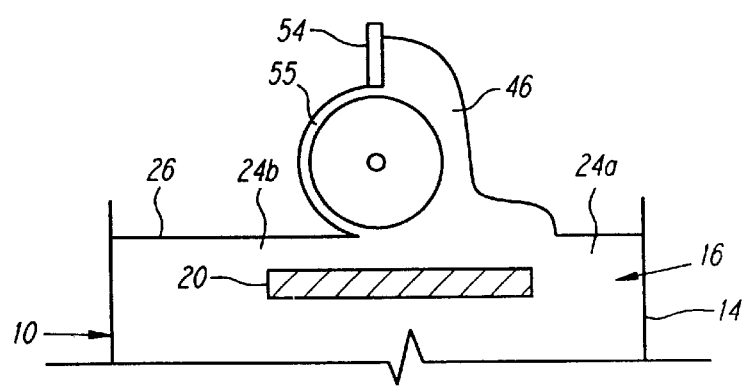
FIGS. 3a–3b show an apparatus and method for forming a building material layer using a counter rotating roller with a dam.
Figure 3B:
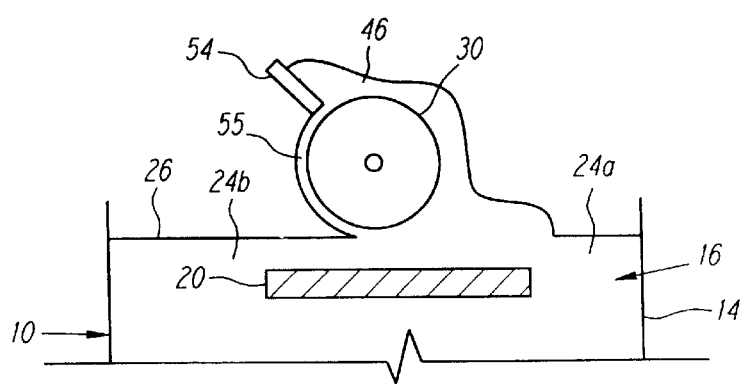

Alternatively, as shown in FIGS. 2e and 3a–3b, dam 54 may be placed near the surface of roller 30 to control over-the-top transfer as well as the formation of the boundary layer 55 of material 16 adhering to roller 30. Using a reverse roller in conjunction with the dam 54 of FIGS. 3a and 3b is a more preferred embodiment than using the reverse roller by itself.

FIG. 2e shows roller 30 interacting with the surface of the initially formed building material layer 24a where accumulation 46 has formed. Dam 54 is positioned a distance T away from the surface of roller 30. While FIG. 2e generally shows dam 54 as rectangular in cross-section, dam 54 may comprise various other shapes as long as it serves to limit the amount of accumulation 46 which is allowed to pass thereby. The preferred distance T is in the range of about ½ to about 4 mils (0.001 to 0.002 inches) with a more preferred range of about 1 to 2 mils. The material which passes by dam 54 forms the roller boundary layer 55.

Because of boundary effects occurring as accumulation 46 meets dam 54, the resulting thickness (W) of material passing by dam 54 may be less than distance T thereby resulting in a roller boundary layer 55 of thickness W, wherein W is greater than zero but equal to or less than T. The relationship between T and W may depend on a number of factors including the materials comprising the surfaces of roller 30 and dam 54, the physical configuration and surface energies of roller 30 and dam 54, the viscosity and surface tension of the building material, and the rotational velocity 32 of roller 30. The exact thickness W of boundary layer 55 is not believed to directly impact the coating process. However, it is preferred that the thickness W be less than the desired layer thickness and more preferably, considerably less than the desired layer thickness.

In any event, the exact thickness W of the boundary layer may be determined experimentally. Such a determination may be made in a variety of ways including incrementally moving a dry probe toward the back side of roller 30 from a distance until the material of boundary layer 55 is contacted. Upon contact, a noticeable wicking-up of material onto the probe will occur immediately. If the incremental positioning of the probe is calibrated relative to its separation from roller 30, the thickness W of boundary layer 55 may be determined. It is postulated that the thickness W will generally be in the range of ½T to T, inclusive. It is also postulated that a percentage of boundary layer 55 will remain with roller 30 as the material in boundary layer 55 contacts the building material near the bottom 36 of roller 30. Thus in effect, a portion of thickness W is carried along with roller 30 and a portion is deposited onto the material above the surface 22 of the last-formed object cross-section 20 thus forming a part of the desired layer 24b.

During the recoating process, the distance between the bottom 36 of roller 30 and the surface 22 of the last-formed object cross-section 20 is defined as the roller clearance (RC). Furthermore, the distance between the bottom 36 of roller 30 and the desired working surface 26 is defined as the roller gap (RG). The plane at which a split occurs between the material staying with roller 30 and the material becoming part of layer 24b is defined as the "shear plane", and may be located at or below the bottom 36 of roller 30 depending on material characteristics and other system parameters.

The location of this shear plane may be found experimentally by performing one or more recoating operations wherein roller clearance RC is varied starting with a roller clearance RC equal to the desired building material layer thickness and measuring the resulting actual building material layer thickness. If the resulting actual building material layer thickness is found to be equal to the desired building material layer thickness, then the shear plane is located exactly at the bottom 36 of roller 30. Therefore, for the rotational velocity 32, translational velocity 34, dam spacing T, layer thickness, build temperature and resin used in the experiment, the appropriate roller clearance RC is equal to the desired building material layer thickness and roller gap RG is equal to zero.

Alternatively, if the resulting layer thickness is less than desired, the effective shear plane is located a distance below the bottom 36 of roller 30. In this case, successive recoating operations may be performed where roller clearance RC is increased and the resulting coating thicknesses measured until the desired building material layer thickness is achieved. When performing a successive recoating operating, it is suggested that roller clearance RC be varied by an amount equal to the difference between the actual coating thickness achieved and desired layer thickness. As before, once a coating thickness equal to the desired layer thickness is achieved, one may conclude that roller clearance RC and roller gap RG have been characterized for effective object building.

If it is determined from the initial recoating experiment that the actual measured layer thickness is greater than the desired layer thickness, additional coating processes and measurements may be made by varying one or more of the recoating parameters until a coating thickness equal to the desired layer thickness has been achieved with the appropriate characterization of recoating parameters.

Two reasons which may account for a building material layer being too thick are: (1) rotational velocity 32 being higher than translation velocity 34 while simultaneously having a shear plane located very close to roller 30 and/or (2) distance T between roller 30 and dam 54 being too large thereby forming too thick a boundary layer 55. Therefore, in modifying recoating parameters in successive recoating experiments to reduce the actual coating thickness to that desired, it is suggested that the above two variables be modified.

It is generally suggested that roller clearance RC and roller gap RG not be adjusted independently since it is believed that roller clearance RC should be essentially equal to roller gap RG plus one layer thickness. However, if super elevation is used during sweeping, as is typical when using a doctor blade as explained in this application's parent application, roller clearance RC and roller gap RG may be adjusted independently. It is possible that these parameters also be independently adjusted for other reasons.

The thickness of the coating actually formed as compared to desired thickness is of primary concern. Because the recoating parameters can be readily adjusted to achieve correspondence between these thicknesses, it is of secondary concern to characterize the exact relationship between T and W and between W and the location of the shearing plane. However, knowledge of trends generally associated with these relationships may aid in speeding the experimental determination of appropriate recoating parameters.

It is preferred that boundary layer 55 formed on roller 30 provide the shear force at the shear plane instead of roller 30 being completely or partially dried of material 16 by dam 54. This is because the wetted surface of boundary layer 55 interacts with layer 24a less disruptively and more consistently than would a partly dry and partly wetted surface of roller 30.

Under typical conditions it is estimated that the low point 36 of roller 30 will be swept in a plane above working surface 26, i.e., the surface of the final building material layer 24b, by a thickness, i.e., the roller gap RG, somewhere between zero and T, inclusive. It is further anticipated that the roller gap RG will be closer to T than zero and will be equal to the distance separating the shear plane from roller 30. In any event, as roller 30 sweeps across vat 14, any material 16 located above the shear plane will be removed leaving behind the smoothed building material layer 24b having a working surface coplanar with the desired working surface 26.

As mentioned above, roller 30 is rotated and translated such that the net sum of its (a) rotational velocity, i.e., tangential velocity, 32 at or near a point 36 where roller 30 contacts working surface 26, i.e., the angular velocity of the roller multiplied by the roller radius and (b) its translational velocity 34, is greater than either the rotational or translation velocities 32,34 taken alone. The ratio of translational velocity to rotational velocity is preferably in the range of 1/6 to 6, but this ratio is more preferably in the range of 1 to 4. As a specific example, the preferred rotational velocity 32 is 2 inches per second while the preferred tangential velocity 34 is 2 inches per second when Ciba-Geigy photopolymer resin SL 5131 is used.

It has been experimentally found that as viscosity decreases, rotational velocity 32 typically increases relative to translational velocity 34. Therefore when using preferred photopolymer resins SL 5170 or SL 5180 (sold by 3D Systems, Inc. of Valencia, Calif.) which have much lower viscosities than SL 5131, it is anticipated that preferred translational velocities 34 be in the range of 1 to 4 inches per second while preferred rotational velocities 32 be in the range of 2 to 16 inches per second. The most appropriate values for both translational and rotational velocities for given circumstances can be determined experimentally. It has furthermore been determined experimentally that within reasonable ranges of translational and rotational velocities, increases in rotational velocity 32 appear to have a tapering-off differential effect.

The diameter of roller 30 is preferably between ¼ to 3 inches, but is more preferably between ½ and 2 inches, and most preferably approximately 1 inch. The preferred roller 30 exhibits a diameter tolerance of plus/minus 0.0002 to 0.0004 inch per linear inch, and also a maximum diameter variance of 0.0005 inch. The tight dimensional tolerances of roller 30 serve to maintain the accuracy of building material layers 24 and of subsequently formed object cross-sections as well as of the overall object 12 itself.

Alternatively, roller 30 may include a knurled or other machined or wrapped surface which serves to receive material 16 thereby providing a foundation for roller boundary layer 55. The surface of roller 30 may comprise Teflon or other surface release agent. However, in this configuration, it is still preferred that a boundary layer 55 form on roller 30 so as to ensure that the roller surface is wetted when contacting the surface of the initial building material layer 24a as described above.

Referring now to FIGS. 3a–3c, counter rotating roller embodiments including dam 54 are further discussed. FIG. 3a shows dam 54 preventing over-the-top transfer. Dam 54 may comprise a rigid and lightweight material such as aluminum that will withstand accumulation 46. Dam 54 may alternatively comprise other metal materials such as stainless steel, a flexible material such as rubber or brushes or hardened stereolithographic building materials or the like. The configuration of the dam 54 may be that of a rectangular bar, a comb with teeth, multiple longitudinal or transverse elements, the various doctor blade configurations presented in the parent application to the instant application, combinations thereof and the like. Dam 54 may also include a Teflon or other coating on its surface to help control the interaction between accumulation 46 and the roller surface. As a further alternative, dam 54 may comprise a second roller (not shown) which rotates in the opposite direction as roller 30 and mounted so that a gap which provides a roller boundary layer 55 of desired thickness, exists therebetween.

As discussed in connection with FIG. 2e, dam 54 will gauge how much material 16 stays in contact with roller 30 past dam 54. Though material remaining in contact with roller 30 preferably serves as roller boundary layer 55, in the most preferred embodiments excessive amounts of material 16 should not pass by dam 54 to avoid disturbing working surface 26 left in the wake of roller 30. As discussed above, material carried over the top will generally be deposited in a uniform manner but with excess thickness. Thus in embodiments where thicker building material layers 24 are acceptable, over-the-top transfer may be effectively used when building object 12.

The embodiment including reverse roller 30 and dam 54 may also be used in connection with the object building techniques described in U.S. Ser. No. 08/148,544, entitled Thermal Stereolithography, filed Nov. 8, 1993, now U.S. Pat. No. 5,501,824 the disclosure of which is incorporated as if fully set forth herein.

FIG. 3a shows dam 54 positioned directly over roller 30. With this configuration, accumulation 46 tends to build up as roller 30 sweeps across working surface 26 as shown. If accumulation 46 becomes too large, it could slump down into vat 14 in front of roller 30 which could adversely affect the uniformity of building material layer 24b. Accordingly, care is preferably taken to monitor accumulation 46 to prevent this occurrence. This can be done simply by ensuring that the initial thickness of layer 24a is not so great as to overload the capacity of roller 30 for a given rotational velocity 32 and maximum sweeping area.

At the end of the sweep, roller 30 and dam 54 may be temporarily kept in place to avoid accumulation 46 from spreading throughout vat 14 which could inappropriately raise working surface 26 and disturb the uniformity and desired thickness of layer 24. After working surface 26 has been impinged by synergistic stimulation, accumulation 46 may then be released so that the accumulated material may be later used in the object building process. Either before or after exposure, but preferably after, the direction of rotation and sweeping may then be reversed and the next building material layer 24 formed.

Alternatively, the proper surface level in vat 14 for regions away from object 12 may require that accumulation 46 be reincorporated into the volume of material in vat 14 prior to exposure. Therefore, the material in accumulation 46 may be released by stopping or slowing rotational velocity 32 or by increasing the gap T. As a further alternative, roller 30 may cease its translation motion in a side trough (not shown) of vat 14 so that the amount of material 16 in accumulation 46 does not affect the surface level in vat 14.

FIG. 3b shows dam 54 positioned at an angle such that accumulation 46 is largely formed over roller 30 and not in front of it. This reduces the risk of accumulation 46 slumping into vat 14. In any event, wherever dam 54 is positioned relative to roller 30, it may be attached to the same frame which holds roller 30. Dam 54 may be attached to the frame such that its position may be varied as a sweep occurs. For example, dam 54 may be positioned directly over roller 30 as in FIG. 3b but as an accumulation 46 starts to form, dam 54 may be appropriately moved back so that it is angled as in FIG. 3b. That dam 54 is movably attached to the frame would also allow it to be moved into alternating positions so that roller 30 could be used to sweep working surface 26 in both directions. This embodiment may also allow an effective means to remove accumulation 46 off roller 30 after sweeping across vat 14. With this alternative however, care should be taken to maintain a constant gap between dam 54 and roller 30 so as to maintain the desired roller boundary layer 55 thickness W.

Figure 4A:
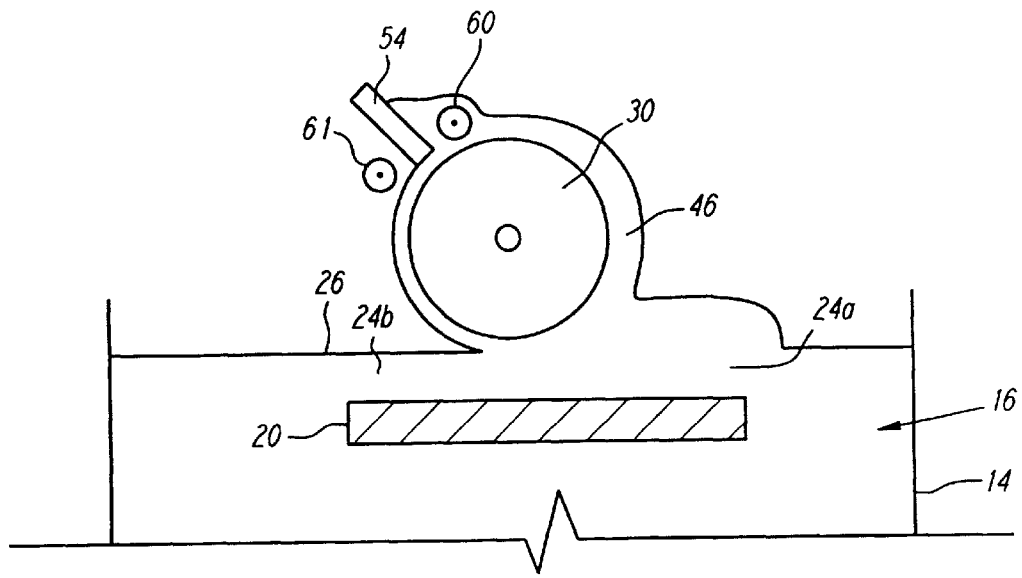
FIG. 4a shows an apparatus and method for forming a building material layer using a counter rotating roller, dam and a screw.
Figure 4C:
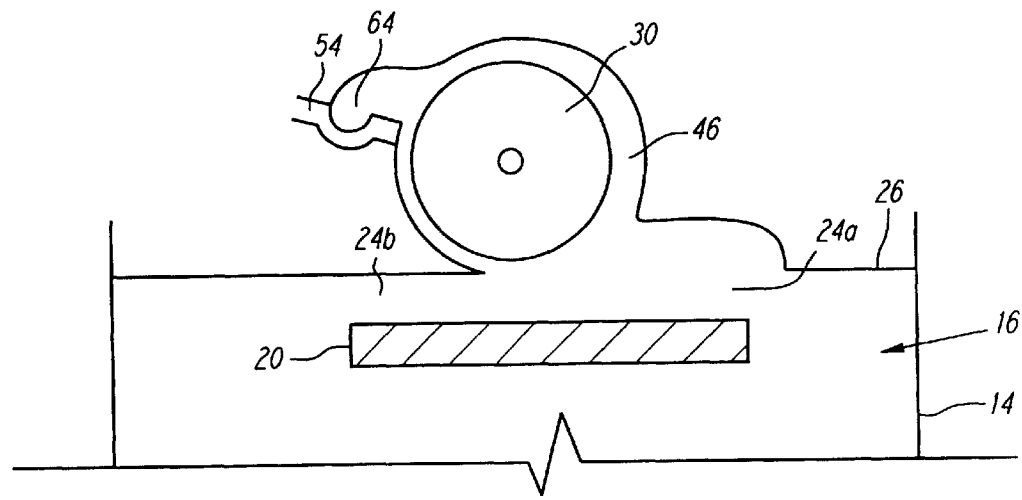
FIG. 4c shows an apparatus and method for forming a building material layer using a counter rotating roller, dam and a trough.
Figure 4B:
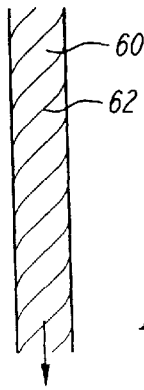

Referring now to FIGS. 4a–4d, alternative embodiments including a counter rotating roller 30, dam 54 and material transportation device 60 are shown. In FIG. 4a, as roller 30 sweeps over working surface 26, accumulation 46 forms. However, because dam 54 is positioned at an angle, accumulation 46 tends to flow over the top of roller 30 and encounters a material transport mechanism 60 such as a screw having threads 62 as shown in FIG. 4b. Screw 60 may be attached to the frame which holds roller 30 and dam 54, and preferably rotates. As the material of accumulation 46 reaches screw 60, the material flows between threads 62 and is transported toward one end of screw 60 due to the screw's rotation. This transportation of material also reduces the size of any accumulation 46 which still might form in front of roller 30. This in turn avoids all or a portion of such an accumulation 46 preceding roller 30 slumping into layer 24 due to its weight. To aid in allowing this configuration to be used with alternating sweeping directions, a second transportation device (not shown) may be located below dam 54. These material transportation devices may then alternate between running dry and transporting material from layer to layer.

Preferably, screw 60 is long enough so that as material is transported to its end, the material may be redeposited into vat 14 at a location, such as the vat's periphery, which will not interfere with the uniformity of that portion of working surface 26 which is to be exposed to synergistic stimulation. Alternatively, the transported material may be directed to a reservoir (not shown) separate from vat 14. As a further alternative, the reservoir may also be coupled to the bottom of vat 14 below working surface 26 so that working surface 26 is not disturbed upon the material being reintroduced into vat 14.

Figure 4D:
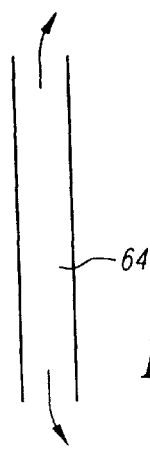
FIG. 4d is a top view of the trough of FIG. 4c.

FIG. 4c shows another embodiment where material of accumulation 46 is transported away. Here, as accumulation flows over the top of roller 30, it encounters a trough 64 which may be incorporated into dam 54. Material entering trough 64 is then transported away as shown in FIG. 4d. Trough 64 may be angled downward toward its ends so that gravitational force facilitates material transportation. In any event, trough 64 is preferably long enough so that material is redeposited into vat 14 at a location which does not interfere with working surface 26 uniformity, or deposited into a separate reservoir. Again, this material transportation reduces the amount of material which might accumulate in front of roller 30, and avoids such an accumulation 46 slumping into layer 24. Other types of material transportation devices 60 may be used to reduce accumulation 46 such as pumps, suction devices, and various other types of conveyor systems.

Figure 5A:
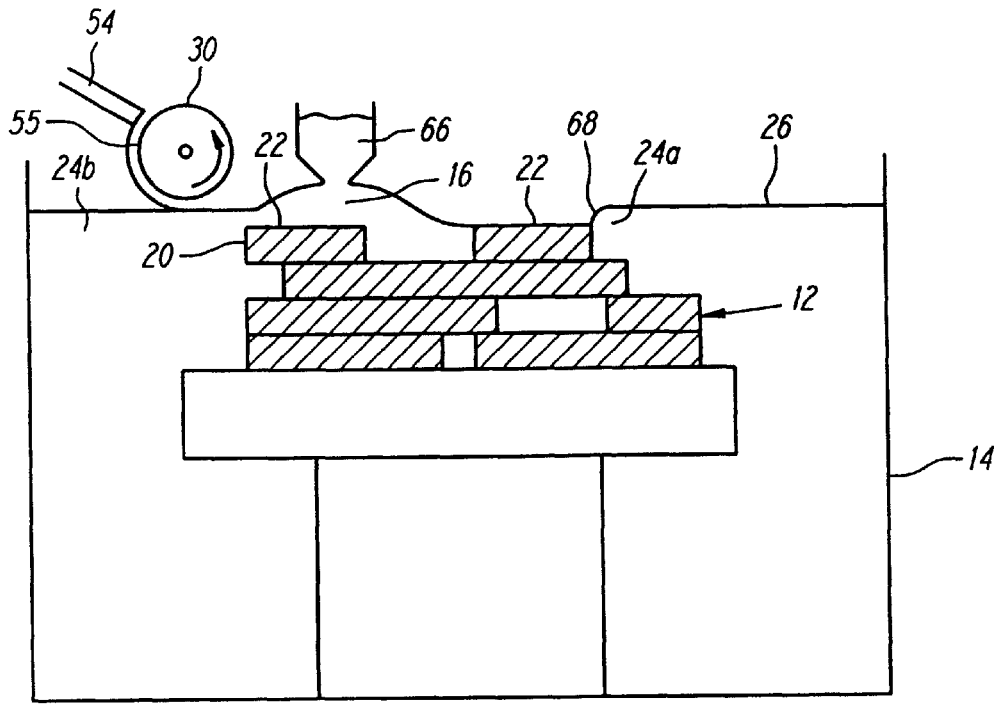
FIGS. 5a–5b show an apparatus and method for forming a building material layer using a counter rotating roller, dam and a dispenser.
Figure 5B:
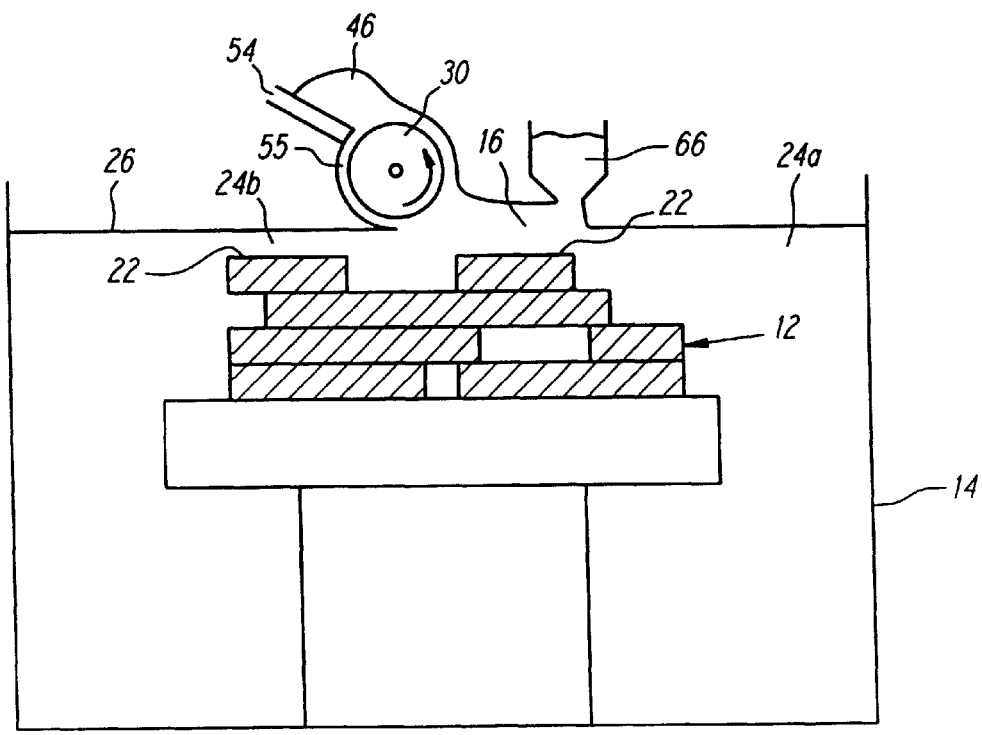

FIGS. 5a–5b show another embodiment using a counter rotating roller 30, dam 54 and dispenser 66. As shown, building material layer 24a is initially formed using dispenser 66 which may pull material from a separate reservoir and deposit it into vat 14 to raise working surface 26. Alternatively, dispenser 66 may extract material from vat 14 and dispenses it above object 12 in combination with lowering object 12 one layer thickness thereby holding the working surface 26 at an essentially fixed level. FIG. 5a shows the type of initial building material layer 24a that may be formed when dipping only a single layer thickness where boundary 68 is formed all around the periphery of surface 22 due to viscosity and surface energy effects which prevent material 16 from flowing, in a sufficiently rapid manner, over surface 22. This boundary 68 is shown in FIG. 5a at the right side of surface 22, the left side boundary already having been eliminated as discussed below.

The embodiment of FIG. 5a shows dispenser 66 which contains building material 16 and which sweeps across working surface 26 followed by roller 30 and dam 54. Dispenser 66 provides building material 16 above the last formed object cross-section 20, which dispensed material is then transformed into a uniform building material layer 24b by roller 30. The material 16 dispensed by dispenser 66 is preferably extracted from vat 14 itself. Though the surface level of material 16 in vat 14 may thereby be somewhat lowered, the surface level is restored upon the dispensing as shown in FIGS. 5a–5b. When extracting material from vat 14, the material may be initially placed in a pump cylinder (not shown) or the like, and then transferred to dispenser 66. Depending on the exact timing between filling and emptying the pump cylinder, and filling and emptying dispenser 66, the net surface level of material 16 in vat 14 may be raised or lowered.

As discussed above, roller 30 may translate across working surface 26 at a height above surface 22 equal to the desired thickness of the final building material layer 24b adjusted by some additional distance which accounts for the thickness of material which may be redeposited from the boundary layer into layer 24b. As noted previously this additional amount is anticipated to be between zero and T.

The height at which roller 30 translates above working surface 26 may also be adjusted for shrinkage associated with material solidification and the other effects discussed above. Dam 54 operates in similar fashion as described in the above embodiments. Dispenser 66 may also be attached to the frame which holds roller 30 and dam 54. Alternatively, dispenser 66 may be attached to a separate frame (not shown). As dispenser 66 provides material over surface 22, boundary 68 is broken as the dispensed material 16 merges with that portion of building material layer 24 and working surface 26 already existing as shown in FIG. 5a. Counter rotating roller 30 then follows dispenser 66 to render layer 24 uniform and of desired thickness.

FIG. 5b shows dispenser 66, roller 30 and dam 54 further along during a sweep over initial layer 24a. Here, the boundary 68 on the right end of surface 22 has been eliminated by the dispensed material 16. Also at this point, roller 30 has smoothed a portion of layer 24a to partially form layer 24b, i.e., layer 24. Accumulation 46 is also transported over the top of roller 30 due to the angular position of dam 54. Because accumulation 46 does not precede roller 30, its weight will not cause it to sink or spread into layer 24. An accumulation 46 in front of roller 30 would tend to sink more readily into a large trapped volume than it would in a portion of layer 24 that was supported by surface 22 because in a trapped volume, there is a larger flow path to other areas of vat 14 which provides less resistance to flow and thus more rapid redistribution of material 16.

The frame or other means which holds roller 30, dam 54 and dispenser 66 may be adjustable so that the order in which these components are positioned may be reversed. This allows the dispensing and sweeping action to occur in either the left or right directions across vat 14.

A variation to the embodiment of FIGS. 5a–5b may involve dispensing the building material layer 24 onto the object 12 without any dipping at all. Here, after the last object cross-section 20 is formed, object 12 may remain stationary and dispenser 66 may simply dispense a layer of building material 16 over object 12 as well as over the surface of the building material 16 surrounding the top surface 22 of the last formed object cross-section 20. Roller 30 would then smooth the building material layer 24 to the desired thickness while reducing or eliminating any surface imperfections. In this embodiment the working surface 26 may rise with the addition of each subsequent layer or alternatively it may remain stationary if the entire vat 14 or floor of the vat 14 is lowered one layer thickness. In a further alternative, dispenser 66 may dispense more than one layer thickness worth of building material 16 and the amount in excess may be removed by an extraction device which is either controlled in relation to the exact amount dispensed, by a level detection system, or more preferably both.

Figure 5C:
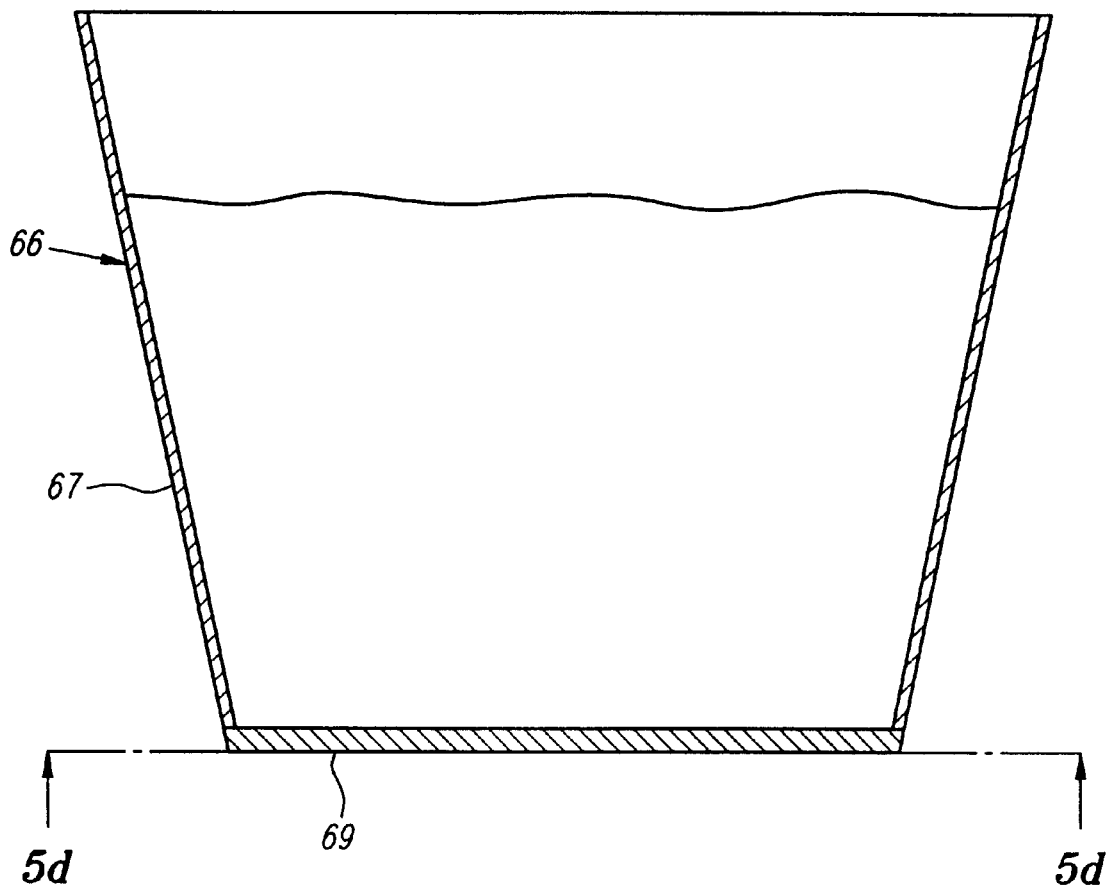
FIG. 5c is a side sectional view of the dispenser of FIGS. 5a–5b.
Figure 5D:
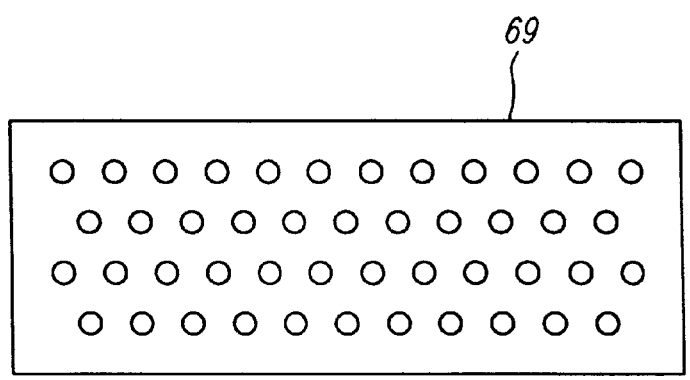
FIG. 5d shows an orifice network of the dispenser of FIGS. 5a–5c.

Referring now to FIGS. 5c–5d, a preferred embodiment of dispenser 66 is shown in more detail. Dispenser 66 may include sloped walls 67 to facilitate dispensing of material. Dispenser 66 may also include a mesh or apertured bottom 69 which delivers resin to surface 22 in a preferably uniform fashion. FIG. 5d shows apertured bottom 69 in a view indicated along lines 5d–5d of FIG. 5c. Other configurations of the dispensing apertures may be used including one or more slots or other hole patterns. For a building material comprising Ciba-Geigy resin SL 5149 or SL 5154, the diameter of the apertures preferably ranges from about 0.020 inches to greater than 0.100 inches to avoid clogging. However, the preferred diameter may vary according to viscosity, surface tension and other material properties.

Figure 6A:
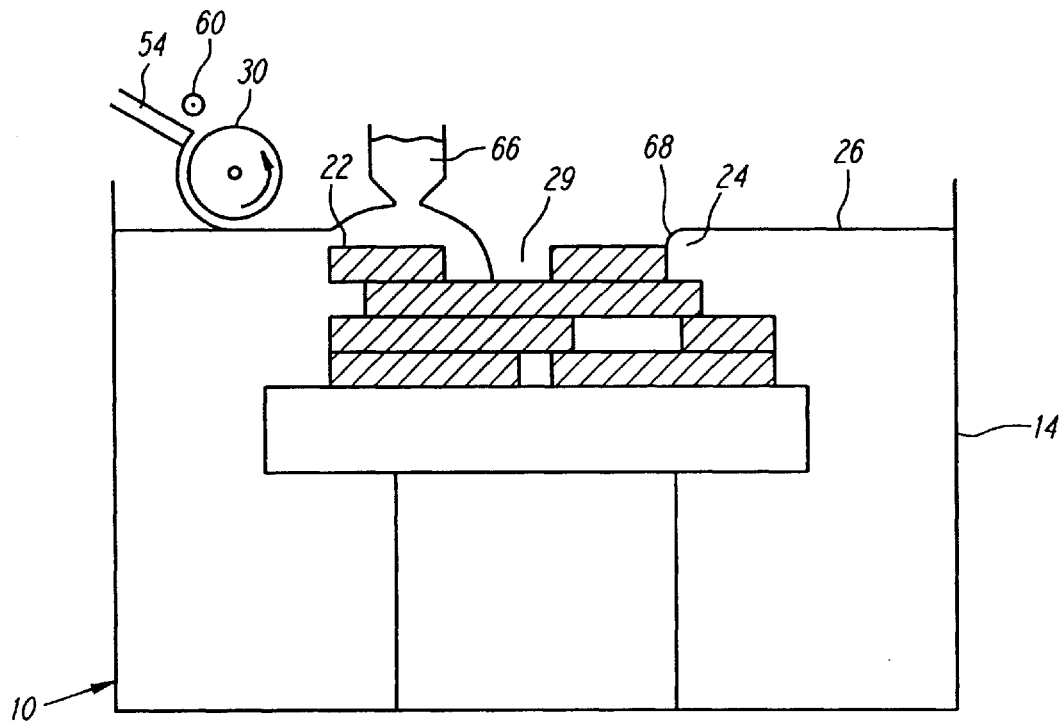
FIGS. 6a–6b show an apparatus and method for forming a building material layer using a counter rotating roller, dispenser, dam, and a screw.
Figure 6B:
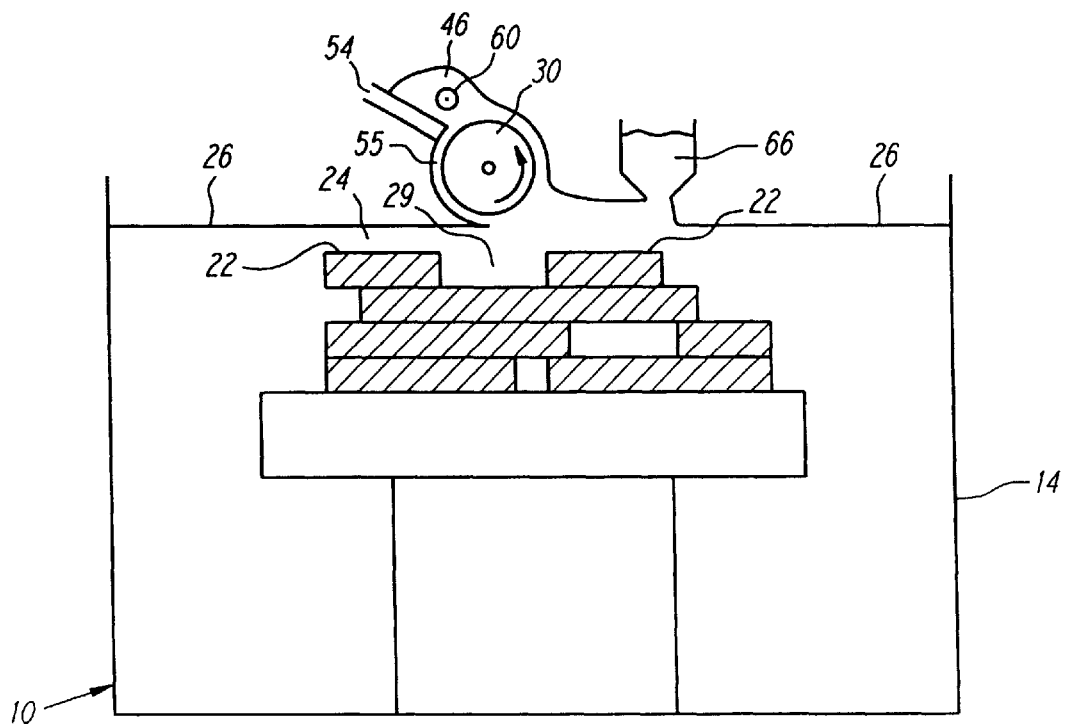

FIGS. 6a–6b show the embodiment of FIGS. 5a–5b along with the transportation device 60 shown in FIGS. 4a–4b. Here, accumulated material 46 may be transported away to a location in vat 14 that does not interfere with that portion of working surface 26 that is to be impinged upon by synergistic stimulation, or may be transported to a separate reservoir. As noted previously, this transportation of material serves to further decrease any accumulation 46 which may still precede roller 30 which in turn reduces the chance of accumulated material slumping into working surface 26 in front of roller 30.

In an alternative embodiment, dispenser 66 may dispense material directly onto roller 30 before the dam, or if thicker coatings are desired, without using a dam. When using a dam, it is still preferred that the separation T between dam 54 and roller 30 is such that a boundary layer 55 of appropriate thickness is formed so that a coating of one layer or other desired thickness is deposited in the wake of roller 30. In this alternative, if dispenser 66 is located in proximity to roller 30, the rear arm of dispenser 66 may be used as the dam.

Preferably, synergistic stimulation is applied after completion of sweeping. If multiple sweeps are used to form layer 24, exposure may begin during a final sweep. A delay may also be set between the completion of sweeping and beginning of exposure to allow minor surface imperfections to settle. Alternatively, where multiple sweeps are used to form layer 24, exposure may begin prior to completion of the first sweep.

Where greater flexibility of recoating parameters is necessary to achieve desired coating thicknesses and uniformities, the various parameters discussed above may be manually adjusted or preferably computer controlled during the building of object 12. These types of adjustments might be useful when layer thickness is varied during object building, when temperature changes occur during object building, or when building materials are switched so that manual operator intervention is not necessary. For example rotational velocities, translational velocities, roller clearance, roller gap, and sweeping distance can be varied from sweep to sweep. Similarly, in embodiments using dispenser 66, the rate at which material 16 is dispensed may be varied.

The previously discussed embodiments may be used with various types of doctor blades in connection with roller 30 to adjust the thickness of initial layer 24a and to otherwise help prepare building material layer 24 for forming the next object cross-section. Reservoirs (not shown) may be located on each side of vat 14 which serve as start points and endpoints for the movement of roller 30. At these reservoir locations, any building material 16 still remaining on roller 30 may be removed, and any accumulation 46 formed on roller 30 and/or dam 54 may be dumped. As with all the embodiments described herein, independent liquid leveling techniques may be used to ensure that working surface 26 exists at the plane of the desired working surface.

As noted previously, a second roller may be added which rotates in the opposite direction as the first roller and which can more readily allow alternating sweeping directions to be used. The vertical position of each roller may or may not be adjustable so as to only allow one roller to contact the building material during each sweep across vat 14. In some situations it may be found useful to employ multiple dams.

Additional embodiments may be derived by combining the teachings of the separately presented embodiments in this section together. Further embodiments may also be derived by combining the teachings herein regarding reverse rollers with the teachings regarding other recoating techniques discussed below.

INK JET RECOATING

An alternate embodiment of the current invention involves an ink jet print head recoater 100 as shown in FIGS. 7a–7g. The following patents relating to ink jets are incorporated by reference as if fully set forth herein:

| U.S. PAT. NO. | TITLE | TOPIC |
|---|---|---|
| 4,383,264 | Demand Drop Forming Device with Interacting Transducer and Orifice Combination | Basic technology of ink jet printing. |
| 4,873,539 | Phase Change Ink Jet Apparatus | Basic Dataproducts' ink jet technology. |
| 4,833,486 | Ink Jet Image Transfer Lithographic | Non-traditional application of ink jets. |
| 4,659,383 | High Molecular Weight, Hot Melt Impulse Ink Jet Ink | Materials capable of being jetted. |
| 4,822,418 | Drop on Demand Ink Jet Ink Comprising Dubutyl Sebecate | Materials capable of being jetted. |
| 5,021,802 | Thermally Reversible Sol-Gel Phase Change Ink or Bubble Jet Ink | Materials capable of being jetted. |
| 5,041,161 | Semi-Solid Ink Jet and Method of Using Same | Materials capable of being jetted. |

Further background information on ink jets can be found in the publication entitled "Ink-Jet Printing", by J. Heinzl & C. H. Hertz, in ADVANCES IN ELECTRONICS AND ELECTRON PHYSICS Vol. 65, 1985, published by Academic Press, Inc. This publication is also incorporated by reference as if fully set forth herein. In the context of this application, the term "ink jet" refers to the dispensing of building material in the process of forming objects as opposed to either the traditional use of dispensing ink in a selective printing process, or the use described in U.S. Pat. No. 4,575,330 wherein "ink jets" may be used to dispense a reactive chemical to cause solidification of a building material in a stereolithographic process.

In this embodiment, an array of ink jets dispense droplets of building material from above the surface to be coated. Upon contacting the surface, the individual droplets flatten out and merge with adjacent droplets to form a building material layer. As discussed below, it has been found that layers as thin as 0.5 mil or less may be formed which provides the opportunity to produce high resolution objects.

Figure 7A:
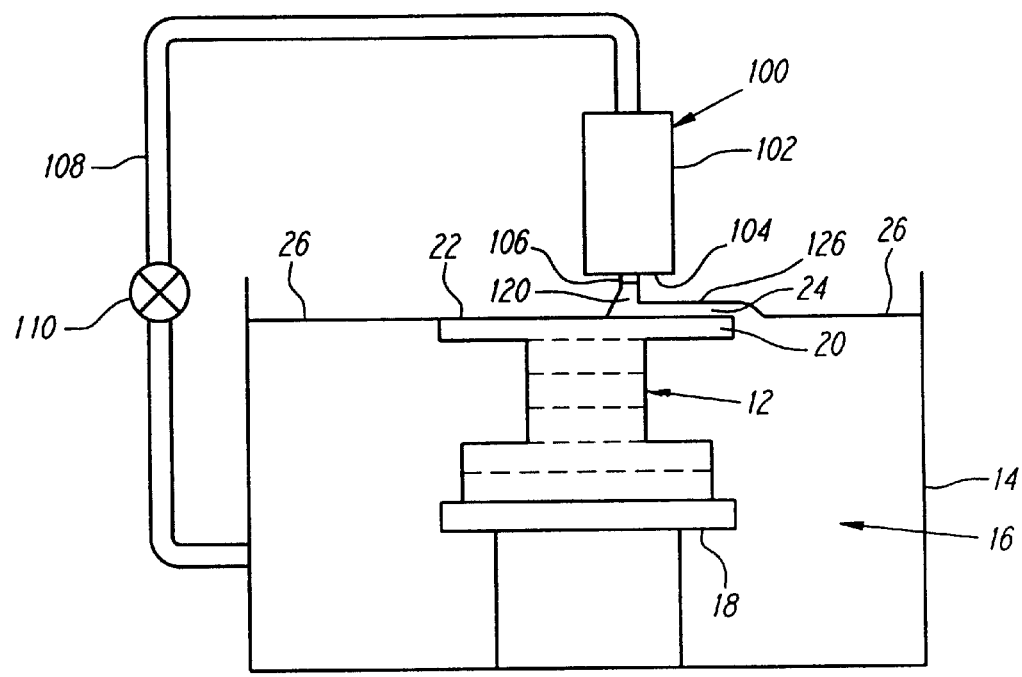
FIG. 7a shows an ink jet print head dispensing building material.

As shown in FIG. 7a, ink jet print head recoater 100 includes ink jet print carriage 102 having a bottom surface 104 in which an array of ink jets 106 is configured. Recoater 100 may be mounted to the SLA by a frame (not shown) that allows recoater 100 to translate across vat 14 and dispense building material layers from above. Movement of recoater 100 as well as the amount of material dispensed therefrom preferably occur under computer control. Because ink jets may dispense a coating of uniform and desired thickness, other recoating elements may not be required. For example, the use of a doctor blade may not be required to supplement the ink jet coating formation process but in some embodiments, a doctor blade may advantageously be used on periodic layers to eliminate any accumulated errors that may have built up. In this type of application, a doctor blade might be used, for example, on every 20th layer or every 200th layer. In any event, removing the need for a doctor blade advantageously removes the problems associated with doctor blades as discussed previously. An ink jet recoating system as described herein which may include one or more ink jet heads and a translation system, may be incorporated into current stereolithography machines in place of the doctor blade recoating system.

A flexible feeder line 108 for supplying material to ink jets 106 may be coupled to carriage 102. Carriage 102 may include internal passageways (not shown) to direct building material 16 received from line 108 to each ink jet 106. Alternatively, feeder line 108 may itself branch into multiple lines, each connected to an ink jet 106.

As shown in FIG. 7a, feeder line 108 may extend from vat 14 and include pump 110 to provide material 16 directly from vat 14 to recoater 100. Alternatively, material may be supplied from one or more other sources such as separate reservoirs thereby allowing portions of object 12 to be selectively formed of different materials. This provides that object 12 may include portions which conduct electricity, are flexible to provide a hinge or other flexible object feature, or are of different colors, hardnesses or have other chemical or physical differences. This also provides that interior portions of object 12 may be coated with a "non-building" material such as wax which can be removed to form an investment casting mold.

Carriage 102 may be long enough to span a significant portion of vat 14. In this configuration, a single carriage 102 may provide a building material layer 24 from a single traverse of vat 14. Alternatively, a plurality of carriages 102 may be used to traverse different portions of vat 14 in a band-wise fashion. For example, four (4) carriages 102 may be used, one in each quadrant of vat 14. As a further alternative, a single carriage 102 may traverse over different portions of vat 14 until a sufficient building material layer 24 is formed. In any event, after layer 24 is formed, carriage(s) 102 are preferably located at the periphery of vat 14 to avoid interfering with the source of synergistic stimulation 28. Alternatively as with the counter rotating roller embodiments described above, carriage 102 and any positioning hardware still located within the building region of the vat may simply be located outside the region to be exposed when forming the next object cross-section from the dispensed layer 24.

Figure 7B:
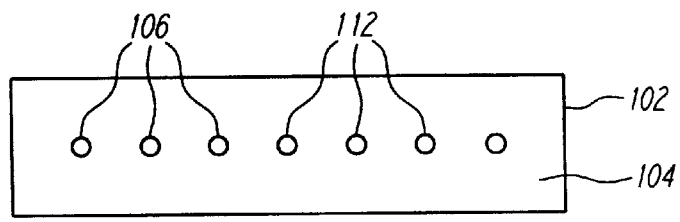
Figure 7C:
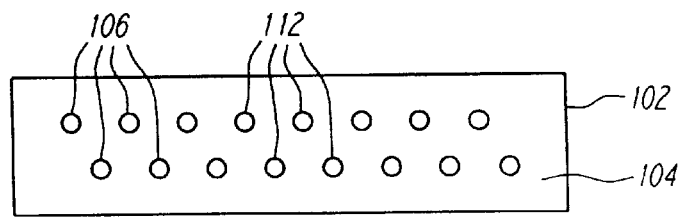

Referring now to FIGS. 7b–7d, alternate configurations for the ink jet 106 array of bottom surface 104 are shown. Ink jet 106 arrays may include any number of ink jets 106 to increase the volumetric flow of material dispensed which in turn is preferable for forming larger objects. Increased volumetric flow may also lessen the time required to form successive building material layers thereby decreasing overall object build time.

In any event and as noted above, each ink jet 106 dispenses droplets of material which upon contacting the surface to be coated, flatten and merge together. Accordingly, ink jets 106 are preferably spaced closely enough so that droplets dispensed therefrom are also close enough to merge upon contacting the surface. The effective spacing between ink jets 106 may also be varied by the positioning of carriage 102 as it traverses vat 14. As shown in FIG. 7d for example, the ink jet 106 configuration is similar to that of FIG. 7b but the angling of carriage 102 in relation to its direction of translation, effectively reduces the distance between ink jets 106.

The optimum spacing of ink jets 106 varies with factors such as the size of droplets to be dispensed, the type of building material used, the desired resolution of the object to be formed as well as other factors. First, the spacing of ink jets 106 may generally increase with increasing droplet size. This is because when flattened upon contacting the surface to be coated, larger droplets cover a larger area and thus will merge with other large droplets though spaced further away.

Second, as material viscosity of the building material increases, the orifices 112 of ink jets 106 through which the material passes upon being dispensed, must also generally increase. This is primarily because materials with higher viscosities may generally tend to clog ink jets 106 having small orifices 112. Because orifices 112 are thus larger with more viscous materials, the droplets will be larger thereby allowing ink jets 106 to be spaced further apart. However, this must be balanced against the fact that droplets of more viscous materials will flatten and merge more slowly. Accordingly, orifices 112 are preferably still spaced closely enough to permit droplet merger.

In any event, the viscosity of material 16 should not exceed the operating requirements of ink jets 106. High resolution ink jet dispensers typically require the viscosity of material 16 to be less than 50 centipoise, and preferably less than 30 centipoise at operating temperature. Medium resolution ink jet dispensers typically require that material 16 viscosity be less than 500 centipoise. Though material 16 may be heated to lower its viscosity, care must be taken where material 16 comprises a photo or thermal polymer because acceptable levels of heating is limited by the stability of the monomers contained therein and practical monomers are limited to temperatures of less than one hundred (100) degrees Centigrade. Furthermore, if material 16 is dispensed and solidified at an elevated temperature, it may distort even more upon solidifying due to thermal shrinkage. However, this limitation is mitigated to the extent that the material 16 may cool before solidification.

Third, objects requiring higher resolution are generally formed from thinner building material layers and to form thinner layers, smaller droplets are generally used. Accordingly, ink jets 106 are preferably spaced closer together and at least closely enough so that the dispensed droplets merge when flattened upon contacting the surface to thereby rapidly form a uniform building material layer 24. Besides providing for higher resolution objects, smaller droplets dispensed from more closely spaced ink jets 106 may also decrease object build time. That is, droplets which are closely spaced will require less time to level out after contacting the surface and merging. This enables working surface 26 to form more quickly thereby decreasing the time required before synergistic stimulation may be applied. Materials having lower viscosity and surface tension also level out more quickly after contacting surface and thus also help reduce build time.

Ink jet recoating may decrease object build time regardless of which droplet size is used because the downward force of the "rain" of dispensed droplets is relatively small so as to avoid disturbing the last formed object cross-section 20 as it solidifies. For example, where the last formed object cross-section 20 comprises an irradiated photopolymer, a certain amount of time may be required to pass before the photopolymer has sufficiently cured for layer 20 to exhibit the strength of a solid or pseudo-solid. If building material layer 24 is formed over layer 20 before a sufficient cure time has passed, the force of material 16 flowing over layer 20 such as that which occurs during deep dipping, may actually "wash away" the essentially still-liquid object cross-section 20. However, because the force of ink jet droplet rain is relatively small, layer 20 will generally not be washed away even though the time necessary for some minimum cure has not passed. Accordingly, layers of object 12 may be formed in more rapid succession.

Several commercially available ink jet print heads 100 are suitable for use in this embodiment. An ink jet print head having an orifice 112 diameter of 2 mils is model no. HDS 96 manufactured by Spectra, Inc. of Hanover, N.H. This ink jet may dispense a droplet that flattens upon contacting the surface to be coated to a disk having a thickness between one-half (0.5) and one (1) mil, and a diameter between four (4) to six (6) mils. To achieve a disk of these dimensions, it is preferred that bottom surface 104 of the ink jet head be about 1 to 2 mm above the top surface 22 of the last formed object cross-section 20.

The preferred embodiment includes a carriage 102 with two (2) of the Spectra HDS 96 print heads, each print head comprising 96 individual jets or orifices 112 in their bottom surfaces 104. Dispensing is controlled whereby carriage 102 translates at 56 inches per second, and each ink jet array 106 discharges droplets at a rate of 16,000 droplets per second amounting to 300 droplets discharged per inch. In this configuration, a 0.0005 inch layer may be created over a 12" by 12" area in approximately 5 seconds.

An ink jet print head capable of jetting droplets having a diameter between six (6) to ten (10) mils is Model No. INZX050050CC manufactured by Lee Corporation of Westbrook, Conn. which fires droplets at a maximum rate of 1,200 droplets per second. Though larger droplet sizes may decrease resolution, carriages 102 dispensing larger droplets are less expensive, may dispense material at a greater volumetric flow rate which is beneficial when forming thicker layers, and may typically dispense a wider range of materials because larger viscosities may be accommodated. Dataproducts of Woodland Hills, Calif. also manufactures ink jet heads that may be used with this ink jet recoating technique.

Several examples showing the relationship between thickness of layer 24 and drop size are now discussed to illustrate the parameters of interest. First, with the Spectra HDS 96 print head providing droplets of about 2.2 mil diameters, a "drop" volume of 100 picoliters (100E-12 liters) results based on the relationship that volume=$(4/3)\pi r^3$. If the 100 picoliters is printed at a rate 300×300 drops per inch, the resulting layer 24 is about 0.55 mils. Second, with the Lee INZX050050CC print head providing droplets of about 10 mils, the drop volume is 1,800 picoliters. At a drop rate of 100×100 drops per inch, the resulting layer 24 is about 1.1 mils.

Embodiments of ink jet recoating reflecting the above concepts and advantages are discussed below. Referring again to FIG. 7a, the top surface 22 of the last formed object cross-section 20 is typically at the same level as the working surface 26, i.e., the surface of the rest of material 16 in vat 14. Building material layer 24 may then be formed by each ink jet 106 providing a discharge 120 of material 16 as recoater 100 translates across vat 14.

A first embodiment involves the configuration whereby the material 16 supplied to ink jet print head 100 comes from vat 14. Here, as shown in FIG. 7a, recoater 100 has already traversed that portion of vat 14 to the right of surface 22. However, the level of material 16 remains substantially even with surface 22 because as material 16 is drawn from vat 14 by feeder line 108, recoater 100 essentially replaces this material 16 thereby keeping the volume of material 16 in vat 14 constant.

As recoater 100 traverses surface 22, discharges 120 form building material layer 24 of the desired thickness. However, for layer 24 thicknesses in the one-half (0.5) to ten (10) mil range which is of practical interest in stereolithography, the surface tension and viscosity of material 16 effectively immobilizes the material at the ends of layer 24 such that it will not flow over the ends of surface 22 and back into vat 14. Thus, the volume of material 16 in vat 14 decreases slightly by an amount equal to the volume of layer 24. As recoater 100 traverses the portion of vat 14 to the left of surface 22, the volume of material 16 again remains substantially constant because the withdrawn material is replaced by discharges 120.

After recoater 100 has traversed vat 14, the surface 126 of the material 16 dispensed on surface 22 is higher than the rest of vat 14 by the total of (a) the desired thickness of building material layer 24 and (b) the height which working surface 26 may have been lowered due to the lack of replenishment into vat 14 as surface 22 was traversed. Accordingly, to form a uniform working surface 26, platform 18 may be lowered by this cumulative height to result in the configuration shown in FIG. 7e. At this point, print head 100 is preferably located at the periphery of vat 14 and layer 24 is exposed to synergistic stimulation from a source of synergistic stimulation 28.

Material may be dispensed by ink jet recoater 100 in multiple passes over surface 22 so that a sufficient amount of material to form layers of the desired thickness has been dispensed. Furthermore, interleaving of droplet dispensing points may occur between multiple passes of the print head 100 to ensure that a more uniform coating is dispensed. Also to decrease dispensing time, additional printing heads may be added to the dispensing system thereby allowing faster dispensing rates.

If the assumption is made that there is no need to dispense material outside the area encompassed by the previously solidified object cross-section 20, and any associated trapped volumes, an alternative embodiment is possible where dispensing time may be reduced. As noted in the previous embodiment, under appropriate conditions the dispensing of material onto regions away from surface 22 nominally results in little gain. Accordingly, an alternative procedure for use in the foregoing embodiment involves simply dispensing material from ink jet head 100 only onto surface 22 and any associated trapped volume areas. After dispensing in this selective manner, the previously formed object cross-section 20 may be lowered one layer thickness. This lowering process properly positions the previously formed cross-section 20 relative to the desired working surface 26 and also brings the upper surface of the layer 24 over surface 22 to the same level as the rest of the material 16 in vat 14. Therefore, after a short delay wherein material in the boundary regions of the coating 24 above the previously formed cross-section 20 merges with the material 16 adjacent to these regions, exposure to form the next cross-section of the three-dimensional object may occur. Since less material is being dispensed by the ink jet heads 100, the recoating time for this embodiment may be reduced.

An alternate embodiment is shown in FIG. 7f and is similar to the previous embodiments except that platform 18 is first lowered a distance equal to the desired thickness of building material layer 24 prior to dispensing material from the ink jet dispenser 100. This results in boundary 68 forming around surface 22 wherein viscosity and surface tension effects typically prevent the material 16 surrounding surface 22 from flowing thereon. Recoater 100 may then be translated across vat 14 at only those locations where a surface of object 12 exists, i.e., over surface 22 including any trapped volumes. Building material layer 24 may then be dispensed to the desired thickness, upon the completion of which a uniform working surface 26 is formed without need for a short delay to allow merging of material across boundaries 68 as was discussed in connection with the previous embodiment. In any event, providing a short delay after dispensing may be used and may be desired in some circumstances.

RECOATING CRITICAL AREAS

In an alternate embodiment, much of the time savings associated with dispensing material only in selected locations, i.e., only over the surface 22 of the last-formed object cross-section 20 and any trapped volumes, is maintained while simultaneously ensuring that material is dispensed in all required locations.

As noted above in association with the counter rotating roller technique, only regions that are deep and connected by large flow paths will readily achieve a uniform level. Therefore, to ensure that shallow regions and regions poorly connected to the bulk of material 16 in the vat 14 are properly coated, the ink jet dispensers 100 preferably dispense material onto these regions. As noted above in connection with the counter rotating roller embodiment, the depth of a region for it to be considered shallow and possibly troublesome depends on the viscosity and surface energy of the building material and on the surface energy of transformed building material. And as also noted, shallow regions generally have depths of less than about 40 mils (1 mm) to about 240 mils (6 mm). Therefore in order to ensure adequate dispensing, it is preferred that ink jet heads 100 dispense material above all shallow regions having a depth less than 40 to 240 mils. For materials with relatively low viscosities, e.g., 1 to 100 centipoise, it is estimated that the shallow regions will include regions having a depth of no more than 40 mils or less. For materials with moderate viscosities, e.g., 100 to 1,000 centipoise, it is estimated that the shallow regions will include regions shallower than about 40 to 120 mils. When using materials with moderately high viscosities, e.g. 1,000 to 10,000 centipoise, the shallow regions may include regions having depths of up to 120 to 240 mils or more.

Under these conditions, layer or cross-sectional comparisons may be performed on the data descriptive of the cross-sections of object 12 to determine exactly what regions for each layer should be considered shallow regions. Layer comparison techniques are disclosed in U.S. patent application Ser. Nos. 08/233,027 and 08/259,333, now U.S. Pat. No. 5,481,470 filed on Apr. 25, 1994 and Jun. 16, 1994, respectively. These applications are incorporated by reference as if fully set forth herein.

To determine which regions are shallow and thus possibly troublesome, one may first determine or specify the depth at which a region is to be considered shallow. One may then divide the shallow region depth by the layer thickness to be used in forming object 12. The resulting quotient rounded upward represents the number of layers N that should be used in the layer comparison process. Next, the Boolean union of the regions contained in the previously solidified cross-section 20 and the regions contained in all N−1 immediately proceeding cross-sections is determined. The result of this union operation represents the shallow regions for the current layer which are preferably coated by ink jet heads 100. The determination of shallow regions for each layer may be determined prior to beginning formation of object 12 or alternatively determined as needed during object formation. A variety of Boolean operations may be used in deriving the desired data including union operations (+), differencing operations (−), intersection operations (×), as well as other operations.

The material in regions that are isolated from or poorly connected to the bulk of material 16 in vat 14, may also be determined. These type of regions include trapped volumes and regions that are "near" trapped volumes. There are various methods for ensuring that trapped volume regions and near trapped volume regions are included with shallow regions in defining the area to be coated by ink jet printhead 100. The most straightforward approach is to perform a Boolean union of all regions included on any previous cross-section of the object, connected objects and supports. The result of this Boolean union defines the region to be coated in forming building material layer 24.

A simple modification to this calculation involves including a switch which may be set by the SLA operator for indicating whether or not object 12 contains trapped volumes and/or near trapped volumes. Based on the setting of this switch, determination of which trapped areas are to be coated for each layer will be derived from either the N previously formed object cross-sections or all previously formed object cross-sections. Depending on the configuration of the object, having the switch set to a "no trapped volumes" setting will result in coating of an amount of material less than or equal to that which would otherwise be coated if the switch were oppositely set.

As another alternative to avoid difficulties that may be caused by trapped volumes, the maximum extents of each object cross-section may be used to determine a rectangular minimum dispensing region. To determine the net dispensing region to form a given layer, the Boolean union of the minimum rectangular dispensing region from each of the immediately preceding N cross-sections may be formed. This Boolean union represents the net dispensing region. A fully automated technique may also be implemented to derive a minimum area to be coated when forming each layer.

For given materials, the depths to be associated with shallow regions may be determined by experimentation. One may perform recoating tests over a cross-section with a relatively large cross-sectional area and critical circle. The cross-sectional area and critical circle of the cross-section should be selected to correspond to the cross-sectional dimensions of the objects which will be typically built on the SLA. For example, if one intends to build primarily small objects, e.g., objects having cross-sections with critical circles with radii less than ½ inch, then a test surface with a critical circle of radius ½ inch may be used. Alternatively, if one intends to build objects which have cross-sectional critical circles with radii as large as 4 inches, then a test surface of similar size should be used. One may then dip the surface into the liquid varying depths and determine the time required for material to flow over the cross-section for the different depths. The minimum depth for which a coating is formed in a reasonably small period of time, e.g. less than 2 to 5 seconds, may define the depth of the shallow regions.

It is possible to perform one or more inverse erosion routines, i.e., expansion routines, on regions which are determined to require ink jet dispensing in order to expand these regions some specified amount to ensure adequate coating by the ink jet print heads 100. This is especially so when it is desired to avoid precise registration between ink jet dispensing locations when forming layers and exposure locations when forming cross-sections. Erosion routines and inverse erosion routines are described in several of the previously incorporated U.S. patent applications including Ser. Nos. 08/233,027; 08/233,026; and 08/259,333. Further disclosure may also be found in U.S. patent application Ser. No. 08/299,475, now abandoned, filed Aug. 31, 1994, by Hull et al., which application is incorporated by reference as if fully set forth herein. In essence, inverse erosion routines are similar to line width, cure width, or beam width compensation techniques except that the compensation amount is negative which results in an expansion of the cross-sectional area as opposed to the a contraction of the region.

The above noted erosion techniques and Boolean operations may be performed on boundary vectors defining regions or alternatively may be performed on software or hardware configured bit maps (pixel maps) defining the regions. In any event, ink jet control is preferably based on bit map representations of the regions to be coated.

Referring to FIG. 7g, an alternative embodiment involving ink jet recoating is shown which may reduce object 12 build time. Here, the portion of layer 24 that was formed first is exposed to synergistic stimulation while simultaneously, the rest of layer 24 is formed. The object 12 is also lowered into the surrounding liquid bath at appropriate times as discussed below. Also in this alternative, ink jet recoater 100 may begin dispensing layer 24 over the top surface 22 of the last formed object cross-section 20 before surface 22 has been completely exposed to synergistic stimulation. That is, ink jet recoater 100 may recoat over portions of surface 22 as they are exposed, instead of waiting until the entire surface 22 has been exposed.

FIG. 7g shows surface 22 from above and divided into sections A and B. The software controlling the source 28 of synergistic stimulation preferably directs source 28 to expose all those portions of surface 22 in section A before proceeding to section B. After section A has been exposed, recoater 100 may immediately form the next layer 24 thereon while section B is being exposed. In similar fashion, after section B has been exposed, recoater 100 may form the next layer 24 thereon while the source 28 of synergistic stimulation is exposing those portions of layer 24 in section A that had just been recoated. This process may alternatingly occur such that object 12 build time is reduced.

So as not to disturb the liquid level, i.e., working surface 26, of section A as it is exposed to synergistic stimulation, the material 16 being dispensed over section B of surface 22 may be supplied from a reservoir (not shown) separate from vat 14. After section B is exposed to synergistic stimulation, platform 18 may then be lowered one layer or other desired thickness and the volume of material 16 in vat 14 may be corrected by directing a volume of material 16 displaced by the lowering of platform 18, to the separate reservoir.

An alternative embodiment involving ink jet recoating involves object 12 being formed in a vat 14 which is not filled with material 16 when object 12 is initially formed. Here, a building material layer 24 over the entire vat 14 is dispensed and then selectively exposed to synergistic stimulation. Platform 18 then remains stationary and successive layers 24 are formed over the entire vat 14 and selectively exposed to synergistic stimulation. In this manner, working surface 26 rises as object 12 is built. To maintain the proper distance between working surface 26 and the source 28 of synergistic stimulation, source 28 may also be raised as each successive layer 24 is formed.

To minimize recoating errors due to jets misfiring or due to differences in the volume dispensed by individual jets, each jet may be controlled to dispense material at different rates. Additional embodiments that account for the non-uniformity in surface level which may result when forming layers and forming cross-sections based on dispensing exact quantities of material over previously formed cross-sections as discussed in other portions hereof may also be used in connection with the foregoing.

Additional embodiments may be derived by combining the teachings of separately presented ink jet embodiments in this section together. Further embodiments may also be derived by combining the teachings herein regarding ink jet recoating with the teachings regarding other recoating techniques discussed above and below.

SLING RECOATING

Figure 8F:
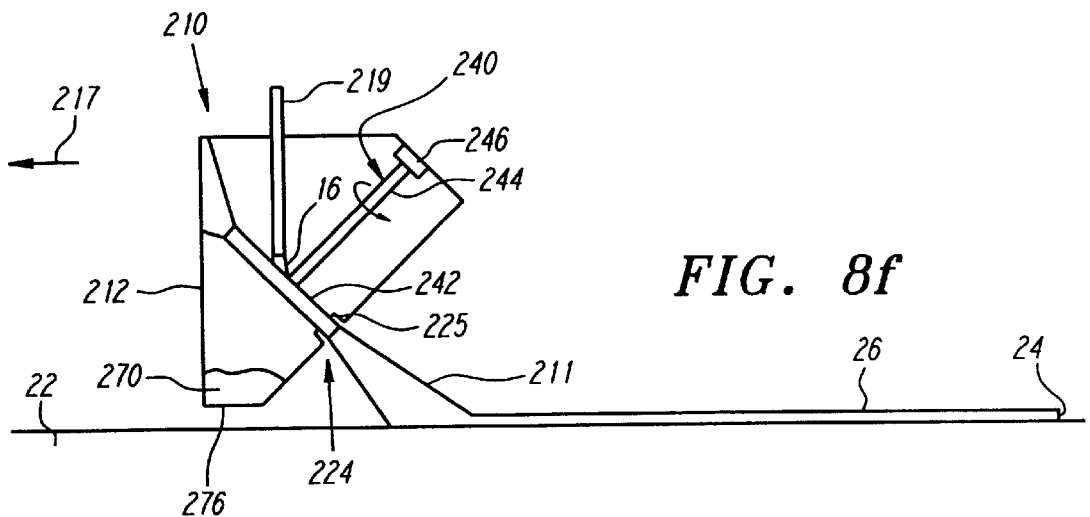
FIG. 8f is a sectional view of an applicator including an array of spinning wheels dispensing building material.
Figure 8G:
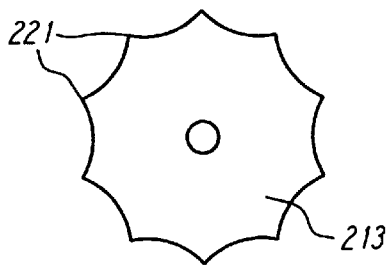
FIG. 8g shows a wheel having high points.
Figure 8H:
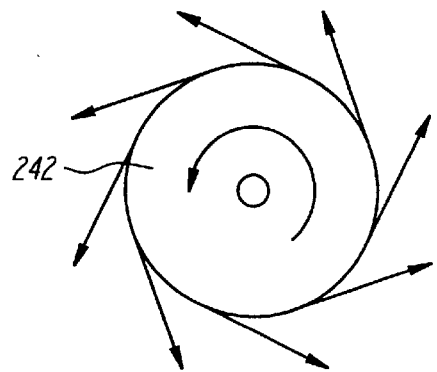
FIG. 8h shows the tangential direction of material ejection from a wheel.
Figure 8I:
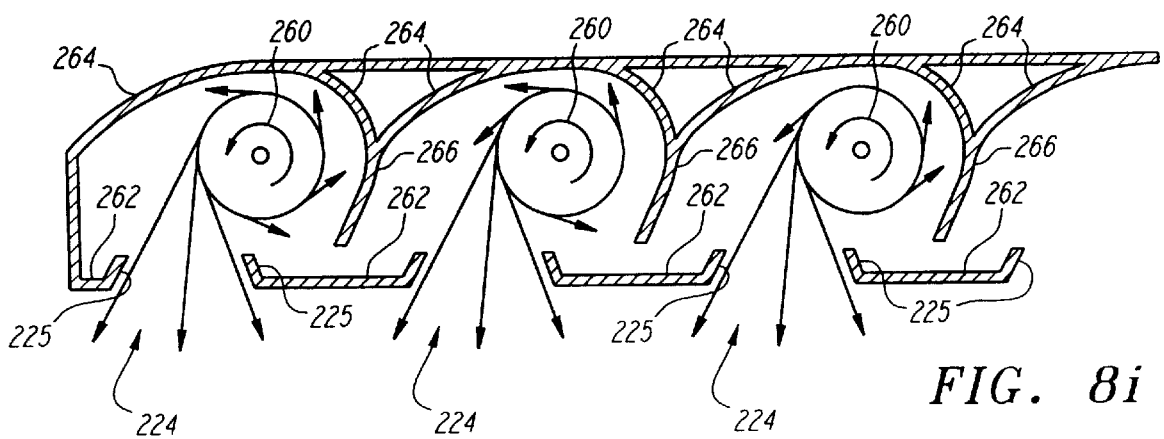
FIG. 8i shows a plurality of wheels in an envelope.
Figure 8N:
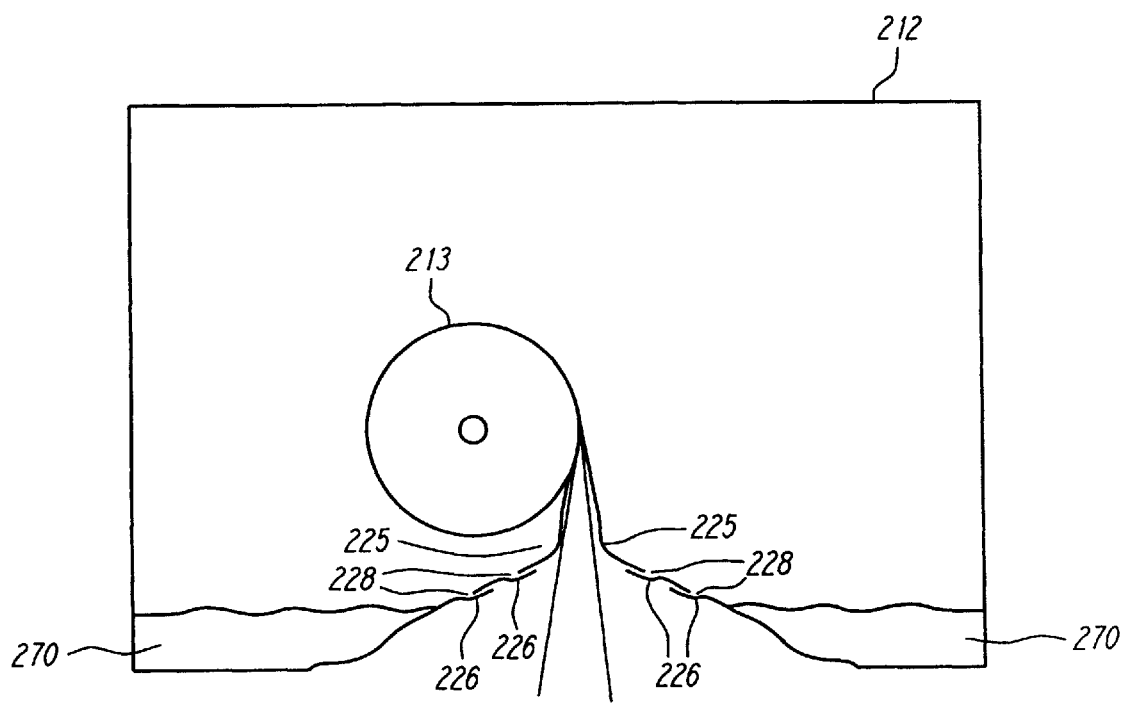
FIG. 8n shows an applicator dispensing material.

Another embodiment of the current invention is shown in FIGS. 8a–8n and involves an applicator 210 which is swept over working surface 26 and which includes a rotating or spinning element that slings or otherwise ejects building material from the applicator 210. The building material is slung or ejected onto at least the last-formed object cross-section 20 and typically onto at least a portion of working surface 26. A preferred embodiment is shown in FIG. 8a which is a side view of applicator 210 forming a building material layer 24 by slinging building material spray 211 onto at least the top surface 22 of the last-formed object cross-section 20.

Applicator 210 may include envelope 212 which houses dispensing roller 213 that is preferably positioned with its axis perpendicular to the direction 217 in which applicator 210 translates. Other angular orientations with respect to the sweeping direction may be used. Roller 213 may comprise a circular bar mounted to axle 216 as depicted in FIG. 8b, or a series of closely spaced wheels 215 coupled to an axle 216 as depicted in FIG. 8c. Roller 213 preferably extends at least the width of the object 12 being formed and more preferably extends over substantially the entire width of working surface 26. Alternatively, if side chambers exist on vat 14, applicator 210 and roller 213 may extend beyond the width of vat 14. Roller 213 may be spun or otherwise driven by a motor (not shown).

A row of nozzles 219, or a slit housed by envelope 212, spaced along the length of roller 213 may deliver building material 16 at or near the surface of roller 213. Preferably, substantially equal quantities of material are delivered through each nozzle 219 so that each wheel 215 or section of roller 213 ejects substantially equal quantities of material onto surface 22 or working surface 26. Alternatively, and as discussed below, material may be delivered near the axis of roller 213, e.g., via axle 216, which material travels outward to the roller surface where it is ejected.

When material is delivered at or near the surface of roller 213, at least moderately selective ejection of material may occur particularly if roller 213 rotates at a high enough speed such that the material delivered by nozzles 219 clings to roller 213 for less than one full rotation thereof. Another technique for obtaining selective directional slinging is to use a cam or other non-cylindrical rotating roller or wheel, or an off-axis rotating cylindrical roller or wheel, in conjunction with pulsed and selectively timed application of material to the roller or wheel. Here the application of material is preferably timed so that material is applied at the same point on roller 213 or wheel 215 on successive rotations, and the material is slung before roller 213 or wheel 215 completes a full rotation. To minimize imbalances in forces acting on the wheel or roller assembly bearings, the roller or wheel assembly may be designed so that its center of gravity corresponds to the axis of rotation. This may be accomplished by appropriately weighing portions of roller 213 or wheel 215, or by causing the "material launching" regions of each segment along the length of roller 213 or wheel 215 to vary around its circumference.

It is preferred that material delivered near the surface of roller 213 be deposited with a velocity component parallel to the tangential velocity of roller 213 so as to aid roller 213 in receiving the material. In any event, a portion of the material ejected from roller 213 is directed toward and through aperture 224 in envelope 212 and is thus deposited onto surface 22 on working surface 26 to form a building material layer 24 as applicator 210 is swept across vat 14. Envelope 212 may include flanges 225 which prevent material 16 intercepted by envelope 212 from falling onto surface 22 or working surface 26, or otherwise impeding spray 211.

In circumstances where material is delivered, e.g., by nozzles 219, to the roller surface, material ejected from roller 213 is ejected tangentially to the roller surface. Where material is delivered at or near the center of roller 213 such as via axle 216, the material may possess a radial velocity component as it reaches the roller surface. However, such material is typically ejected substantially tangentially to the roller surface because the radial velocity component is relatively small compared to the tangential velocity component. However, if the radial and tangential velocity components of material delivered at or near the roller center are controlled, material may be ejected from the roller surface at a desired angle which is between tangential and radial.

In any event, it is preferred that roller 213 be located fully within envelope 212 as depicted in FIG. 8a so that the size and location of apertures 224 and flanges 225 may dictate the dimensions and direction of spray 211. To this end, the size and orientation of the apertures 224 and flanges 225 may be adjusted to achieve the desired configuration of spray 211. Flanges 225 are preferably configured to ensure that material which is not ejected directly through apertures 224 does not later indirectly or residually pass through apertures 224 as a result of dripping from envelope 212.

As shown in FIG. 8n envelope 212 may include additional material traps 226 and material removal elements 228 to further reduce the possibility of uncontrolled release of material. Flanges 225 and any additional traps 226 and removal devices 228 thus preferably prevent a non-uniform ejection of material which could otherwise result from dripping or the like, thereby potentially causing regions of nonuniformity in layer 24 being formed. As such, flanges 225 are preferably configured to minimize the chance that ejected material strikes their outward faces and thereafter drips down onto surface 22 or working surface 26. This minimization may occur by orienting flanges 225 so that they are either parallel to the direction of material ejection, or are at an angle to the path of material ejection, as shown in FIG. 8a, such that ejected material strikes the inside of flanges 225. Any residual material that may still strike the outward faces of flanges 225 may be picked up and removed by appropriate use of supplemental flanges and/or material removal devices, e.g., suction or drainage devices.

The configuration of envelope 212 may also be modified from that depicted in FIG. 8a to better enable removal and/or trapping of extraneous material. As mentioned above, envelope 212 may be symmetrically designed, or otherwise, with downward sloping surfaces extending from flanges 225. An example of this type of envelope 212 configuration is depicted in FIG. 8n and further includes additional traps 226 and removal holes 228.

As mentioned above, as an alternative to dispensing material at or near the roller surface, material may be delivered to the center of roller 213 or wheels 215 such as via axle 216. The material may then travel radially outward to the roller surface where it is then ejected. To this end axle 216 may comprise a hollow perforated tube which is filled with building material. The material may migrate from axle 216 through the perforations and passageways (see FIG. 8e) through the roller 213 or wheels 215, and to the surface of roller 213.

Roller 213 may alternatively be wrapped with one or more wires (not shown) or may have a knurled, machined or other patterned surface which may help define the portions of roller 213 from which spray 211 may be ejected. In this manner, roller 213 may include "high" points such as points 221 in FIG. 8g. High points 221 facilitate spray 211 being uniform because material 16 will be attracted to and ejected therefrom. Alternatively, roller 213 or wheels 215 may comprise a porous material 222 or may be surfaced with a porous material 222 as depicted in FIG. 8d. In this configuration, material delivered near the axis of roller 213 or wheels 215 may work its way through the porous material to the roller surface for subsequent ejection. Alternatively, the porous material may allow roller 213 or wheels 215 to absorb material that is dispensed at or near the roller surface such as by nozzles 219. Alternatively, as shown in FIG. 8e, roller 213 or wheels 215 may include a plurality of radially running holes 223 which extend from the axial region to the roller surface thereby forming channels for material flow.

An alternative embodiment of sling recoating which involves slinging building material from a spinning dispenser is shown in FIGS. 8f–8j. FIG. 8f shows a side sectional view of applicator 210 which is forming a building material layer 24 by slinging a building material spray 211 onto the top surface 22 of the last formed object cross-section 20. Applicator 210 may again include envelope 212 which may be attached to the SLA by a frame (not shown) to provide translation across surface 22. Preferably, applicator 210 is computer controlled.

Envelope 212 houses a plurality of spray nozzles 219 in a row which deliver building material 16 onto a corresponding row of spinning wheel assemblies 240. A feeder line (not shown) extending from vat 14 or another source may be used to supply material 16 to applicator 210 which then distributes material 16 to each nozzle 219.

Envelope 212 is preferably large enough to house a row of about ten (10) to forty (40) corresponding nozzles 219 and spinning wheel assemblies 240. Preferably, this number of nozzles 219 and wheel assemblies 240 may be housed within an envelope 212 having a length of about ten (10) inches. Longer or shorter envelopes 212, and more or fewer nozzles 219 and wheel assemblies 240 may be used to recoat larger or smaller surfaces 22, or multiple passes over different portions of surface 22 may be made by a shorter applicator 210, or by a plurality of applicators 210. When using multiple passes or multiple applicators, interleaving of locations of dispensing may be used to the help uniformity of building material layers 24. Furthermore, if a shorter applicator 210 or a plurality of shorter applicators are used, randomization or alternate sequencing of regions coated by particular wheel assemblies 240 may be used to help alleviate any thickness anomalies that might build up from slight differences in quantities or material dispensed by each wheel assembly 240 which might otherwise occur if each wheel assembly 240 always coated the same locations.

Each spinning wheel assembly 240 may comprise wheel 242 that is rotated by axle 244 which is driven by a motor 246. Preferably, wheel 242 and axle 244 comprise a lightweight material such as aluminum. Wheels 242 are preferably driven at substantially constant speed to reduce variations in the volume of material dispensed because of failure to operate wheel assemblies 240 in a steady state mode. However it is preferred that when desired, the speed at which wheels 242 rotate, and the speed at which applicator 210 translates across vat 14 may be varied to provide the desired thickness of layer 24. It is most preferred that this variability be implemented on a sweep-by-sweep basis.

Envelope 212 may include individual apertures 224 through which material from each wheel 218 may be dispensed. Since material will typically be ejected from wheels 242 in more of a tangential manner than a radial manner as depicted in FIG. 8h, it is preferred that wheels 242 not protrude beyond envelope 212. FIG. 8h depicts one of the wheels 242 rotating in a counter clockwise direction and material being slung from wheel 242 in directions which are essentially tangential to the surface at the point of departure.

FIG. 8i is a sectional view down axles 244 and depicts three of the plurality of wheels 242 rotating in counter clockwise direction 260 and dispensing material 16 in all directions. Only material dispensed in the directions of apertures 224 are actually ejected from applicator 210 to working surface 26 or surface 22. Material dispensed in all other directions works its way into troughs 262 which may be formed in part by flanges 225. The material in troughs 262 may be recycled to be redispensed onto wheels 242 by a pump or other device (not shown). As can be seen, flanges 225 point tangentially toward their respective wheels and allow material dispensed directly through apertures 224 to exit envelope 212.

As can be seen from FIG. 8i, the upper portion of envelope 212 may include curved sections 264 so that material slung in this direction will not merely hit envelope 212 and drip downward. Instead, upon hitting envelope 212 the ejection force of this material will cause it to travel around curved sections 264 and into troughs 262. The inner surface of envelope 212 may be coated with a release agent to facilitate the flow of material into troughs 262. Alternatively, the inner surface of envelope 212 may be coated with a porous material so that dispensed material clings to envelope 212 wherein capillary action is used to hold the material in place as it flows to troughs 262.

As can also be seen in FIG. 8i, envelope 212 preferably includes shields 266 to inhibit material dispensed from one wheel 242 from striking an adjacent wheel 242. Shields 266 may also prevent material being inadvertently dispensed through the an adjacent wheel's aperture 224. Shields 266 may connect to the bottom of troughs 262 in order to separately maintain the material ejected from each wheel. This material separation may aid in having each wheel 242 dispense substantially equal amounts of material through each wheel's respective aperture 224. This maintenance of material separation may be combined with the feedback mechanisms described below to ensure that steady state dispensing is maintained at a desired level. In any event, if a known amount of material is dispensed to each wheel and the difference between the amount of trapped material and the dispensed material is determined, one may obtain a first order approximation of the amount of material dispensed by each wheel assembly 240.

FIG. 8i also shows that because the material is ejected tangentially from wheels 242, apertures 224 are preferably located off-center relative to wheels 242. Furthermore, the spacing between wheels 242, the size and locations of apertures 224 and the distance from the bottom 276 of applicator 210 to working surface 26 are preferably coordinated to provide a layer 24 of uniform and desired thickness. To this end, various alternatives may aid in the formation of desired layers 24: 1) the use of a non-symmetric dispensing pattern may be useful since all points of ejection are not at the same distance from working surface 26 and are not oriented at the same angle, 2) each cell of applicator 210 may consist of two wheels 242 rotating in opposite directions thereby allowing apertures 224 to be centered with wheels 242, 3) the direction of spinning of successive wheels 242 may alternate, 4) a second or further applicator 210 with wheels 242 located at interlacing points to those in the other applicators, and 5) individual wheels may be located at different vertical heights, e.g., adjacent wheels, which are rotating in the same direction, may be displaced vertically from one another with appropriate aperture adjustment to allow more symmetric material dispensing.

Alternatively, but less preferred for the reasons noted above, envelope 212 may include a continuous slit extending for most of its length through which all wheels 218 dispense material. As with the embodiment above, nozzles 219 may be positioned so that material 16 is dispensed to the inner or outer portion of wheels 242. However, it is most preferred that dispensing occurs to the outer portion of wheels 215 wherein the material is not allowed to cling to wheel 215 for a full rotation so as to allow more selective material dispensing at given orientations.

The material caught by envelope 212 generally flows downward. Flanges 225 may be positioned above apertures 224 to direct any downward-flowing material 16 around apertures 224 and to the bottom of envelope 212 where accumulation 270 forms. This accumulated building material may be directed through a line (not shown) back to vat 14 or other source of building material 16 for later reuse. Accordingly, this embodiment provides for efficient use of building material 16 which reduces the cost of operating the SLA.

Applicator 210 translates in the X-direction 217 across surface 22 as it emits building material sprays 211. The individual sprays 211 provided by wheels 242 form an aggregate spray which sweeps over surface 22 thereby forming building material layer 24. Forming layer 24 in this manner overcomes the problem of air pockets and bubbles associated with curtain coaters.

In order to maintain steady state conditions, once object building has begun, it is preferred that wheels 242 constantly spin and that material 16 is constantly sprayed. Even where the source of material 16 is vat 14, constant spraying does not detrimentally alter the volume of material 16 in vat 14, e.g., misplace working surface 26 in relation to the source 28 of synergistic stimulation, because as material 16 is drawn into envelope 212, it is also being sprayed back into vat 14 in the form of building material layer 24. Accordingly, there is no appreciable net change in the volume of material 16 in vat 14. In a given steady state circumstance, the amount of material remaining in envelope 212 may be different than for other circumstances. This could result in a variation in material in the vat which may be accommodated for by use of an independent liquid leveling system as discussed previously.

Applicator 210 may accelerate and decelerate at the beginning and end of its translation over each successive sweep such that the amount of material 16 sprayed per unit area may change thereby altering the uniformity of layer 24. However, it is preferred that this acceleration/deceleration occur near the periphery of vat 14 and away from the object being built. Alternatively, but less preferred due to the loss of steady state conditions, the speed at which wheels 242 rotate may also be slowed during these periods to decrease the amount of material 16 dispensed from applicator 210 to compensate for the applicator's slower speed.

Though other speeds are possible, it is preferred that wheels 242 rotate at a speed of about 1,000 to 10,000 rpm and that wheels 242 have a diameter between ½ and 2 inches, more preferably between ½ and 1 inch and most preferably about ¾ inches. As shown in FIG. 8g, wheel 242 may include a serrated edge comprising a plurality of points 221 circumferentially spaced which act as launching points for the material to leave spinning wheel 242. This allows material 16 to experience greater force when reaching the launching points which results in a more uniform release of the droplets and thereby formation of a more uniform layer 24.

In this recoating embodiment it is most preferred to use a photopolymerizable resin that tends to heal small imperfections, e.g. SL 5149, SL 5154 and LMB 5463, all manufactured by Ciba Geigy. Droplets of these resins tend to quickly merge into one another upon touching thereby leaving no trace of a border between them. Thus, as sprays 211 from each wheel 242 contact surface 22, the dispensed building material quickly adjusts to smooth out any irregularities thereby forming a uniform building material layer 24.

It should also be noted that the techniques to correct errors accumulated over the building of successive object cross-sections, errors from non-uniformly applied layers and errors from shrinkage which are discussed in connection with the other embodiments of this application may also be used in connection with this embodiment. For example, applicator 210 may dispense an additional building material layer 24 every nth layer to correct any overall height deficiency. Also, the bottom surface 276 of envelope 212 may be used as a doctor blade to correct for irregularities in thickness. This doctor blade type use of the envelope 212 may occur in conjunction with an over coating process, e.g. deep dip, on periodic layers, e.g. every 10th to 200th layer, to correct for any accumulated error built up over previously formed object cross-sections. Alternatively, the overcoating process could involve dispensing an excess quantity of material from the sling device, which excess may be trimmed down using a doctor blade. Also, the sweeping speed of applicator 210 may be increased or decreased to compensate for thickness errors in previous layers.

An alternative to the configuration shown in FIG. 8*f* is shown in FIG. 8*j*. As with the embodiment of FIG. 8*a*, the size and positioning of apertures 224 directly control the dimensions of sprays 211 as well as the direction in which sprays 211 contact surface 22. In this manner, a precisely-controlled spray 211 may be directed at surface 22. Also, to avoid clogging of apertures 224 or slinging of excess material from apertures 224, guides 280 may be mounted in envelope 212 to direct any material intercepted by envelope 212, away from apertures 224.

This embodiment includes a recycling arrangement for supplying material 16 to wheels 242 as now described. Guides 280 may direct the intercepted material to accumulation 270 near the bottom of envelope 212. Feeder line 282 and valve 284 may maintain material 16 in accumulation 270 at a desired level by either removing excess material or adding material as needed. A pump such as a peristaltic pump (not shown) and a level detection system may be included to control the level of accumulation 270. Impeller 286 is attached to wheel 242 as shown and also dips into accumulation 270 so that its blades 287 may transport material 16 that had been previously supplied from spray nozzle 219, back to wheel 242. Upon reaching wheel 242, this material 16 is again transported to the wheel's 242 perimeter or points 221 where it is then ejected therefrom. As an alternative, impeller 286 may comprise a screw mounted inside a cylinder which may be used to draw material up to the center of wheel 242. As with wheel 215 of FIG. 8*e*, wheel 242 of FIG. 8*j* may include holes running radially from the axial region to the perimeter region of wheel 242. In this case, material pulled up from accumulation 270 passes through the radial lines and is then ejected from wheel 242.

As spraying starts, accumulation 270 may be provided with material from that intercepted by envelope 212 as well as incoming line 282. As accumulation 270 rises, more material 16 will be transported by impeller 286 to wheel 242 such that spray 211 is also increased. This increase in spray 211 will continue until a steady state is reached where the rate of material incoming to applicator 210, e.g., through nozzles 219 and/or line 282, is equal to the rate at which material is dispensed through aperture 224.

In such a steady state, the rate at which material 16 is supplied to wheel 242 by impeller 286 and/or nozzle 219 is known and constant, and thus the rate of dispensing through aperture 224 is known. And because the rate at which applicator 210 traverses over surface 22 is known, the resulting thickness of building material layer 24 may be calculated. Because of this foregoing relationship, a desired building material layer 24 thickness may be achieved by regulating translation of applicator 210 and the rate at which material 16 is supplied thereto, i.e., the volume of spray out of applicator 210 is equal to the volume of material 16 supplied thereto.

Alternatively, after impeller 286 dispenses material 16 onto wheel 242, guides 280 may direct the intercepted material 16 back down into vat 14. In this situation, if the rate at which material 16 is dispensed onto wheel 242 is known and constant, and the fraction of this material 16 being dispensed through aperture 224 is known and constant, and the transport rate of applicator 210 is known and constant, once again the thickness of building material layer 24 will be known.

In the foregoing embodiments involving impeller 286, material 16 from vat 14 may be pumped continuously to applicator 210 because after a steady state is achieved, the rate at which the material 16 is removed from vat 14 equals the rate at which it is dispensed back into vat 14. As an option to precisely control the amount of material introduced into applicator 210 e.g., through nozzles 219 and line 232, a pump with a variable speed motor (not shown) may be used along with a pressure sensor (not shown) before a final flow restrictor (not shown) as material 16 is dispensed. To this end, a servo controller (not shown) can then be used to control the motor to provide constant pressure, which in turn will provide a constant flow rate of material.

An alternative to rotationally driven sling recoating is shown in FIG. 8*k* and includes a series of piston powered dispensers 290 instead of spinning wheels 242 or roller 213. Material 16 may be supplied to pistons 290 by feeder line 292. The source of material 16 may be vat 14, accumulation 270 of intercepted material 16 or some other reservoir. Preferably, pistons 290 are small and operate at a high frequency to avoid a discernible cyclical dispensing of material 16 that might result in a wavy or otherwise nonuniform building material layer 24. The material leaving piston dispensers 290 is sent through a nozzle which dispenses material onto working surface 26.

An alternative embodiment involving sling recoating is shown in FIGS. 8*l*–8*m* wherein applicator 210 may remain translationally stationary while dispensing spray 211 over surface 22 to form building material layer 24. In this embodiment, applicator 210 operates by use of wheels 242 but the roller 213 of FIGS. 8*a*–8*e* or the piston of FIG. 8*k* may also be used. Envelope 212 may include a mount 294 which is rotatably mounted to frame 296 at pivot point 298. Frame 296 may be coupled to the SLA.

As shown in FIG. 8*m*, applicator 210 may rotate clockwise about pivot point 298 to form building material layer 24. To form the next building material layer 24, applicator 210 may rotate counterclockwise for efficient operation. Preferably, after a building material layer 24 has been formed, applicator 210 is moved by frame 296 to a peripheral location of vat 14 to avoid interfering with layer's 24 exposure to synergistic stimulation. Alternatively, the dispenser may be located at the edge of vat 14 and may rotate to the side to dispense layer 24. The dispensing of layer 24 may occur in a single rotation, or a back and forth rotation of multiple rotations.

So that layer 24 is uniform, the volumetric flow of spray 211 may be adjusted throughout the rotation of applicator 210 so that flow decreases or the sweeping velocity increases as applicator 210 rotates towards the position at which it dispenses spray 211 vertically downward, and so that the spray increases or velocity decreases as applicator 210 rotates beyond vertical dispensing.

An alternative to the embodiment of FIGS. 8*l*–8*m* involves mounting a plurality of rotating applicators 210 in various locations over vat 14, such as mounting an applicator 210 over each quadrant of vat 14. In this alternative, the amount of rotating required by each applicator 210 is reduced thereby easing the control over adjustment of sprays 211.

Further embodiments may also be derived by combining the teachings of separately presented sling recoating embodiments, or by combining the teachings of sling recoating with the teachings regarding the other recoating techniques described above and below.

APPLICATOR BAR RECOATING

Figure 9A:
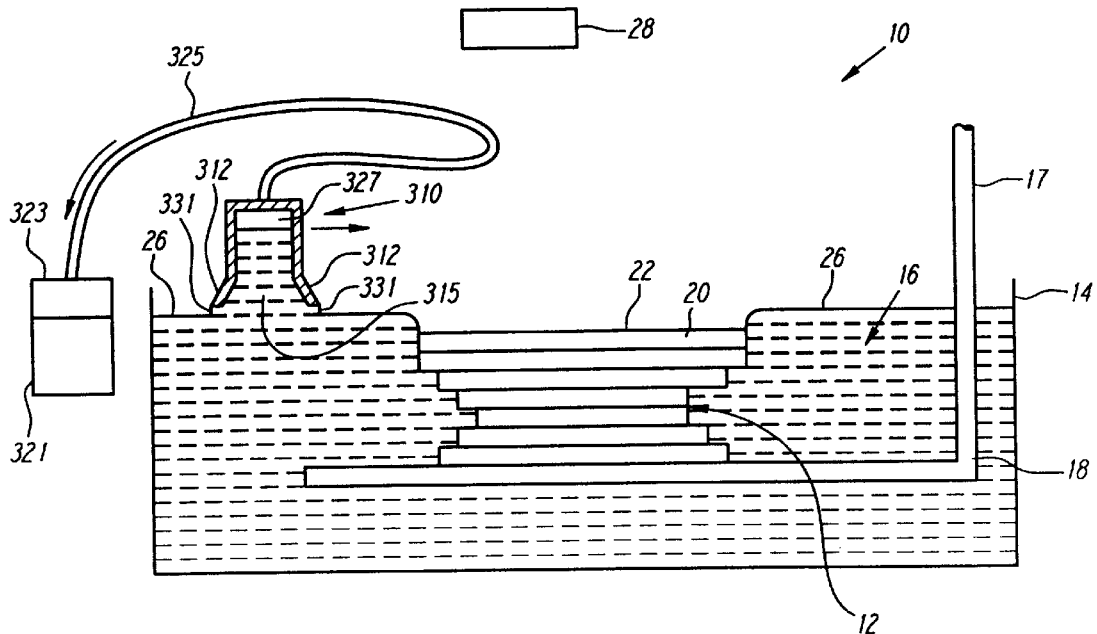
FIG. 9a shows an apparatus and method for forming a building material layer using an applicator.
Figure 9B:
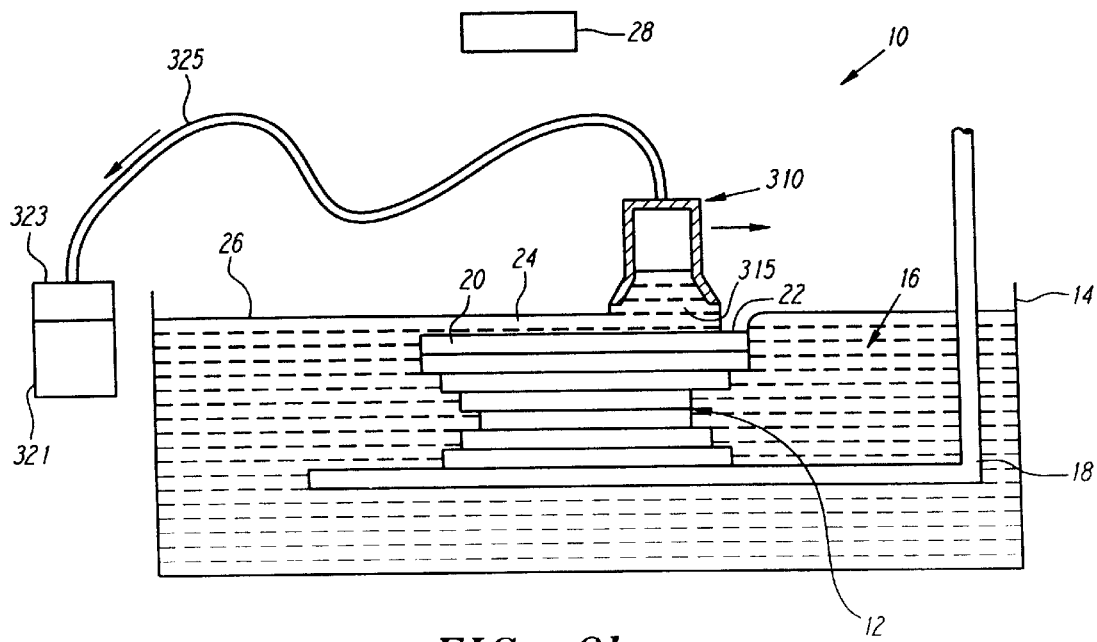
FIG. 9b shows an applicator dispensing material.
Figure 9C:
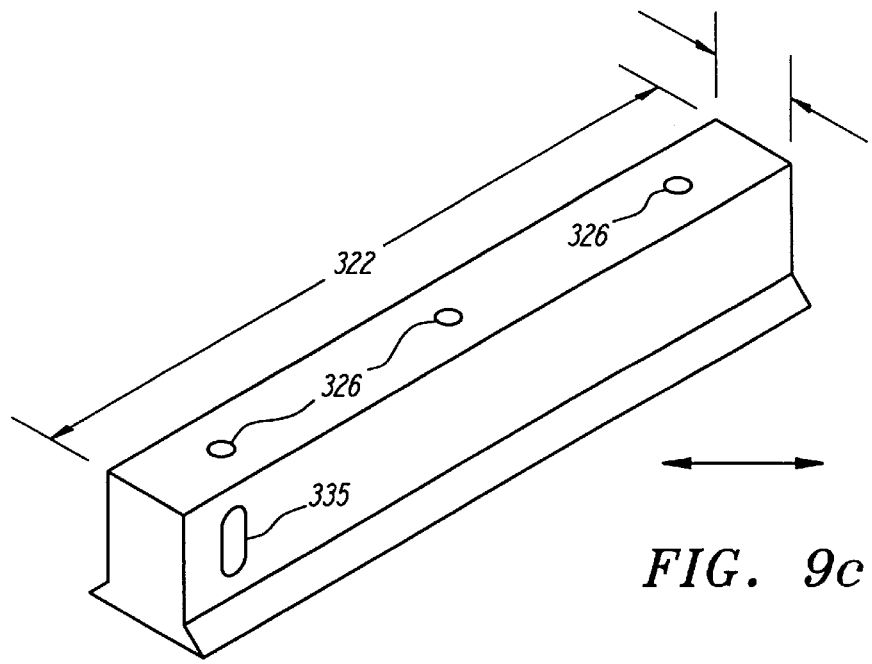
FIG. 9c is a perspective view of an applicator.
Figure 9G:
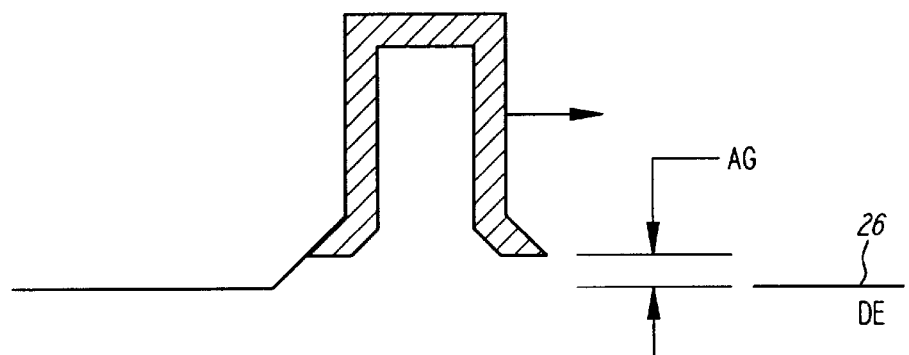
FIG. 9g shows an applicator gap.
Figure 9H:
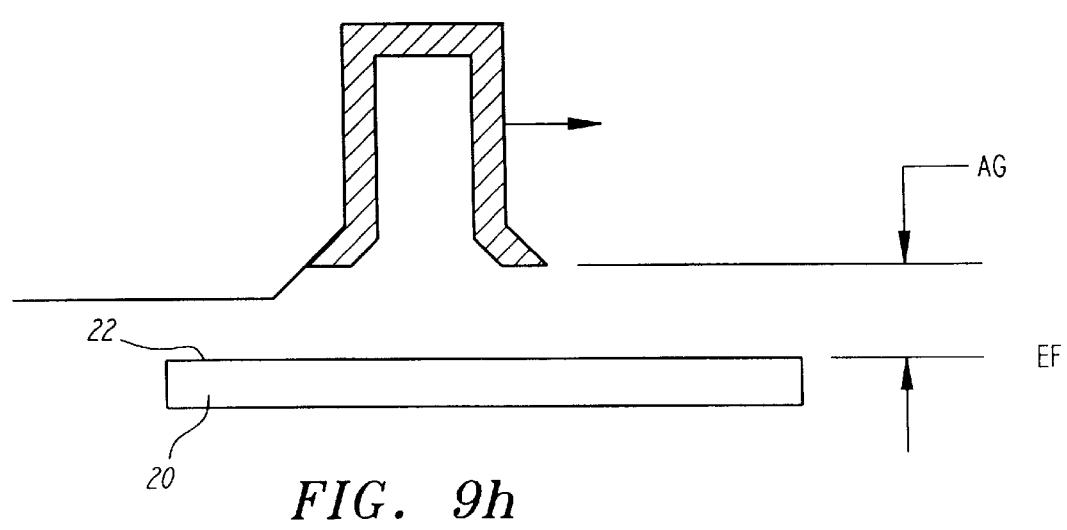
FIG. 9h shows an applicator clearance.
Figure 9D:
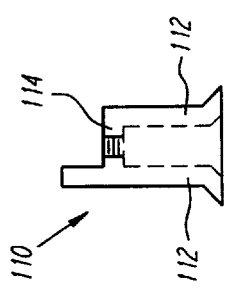
FIG. 9d is an end view of an applicator.
Figure 9E:
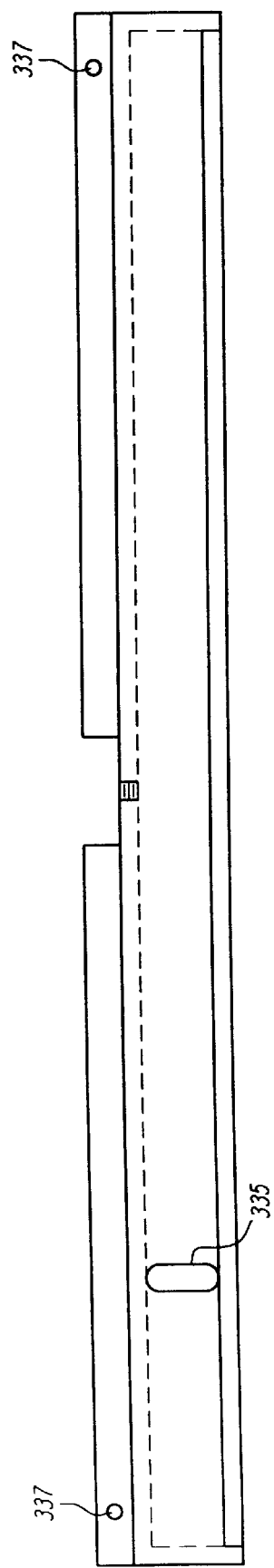
FIG. 9e is a side view of an applicator.
Figure 9F:
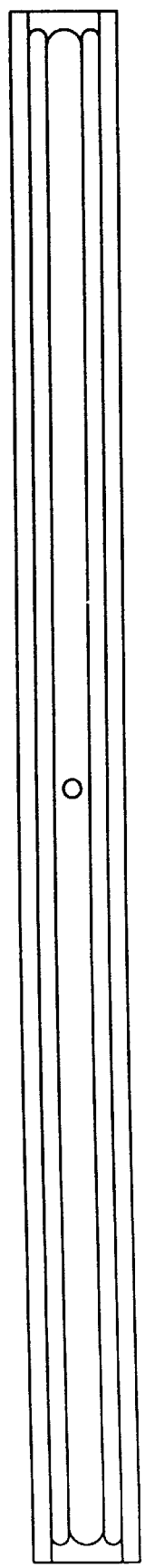
FIG. 9f is a bottom view of an applicator.
Figure 9I:
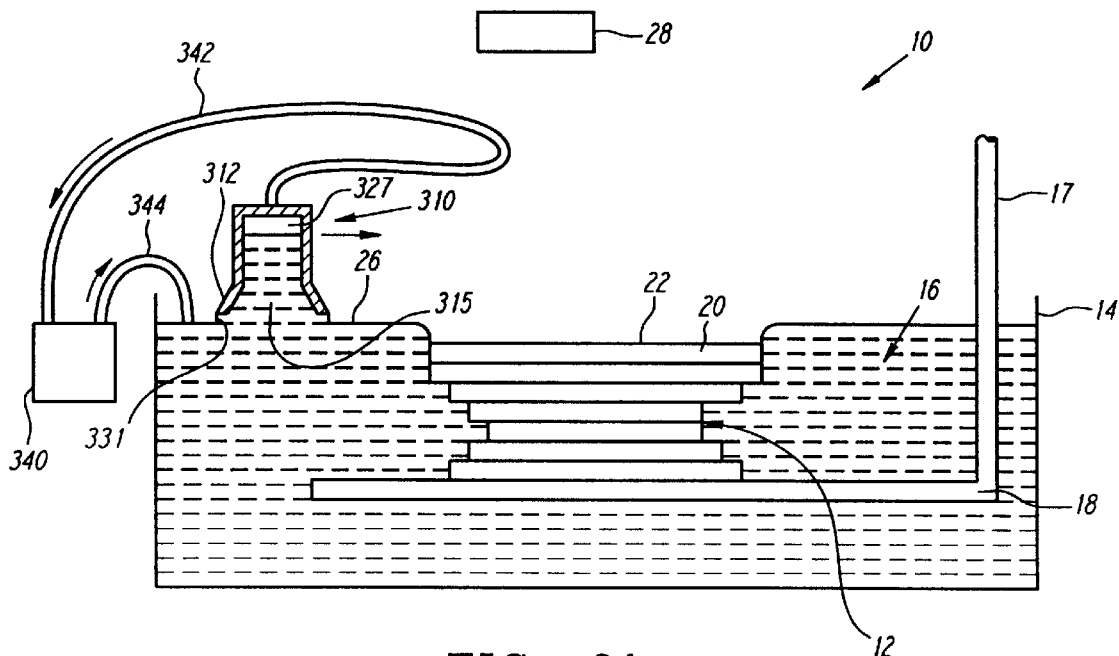
FIG. 9i shows an applicator absorbing material.
Figure 9J:
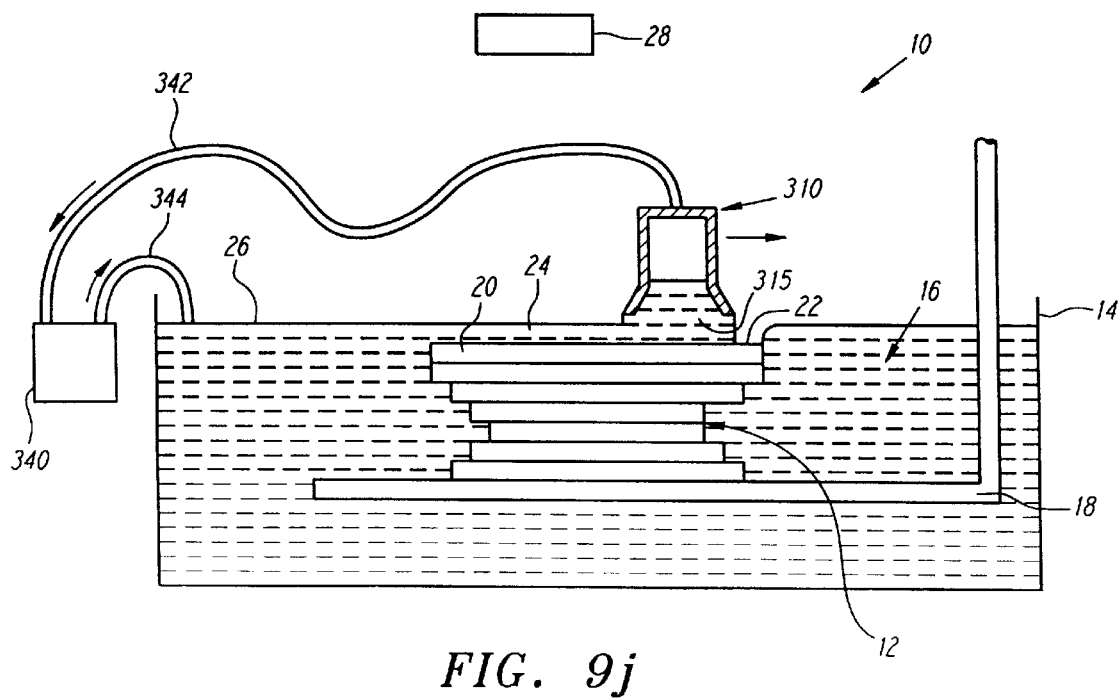
FIG. 9j shows an applicator dispensing material.
Figure 9Q:
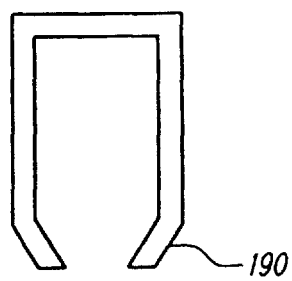
FIG. 9q–9u are end views of applicators.
Figure 9R:
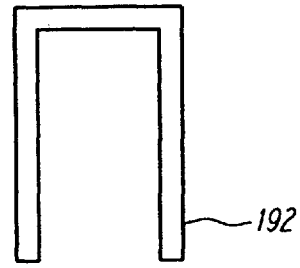
Figure 9S:
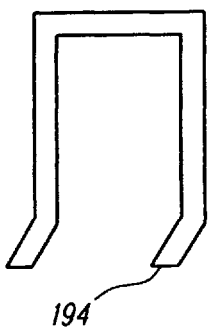
Figure 9T:
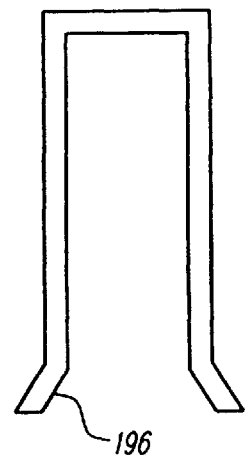
Figure 9U:
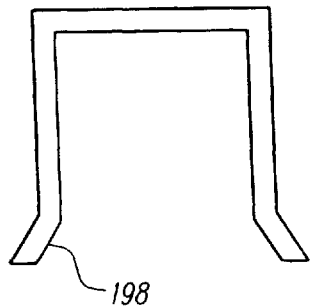
Figure 9K:
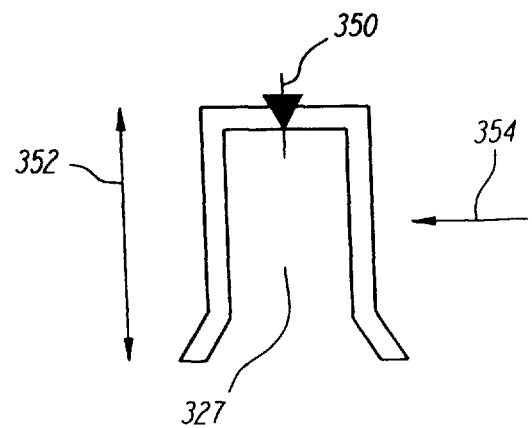
FIG. 9k is an end view of an applicator.
Figure 9L:
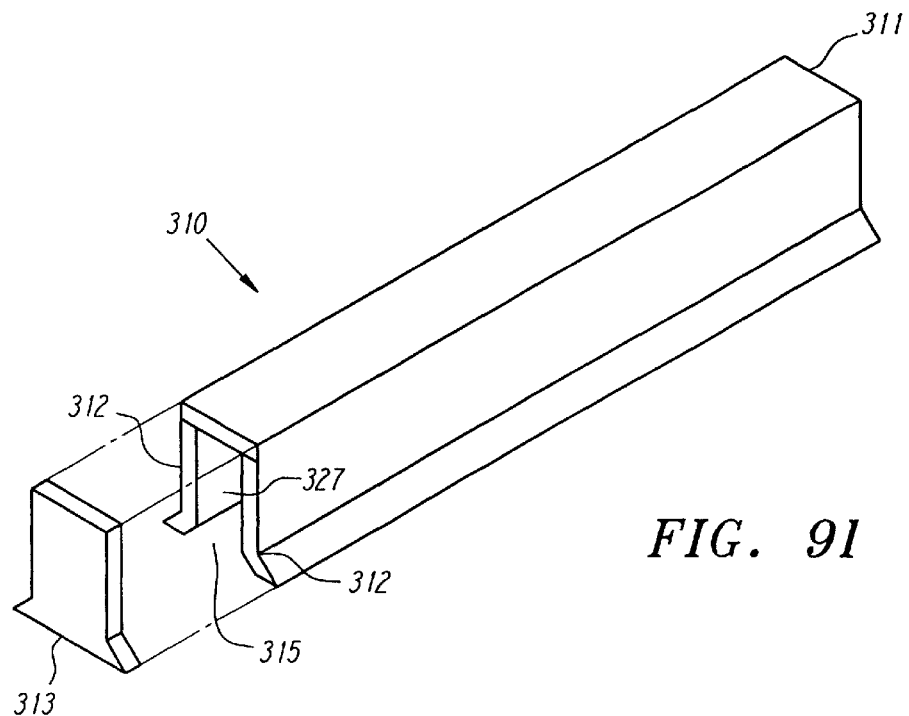
FIG. 9l is a perspective view of an applicator.
Figure 9M:
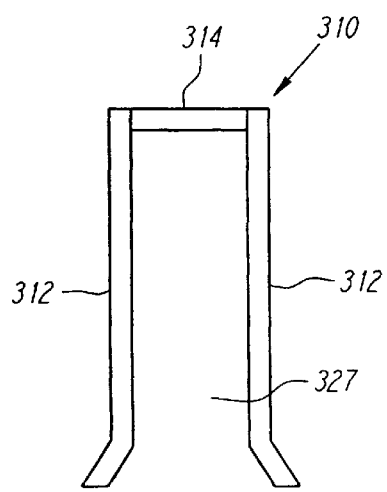
FIG. 9m is an end view of an applicator.
Figure 9N:
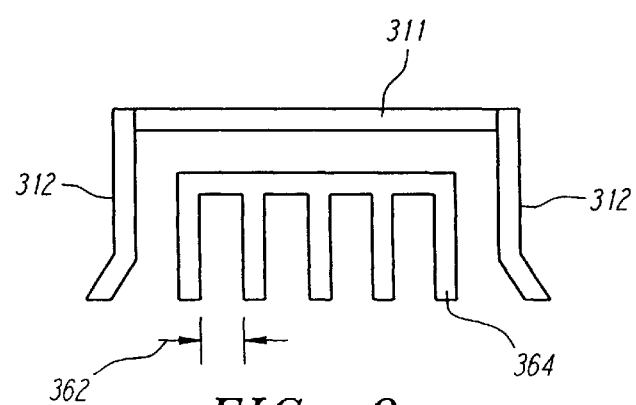
FIG. 9n is an end view of an applicator.

Referring now to FIGS. 9*a*–9*n*, an alternative embodiment of the current invention is shown whereby applicator 310 simultaneously applies and smoothes a building material layer 24. In a first preferred embodiment of this technique, after the last formed object cross-section 20 has been formed by selectively exposing the building material to synergistic stimulation, object 12 is dipped one layer thickness, or other desired thickness, below the desired working surface 26 of building material 16. During the exposure process, applicator 310 is at least partially filled with material 16 and after the exposure process, applicator 310 is swept at or slightly above the desired working surface 26 while dispensing material from opening 315 to form building material layer 24. After the dispensing of material 16, the vertical position of the upper surface 22 of the last formed object cross-section 20 may be adjusted if necessary so that it is essentially one layer or other desired thickness below the desired working surface 26.

Applicator 310 may be coupled to the SLA by a frame and drive system (not shown) so that it may be swept horizontally at or slightly above working surface 26. Applicator 310 is preferably computer controlled for precise formation of building material layer 24. It is preferred that applicator 310 be swept only as far as needed (as opposed to sweeping applicator 310 across the entire vat 14) to ensure formation of an adequate building material layer 24 and to ensure a free path for exposure to synergistic stimulation from source 28. The requirements for this enhanced sweeping criteria were discussed above in association with the counter rotating roller and ink jet dispenser embodiments.

After complete formation of building material layer 24 exposure of the layer occurs to form a subsequent cross-section of object 12. After formation of the subsequent object cross-section, the process of forming a successive building material layer 24 and forming a successive object cross-section is repeated. However, in this repetition of steps, applicator 310 may be swept in opposite directions as it dispenses material to form successive layers 24. Repetition of the cross-section and layer forming steps continues, with alternating directions of sweeping, until object formation is completed.

In this first preferred embodiment, the resin volume in applicator 310 is maintained by vacuum pump 321, pressure regulator 323, and vacuum feed line 325. The application of vacuum through line 325 into the upper portion of cavity 327 of applicator 310 causes a pressure differential to occur between the inside of cavity 327 and the region outside applicator 310. Applicator 310 is sealed with the exception of one or more openings near its top and with the further exception of opening 315 at its bottom. The openings near the top of applicator 310 provide for connection to vacuum feed line 325, while the opening at the bottom forms a slit for applicator 310 to receive and dispense building material 16.

Since applicator 310 is located at or near the desired working surface 26 and since building material 16 will contact the bottom of applicator 310 by spontaneous events or by design, a meniscus 331 will form as shown in FIG. 9*a* bridging any gap between working surface 26 and the bottom of applicator 310. Since meniscus 331 seals the applicator 310 bottom, as the pressure differential forms due to application of a vacuum at the top of the applicator 310, building material will be drawn up into applicator 310 until the pressure differential outside and inside applicator 310 is zero. Pressure regulator 323 preferably allows a controlled pressure differential to be formed to control the amount of material 16 drawn into applicator 310.

This controlled amount of material 16 is specified to be at least as great as the maximum amount of material 16 necessary to form the next layer 24. Assuming that layer 24 will be formed over the entire area of vat 14, the volume of this maximum amount of material 16 is equal to the thickness of the layer 24 to be formed multiplied by the cross-sectional area of vat 14 holding building material 16. However, it is preferred that the controlled amount of material 16 contained by applicator 310 be significantly greater than the anticipated maximum amount to form layer 24. The resulting excess ensures that applicator 310 will not run dry during a sweep and thereby ensures that meniscus 331 will not be broken. This is important because a break in meniscus 331 could lead to at least a momentary loss in vacuum pressure which in turn could result in the inability to rapidly replenish the material dispensed by applicator 310 when preparing to form the next layer 24. Though it is possible to shut off the active maintenance of vacuum during sweeping, in the preferred embodiment the application of vacuum continues even during sweeping.

Preferably, the length 322 of applicator 310 as shown in FIG. 9*c* is slightly less than the inside width of vat 14 or at least slightly extends beyond the maximum extent of object 12. FIG. 9a depicts applicator 310 to the left of object 12 shortly after object 12 has been dipped one layer thickness below working surface 26 by elevator 17 which is coupled to platform 18. As can be seen in FIG. 9a, material 16 is drawn to a significant height in cavity 327. FIG. 9b depicts applicator 310 after it has been swept almost the full distance across the last formed object cross-section 20. As can be seen in FIG. 9b the height of the resin column in cavity 327 has decreased due to the volume of material 16 dispensed during sweeping. Since the sum of the volume of material in applicator 310 and vat 14 is essentially a constant amount (ignoring shrinkage of cured material and volume changes due to aperture fluctuations), if the amount of material in applicator 310 varies, so will the amount and associated surface level of material in vat 14.

Therefore it is preferred that the amount of resin in applicator 310 remain relatively constant during exposure. It is further preferred that in independent liquid level device be used in conjunction with vat 14. As discussed previously and as can be ascertained by comparing FIGS. 9a and 9b, an adequate volume of material is preferably contained within applicator 310 prior to beginning a sweep. Otherwise dry spots or coatings of inadequate thickness may result. Applicator 310 includes flanges 312 which in turn include angled portions as shown in FIGS. 9a–9b that help reduce any leading edge bulge problems.

FIG. 9c depicts a perspective view of the preferred applicator 310. As can be seen from the combination of FIGS. 9a, 9b and 9c, applicator 310 may comprise an elongated bar with a hollow interior. FIG. 9c also depicts several holes 326 along the top of applicator 310 which represent locations at which one or more vacuum feed lines 325 may be connected. Preferably, care is taken to ensure a tight fit between lines 325 and holes 326 to prevent undue loss of vacuum pressure. FIG. 9c also depicts viewing port 335 which is formed by making a hole in applicator 310 and installing a window thereover to preserve the vacuum. From viewing port 335, the height of building material 16 in applicator 310 may be visually determined.

With the exception that no holes are shown in the top of the applicator, FIGS. 9d–9f depict the preferred applicator 310 of FIGS. 9a–9c from end, side and bottom views. Each of these views depicts dimensions of an applicator of the type described herein as implemented on an SLA-250 stereolithographic apparatus as sold by 3D Systems, Inc. of Valencia, Calif. Holes 337 depict mounting holes for attaching applicator 310 to the existing doctor blade mount on 3D Systems' SLA 250 stereolithography apparatus. The presently preferred vacuum pump for use with the applicator of FIGS. 9d–9f is Model No. 3020 sold by Apollo pumps of Ontario, Calif. For the applicator of FIG. 9d it is preferred that the vacuum regulator supply a stable vacuum pressure sufficient to pull material 16 about ½" up into applicator 310. Also for the applicator of FIG. 9d, the volume of material 16 typically drawn up into it is approximately 20 to 25 mL, whereas the volume of material in a single 0.15 mm layer produced by an SLA 250 is approximately 9 to 12 mL. A preferred pressure regulator involves the use of a bleeder valve that may be adjusted to allow a small but continuous supply of air to bleed into applicator 310 thereby providing an equilibrium vacuum pressure that is sufficient to pull material into the applicator 310 the desired amount.

In experimenting with the above preferred applicator 310, various layer 24 thicknesses have been formed. From these experiments, layer thicknesses in the range of at least 2 mils to 10 mils, inclusive, may be achieved, with the most preferred thicknesses currently being 4 to 6 mils, inclusive. It is also anticipated that applicator 310 of the preferred embodiment may be used to form layers 24 as thin as 0.5 to 1 mil when a building material exhibiting uniform properties is used. It is further anticipated that applicator 310 of the preferred embodiment is not strictly subject to an upper limit on layer thickness as long as sufficient material is available within cavity 327.

FIG. 9g depicts a side view of applicator 310 spaced above working surface 26 by a small amount. This spacing between the bottom of applicator 310 and desired working surface 26 during sweeping is analogous to the "blade gap" associated with the use of doctor blades and is herein referred to as the "applicator gap" (AG). In the above preferred embodiment, stereolithography resin SL 5170 is most preferred but it is believed that other stereolithography resins offered by 3D Systems, Inc. can be used as well. Successful layer-forming experiments have been performed with applicator gaps varying from 3 to 10 mils. Though the lower limit on applicator gap AG is zero, this has been found to be generally less than optimal due to leading edge bulge problems and increased potential for collisions between applicator 310 and object 12 being formed.

The upper limit on applicator gap AG is the maximum height above working surface 26 at which a reliable meniscus 331 may be maintained between applicator 310 and working surface 26. This maximum applicator gap AG is typically somewhere below 30 to 35 mils but is dependent on the building material 16 used. The optimal value of applicator gap AG is the smallest gap at which collisions between applicator 310 and object 12 are essentially non-existent and leading edge bulge is not a problem. It is believed that this optimal value is dependent on the properties of the material 16 being used such as viscosity, as well as the configuration of applicator 310. The present most preferred values of applicator gap are between 5 and 8 mils, inclusive.

FIG. 9h depicts the spacing between the bottom of applicator 310 and the upper surface 20 of the last formed object cross-section 20 during sweeping. This spacing is known as the "applicator clearance" AC and is analogous to the "blade clearance" associated with the use of a doctor blade. Typical applicator clearances AC range from about one (1) layer thickness to about three (3) layer thicknesses. The presently most preferred range of applicator clearances AC is between 1.1 and 1.7 layer thicknesses and the most preferred value is currently about 1.4 layer thicknesses.

As can be ascertained from the above ranges of applicator gap and clearance, the upper surface of the last formed object layer may be located at a position above or below its desired position for exposing a layer of material to form a next cross-section of the object. Thus, depending on the exact values of gap and clearance used the object may need to be raised or lowered slightly after sweeping with applicator 310 to complete the coating process so that a next object cross-section can be formed.

Experiments with sweeping speeds of applicator 310 of the configuration depicted in FIGS. 9d–9f, indicate that the most preferred speeds, when using SL 5170 resin, are in the range of about 1 to 4 inches per second, inclusive. However, these experiments further indicate that higher sweeping speeds may be acceptable if the SLA or other apparatus is designed to translate applicator 310 at higher speeds without inducing excessive vibration in the SLA. It has further been found that for a given applicator 310 configuration, as viscosity of building material 16 increases sweeping speeds are preferably slowed to allow sufficient time for material 16 to be dispensed. A sweeping speed is considered to be too high if excessive material 16 is being scooped from above previously formed object cross-sections.

The following benefits from the foregoing embodiment have been observed during experimentation: (1) significantly enhanced accuracy in building material layers 24, (2) post sweeping delays have been drastically reduced or completely eliminated, (3) predip delays have been drastically reduced or eliminated and (4) generalized recoating parameters regardless of object 12 configuration have been usable.

Additionally, it is anticipated that the foregoing recoating embodiment exerts lower forces on object 12 during the recoating process which advantageously results in an overall reduction in object 12 distortion. This reduction in force exerted on object 12 also provides that previously formed cross-sections such as last-formed object cross-section 20 require less structural modulus to retain their integrity. The resulting reduction in need for immediate green part structural modulus leads to broader process latitude in deriving build parameters and also eases development efforts necessary in finding suitable object building materials, e.g., epoxy resins, by easing acceptance criteria. It is further believed that the building material layers 24 formed by this preferred embodiment provide self-correction of minor errors in thickness from layer-to-layer, e.g., due to shrinkage or simply due to coating errors, which reduces or eliminates the need for a periodic accumulated error checking and/or correction. In any event such a periodic process may still be used if desired, e.g., deep dip and sweep off every Nth layer.

In summary this preferred applicator 310 embodiment performs two functions at the same time: (1) it applies material 16 to initially form building material layer 24a and (2) simultaneously smoothes layer 24a to form a final building material layer 24 having a working surface essentially coplanar with the desired working surface 26. This preferred applicator embodiment also: (1) forms more accurate layers of material, (2) significantly reduces recoating time and (3) allows the use of generalized, i.e. readily automatable, recoating parameters. It is further anticipated that further reductions in build time may be achieved by exposing the first-dispensed portion of layer 24 to synergistic stimulation to form a next object cross-section while applicator 310 is still dispensing the latter-dispensed portion of layer 24 over the last-formed object cross-section 20.

FIGS. 9i and 9j depict a second preferred embodiment of applicator 310. In this embodiment, cavity 327 of applicator 310 is not filled with building material 16 via vacuum pump 321, regulator 323 and vacuum tube 325. Instead, material 16 is maintained in cavity 327 via pump 340, extraction tube 342 and fill tube 344. In this embodiment, material 16 is drawn to pump 340 from applicator 310 by suction through extraction tube 342 and dispensed from pump 340 through tube 344 back into vat 14. The arrows in the figures indicate the direction of material flow in the tubes. To avoid bubble formation from fill tube 344 as it supplies building material 16 back into vat 14, the entry location of fill tube 344 into building material 16 may be surrounded by a fence, wall or bubble catcher (not shown).

When used in conjunction with applicator 310 of FIGS. 9d–9f and with SL 5170 stereolithography resin, the presently preferred pump 340 is a diaphragm or piston pump, Model No. 50000-072, sold by Cole Parmer. This pump has a controllable flow rate up to a maximum flow of 0.3 gallons per hour. In a given application, the required flow rate may be greater than the amount of material comprising the number of layers to be formed in a given time period. However, it is preferred that the flow rate be significantly larger than this amount to preserve the integrity of meniscus 331. To further preserve meniscus 331, it is preferred to let pump 340 run continuously so as to constantly pull material 16 through applicator 310 and redeposit it into vat 14 regardless whether or not applicator 310 is sweeping.

A peristaltic pump may be more preferred in the long term to minimize cleaning time and problems when the building material to be used in the SLA is changed. Alternatively, the SLA may include separate pumps and tubing for each building material to be used. Separate applicators 310 may also be used for each building material.

In this embodiment, a quantity of material 16 sufficient to form building material layer 24 may be pumped to applicator 310 during exposure of the last formed object cross-section 20. Alternatively, material 16 may be pumped to applicator 310 as it forms building material layer 24.

FIG. 9k depicts an alternate embodiment applicator 310 which includes a bleeder valve 350 that is preferably electrically actuated, e.g., by a solenoid and computer controlled to open and close as commanded. Before sweeping, applicator 310 may be loaded with material 16 by lowering applicator 310 in the downward direction of arrow 352 partially into building material 16 while at the same time opening bleeder valve 350. After material 16 has filled applicator 310 to the desired level, bleeder valve 150 may be closed and applicator 310 may be raised vertically in the upward direction of arrow 352, out of material 16 so that its lower surface is located above the desired working surface 26 by the desired applicator gap AG.

Since applicator 310 maintains contact with the body of building material 16 in vat 14 via meniscus 331, and since applicator 310 is completely sealed due to the closure of valve 350, material 16 remains trapped in applicator 310. After loading applicator 310, it may be swept horizontally above the previously formed object cross-section 20, as depicted by arrow 354, to form a next building material layer 24.

In an alternative embodiment to that depicted in FIGS. 9i and 9j, the direction of material pumping may be reversed. So long as the bottom of slotted applicator 310 is located within the meniscus connecting the applicator and the working surface, it is believed acceptable coatings will be formed so long as the material dispensing rate is matched to the sweeping speed to yield a coating of desired thickness over the last formed object cross-section 20 and over any other shallow regions. Applicator 310 may still continue to withdraw and dispense material away from the shallow regions when not sweeping.

FIG. 9l depicts an alternative embodiment of applicator 310. In this embodiment, applicator 310 may comprise several components which may move relative to one another including: upper element 311, flanges 312 and end caps 313 (the end cap at the far end of applicator 310 is not shown). As with the previous embodiments, these components form a sealed applicator 310. In this embodiment, applicator 310 is filled with material 16 by (1) reducing the volume of cavity 327 before or while applicator 310 is in contact with material 16 and then (2) expanding the volume of cavity 327 while the bottom of applicator 310 is in contact with building material 16. The contraction and expansion of cavity 327 may be accomplished by moving flanges 312 closer and further away as flanges 312 slide along upper element 311 and end caps 313. The expansion and contraction of flanges 312 is preferably performed under computer control utilizing solenoids, electric motors with ball screws, pneumatic pressure or the like. Since during the expansion applicator 310 is sealed by tight fits between its components, the only way to balance the growing vacuum in cavity 327 is to draw material 16 into applicator 310. Once sufficient material 16 is drawn into applicator 310, expansion may stop and sweeping and associated material deposition may begin.

FIG. 9m depicts an end view of an alternative applicator 310 which may also contract and expand. Here, contraction and expansion of cavity 327 may be accomplished by moving upper element 314 down before or while applicator 310 contacts material 16, and up after applicator 310 is in contact with material 16 thereby creating a vacuum and filling cavity 327. As applicator 310 sweeps across vat 14, upper element 311 may again be moved downward thereby creating a force on material 16 to facilitate dispensing.

In an alternate embodiment, a sponge of other wicking material (not shown) may be inserted in the applicators 310 of FIGS. 9a, 9i, 9l and 9m. Referring to FIG. 9k this sponge may also be used to wick material up into applicator 310 while valve 350 is open thereby eliminating the need to lower applicator 310 into building material 16 in order to fill cavity 327. Similarly, the sponge may be utilized in the embodiments of FIGS. 9l–9m wherein the drawing of material 16 into the sponge occurs by expanding cavity 327 as described above. Dispensing from an applicator 310 including the sponge may occur while sweeping with applicator 310 sealed. Alternatively, sweeping may occur with valve 350 open, with end caps 313 removed or with cavity 327 being contracted. The wicking or capillary capabilities of the sponge eliminates the need for sweeping with a sealed applicator. Different wicking materials may be useful for different building materials so that the wicking rate and ability to dispense are optimized. When using a sponge, it is preferred that the sponge be positioned within applicator 310 so that the bottom of the sponge is slightly above the bottom of flanges 312.

An example of an alternative applicator 310 based on the use of wicking forces is depicted in FIG. 9n. In this alternative the wicking element includes a number of closely spaced inner flanges 364 that are positioned within flanges 312 and upper element 311 and that are sized appropriately to allow capillary forces to draw material up into applicator 310. The distance 362 between inner flanges 364 may vary with material viscosity but where material 16 comprises a photopolymerizable resin such as SL 5170, a gap 362 of 0.05 to 0.150 inches is preferred. To facilitate absorption, the surfaces of inner flanges 364 may be coated with a porous material to enhance the capillary action of flanges 364. Inner flanges 364 may also be moved vertically so they can be filled by immersion into building material 16 in vat 14. Alternatively material 16 may be fed between inner flanges 364 by pumping.

Figure 9O:
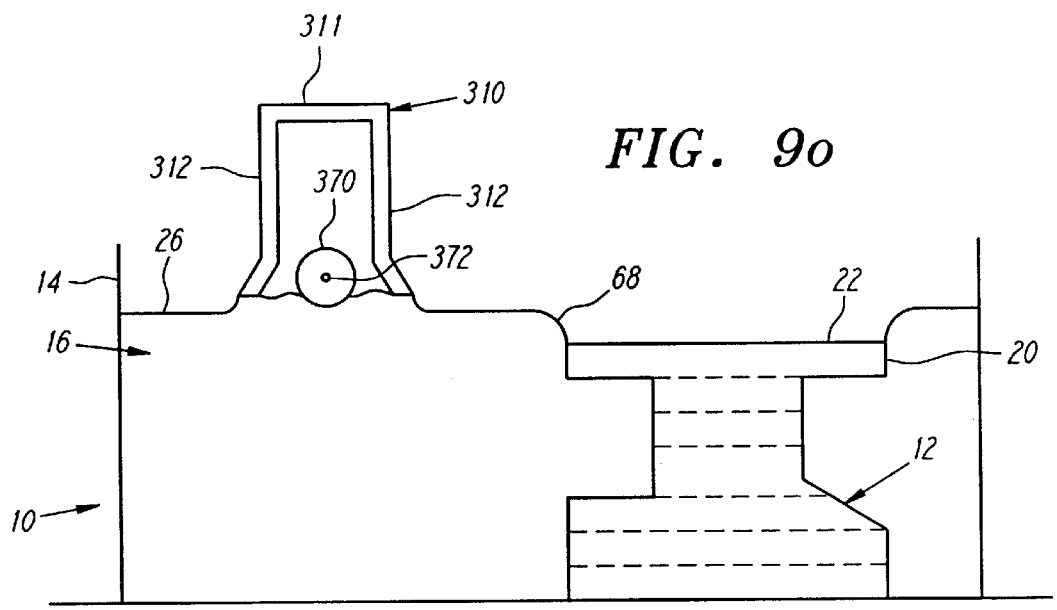
FIG. 9o shows an applicator with a roller absorbing material.

An alternate embodiment of applicator 310 including a roller 370 located between flanges 312 is shown in FIG. 9o. Here, roller 370 may comprise a cylinder which is coupled to applicator 310 at its ends by axle 372. Roller 370 is preferably driven so that it rotates with a tangential speed matching the translational speed of the applicator 310 thereby eliminating any horizontal motion of the bottom of roller 370 relative to working surface 26. Alternatively roller 370 may spin freely so that it may rotate as applicator 310 translates along working surface 26. Roller 370 is preferably made of aluminum but may alternatively comprise a sponge-like material or may have a sponge-like coating or surface. As a further alternative, roller 370 may have a knurled or other machined surface which provides more surface area to receive material 16.

The bottom of roller 370 may be located at or above the bottom of flanges 312 and is preferably located in the range of about 0.002 and 0.200 inches above the bottom of flanges 312. During operation, material 16 within cavity 327 need not touch the inner walls of applicator 310 but may simply cling to roller 370 and rotate with it. Alternatively, material 16 may uniformly fill cavity 327 up to a desired height. The methods used in the previous embodiments for filling applicator 310 with material 16 may be also utilized in the embodiment of FIG. 9o. Alternatively, roller 370 may be rotated while in contact with material 16 so as to build up a rotating mass of material 16 thereon.

Figure 9P:
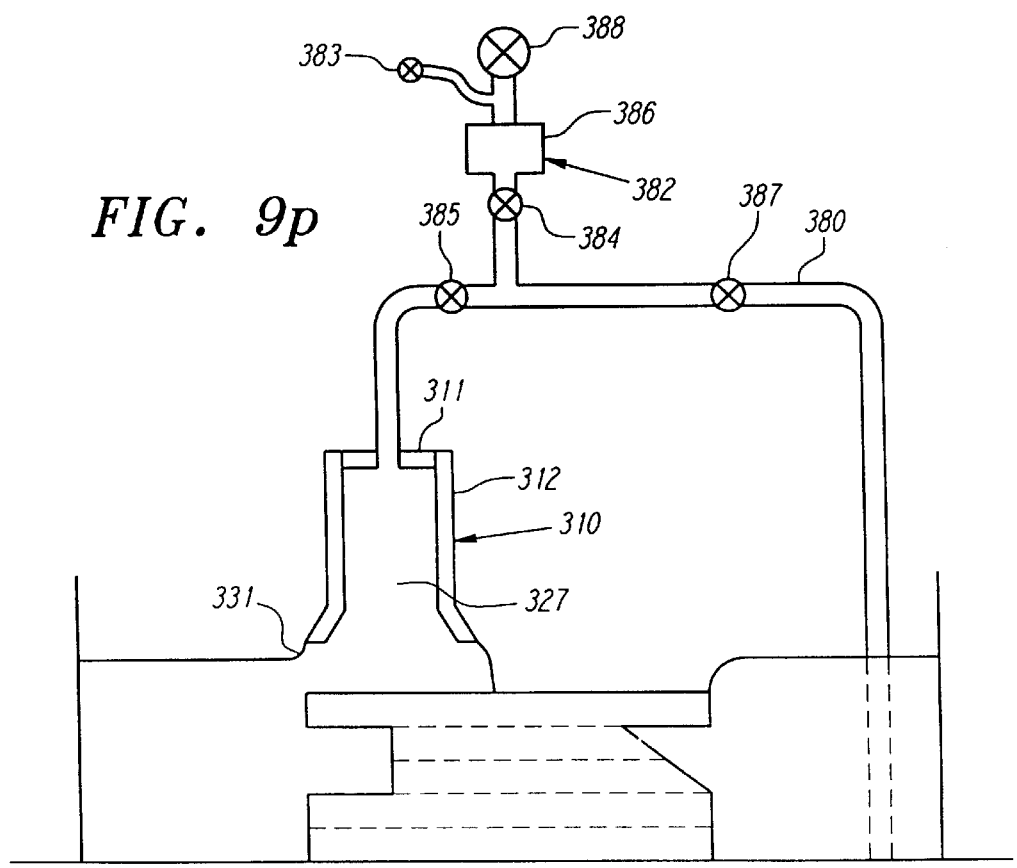
FIG. 9p shows an applicator including a vacuum arrangement dispensing material.

An alternate applicator embodiment is shown in FIG. 9p which includes vacuum/feeder line 380 and priming device 382. This embodiment may also be used with the other types of applicators 310 discussed above. Line 380 extends from within vat 14, is coupled to priming device 382 and enters applicator 310 through upper element 311. Line 382 may alternatively enter applicator 310 through a flange 312. As a further alterative, line 380 may extend from a separate reservoir (not shown) containing material 16.

The embodiment of FIG. 9p operates on vacuum pressure, which vacuum may be initially created by priming device 382 that may include valve 384, reservoir 386 and vacuum pump 388. To create the vacuum, vacuum pump 388 may be activated with valves 384 and 387 open and 385 closed. Valve 383 which may bleed air into the vacuum system may be opened or closed, preferably closed. This serves to draw material 16 from vat 14 through line 380, through valve 384 and into reservoir 386. This priming process may occur until material 16 fills some portion of reservoir 386 so that the material level is generally above valve 384. At this point, valve 387 is closed, valve 385 is opened, valve 388 is closed and/or valve 383 is opened or opened further. This allows material to occupy applicator 310 and to ensure meniscus formation. Valve 388 and valve 383 are then adjusted to draw and maintain a desired quantity of material in applicator 310. After priming, applicator 310 may be swept across surface 22 to dispense material 16. As material 16 leaves applicator 310, valves 383 and 388 will maintain material in the applicator at a desired level.

Alternatively, valve 384 may be closed and valves 385 and 387 opened during sweeping. In this alternative, as material 16 leaves applicator 310, more material 16 is drawn from vat 14 through line 380 and into applicator 310 because of the existing vacuum and siphoning principles. In this manner, applicator 310 is supplied with material 16 for as long as necessary to form building material layer 24. As building material layer 24 is formed, trailing edge flange 312 is preferably positioned at the desired height above surface 22 to ensure that layer 24 is of desired thickness.

Though in the previously discussed embodiments it is preferred that applicator 310 be swept in alternating directions during successive sweeps across vat 14, applicator 30 may always be swept in the same direction during the recoating process. Applicator may also make multiple passes over the last-formed object cross-section 20 in the process of forming a next building material layer 24. In embodiments where the sweeping direction is always the same or when an even number of sweeps are used in forming each building material layer 24, the configuration of applicator 310 may not be strictly symmetrical. Furthermore, applicator 30 may have a different configuration than that described in the foregoing embodiments. For example, applicator 310 or some portion thereof, e.g., flange 312 or a portion of flange 312 near working surface 26, may be made of a flexible material such as rubber or a brush.

FIGS. 9q–9u depict several examples of other possible applicator configurations. Element 190 in FIG. 9q depicts an applicator with the flanges curving inward near the working surface. Element 192 in FIG. 9r depicts the applicator having vertical flanges. Element 194 in FIG. 9s depicts a non-symmetrical applicator. If the flanges of element 194 are rigid, the depicted applicator would be most applicable for use wherein a single sweeping direction is utilized during recoating, where an even number of sweeps will be performed, or where multiple applicator bars will be simultaneously used. If the bottom of the flanges are flexible, the applicator may be useful when sweeping in either direction since it would be expected that the flanges would take opposite positions when being swept in opposite directions. Elements 196 of FIG. 9t and element 198 of FIG. 9u depict two larger applicators so that larger volumes of material can be pulled into the applicator, so that larger layers may be used, so that higher viscosity materials may be readily used, or so that faster sweep speeds may be used. Multiple applicators may also be used.

As noted above, it is preferred that applicator 310 has a length 322 which extends across a significant portion of vat 14 so that building material layer 24 may be formed in a single sweep. Alternatively, multiple applicators 310 may be used with shorter lengths 322 to pass over different portions of vat 14. As a further alternative, applicator 310 may have a short length and may be swept over different portions of working surface 26 on successive sweeps.

To ease transportation of applicator 310 across vat 14, it is preferred that applicator 310 and the frame (not shown) coupling applicator 310 to the SLA, preferably comprise a lightweight material such as aluminum. The resulting lightweight reduces the amount of force necessary for accelerating and decelerating during transportation.

To form objects with high accuracy, working surface 26 should be located at a desired level relative to the source 28 of synergistic stimulation, which desired level is typically considered to be an ideal plane. Furthermore, this desired level is typically a fixed level which is maintained by independent liquid level control means such as those discussed in previously incorporated parent application Ser. No. 08/146,562, now abandoned, and in U.S. Pat. No. 4,575,330. The most preferred independent liquid level control system includes a level detection means and a vat hoist means for effectively raising-lowering the liquid levels.

If applicator 310 draws material 16 from vat 14 and redispenses material back into vat 14 when forming layer 24, and if it desired that an ideal plane of material 16 be formed and then exposed to form a next object cross-section, care is preferably taken to ensure that applicator 310 contains a substantially constant volume of material 16 during exposure of each layer. If applicator 310 holds only a small volume of material 16 and is being filled so as to increase the volume of material 16 contained therein during the exposure process, it may be possible to neglect the decrease in surface level in portions of the vat, i.e., regions of deep liquid. However, if applicator 310 holds a large volume of material 16 one preferably avoids changing the volume of material 16 being held in applicator 310 during exposure, lest working surface 26 be excessively varied and inaccuracies in formation of object cross-sections result or worse, delaminations between layers occur.

The amount of tolerable variation in the level of working surface 26 depends on a number of factors including: (1) overall object 12 accuracy desired, (2) method of exposing layer 24, (3) direction of variation in surface level, (4) exposure levels used in forming layers and (5) geometry of the object 12 being formed. Depending on the liquid leveling scheme used, one may also need to consider any layer-to-layer variations in the amount of material 16 being held in applicator 310 even if the amount is held constant during formation of individual objects cross-sections.

Several techniques are available to deal with this issue. First, one may conclude the amount of variation in the volume of material 16 in applicator 310 during exposure is small enough so as not to be a problem. In this event one may allow the amount of material 16 held in applicator 310 to vary, e.g., replenish after dispensing and during exposure. Second, one may simply inhibit the ability of the material 16 level in applicator 310 to vary during exposure. In this event, replenishing material 16 in applicator 310 should occur either after dispensing and before exposure or after exposure and before dispensing. Depending on the time required for replenishment, this technique may be not be acceptable due to the increase in overall time involved in the recoating process. Third, one may attempt to balance the variation of material 16 in applicator 310 with a corresponding but opposite displacement of material 16 in vat 14. Fourth, one may balance the volume of material 16 in vat 14 at any given time with a corresponding volume displacement in vat 14. The balancing attempts of the third and fourth approaches may involve an interaction between displaced amounts or alternatively the amounts being displaced may merely be estimated to match.

As a fifth approach, one may avoid disturbing the level of material 16 in vat 14 by causing applicator 310 to draw material 16 from a separate chamber wherein the material 16 level in the separate chamber has little or no impact on the material 16 level in vat 14. Between dispensing and exposing, a rapid transfer of material 16 may be made between the separate chamber and vat 14 via a connecting line in order to account for material 16 transferred via applicator 310 between the separate chambers. The separate chamber may be connected to vat 14 by only a shallow surface region of material 16 and wherein applicator 310 may be swept from vat 14 to the separate chamber. In this approach, it is preferred to have side chambers on both sides of vat 14. Since the separate chamber and vat 14 are connected by the shallow surface region, applicator 310 may be swept from the separate chamber to vat 14 and vice-a-versa. Also, since this surface region is shallow, level changes in vat 14 and separate chamber(s) may occur almost independently due to the long flow time necessary to transfer material 16 through the shallow region.

As with the other embodiments described herein, the use of slotted and sealed applicators may involve use of multiple sweeps, varying sweep speeds between successive sweeps, varying applicator clearances between sweeps, delays after sweeping, multiple short applicators, applicators with multiple slots forming parallel lines or sitting end to end, and the like. Further embodiments may also be derived by combining the teachings herein regarding slotted and sealed applicator embodiments with each other, or with the teachings regarding the other recoating techniques described above and below.

INDEPENDENT STREAMS

Figure 10A:
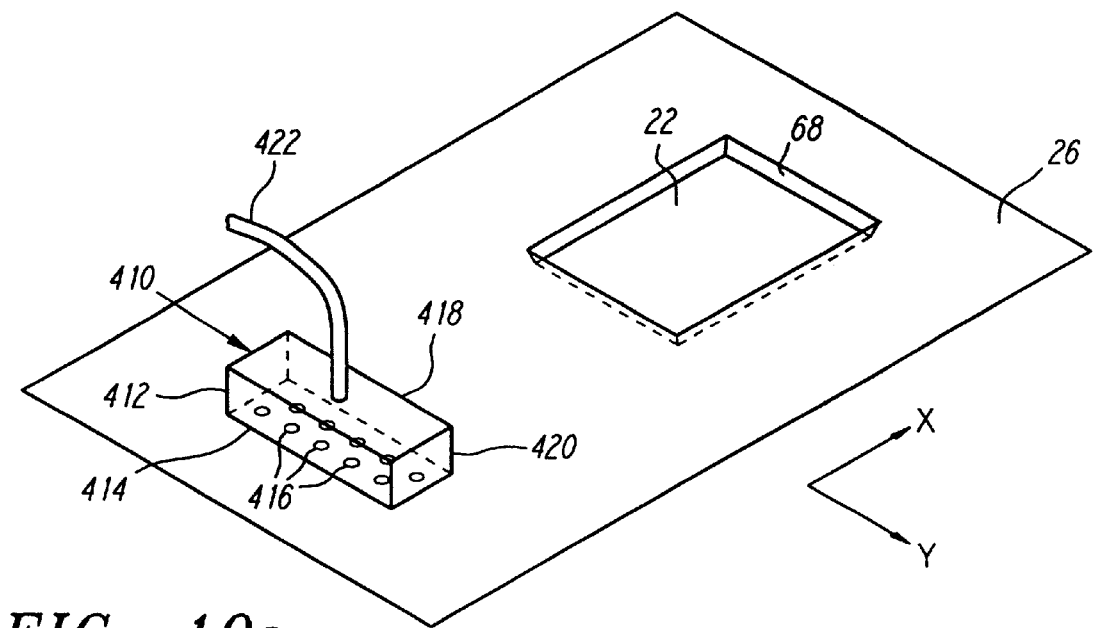
FIG. 10a shows an applicator including an array of spray nozzles preparing to dispense building material.

An alternative embodiment of the current invention is shown in FIGS. 10a–10h and involves an apertured applicator bar 410 that dispenses independent streams of material 16 that merge together after contacting working surface 26 or the upper surface 22 of the last formed object cross-section 20. FIG. 10a depicts working surface 26 which has already been separated from the last formed object cross-section by one layer thickness or other desired thickness above the top surface 22 of the last formed object cross-section 20. As shown, boundary 68 exists about the periphery of top surface 22. As with the other embodiments and as discussed above, boundary 68 may form entirely or partly around the region which is above a number of previously formed object cross-sections. As an alternative, the last-formed cross-section 20 may be lower after dispensing so long as the applicator gap is large enough.

Figure 10B:
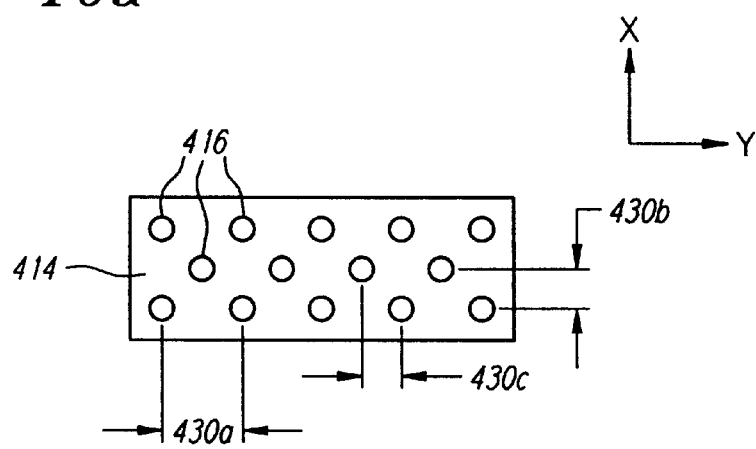
FIGS. 10b–10c shows alternate spray nozzle array configurations.
Figure 10C:
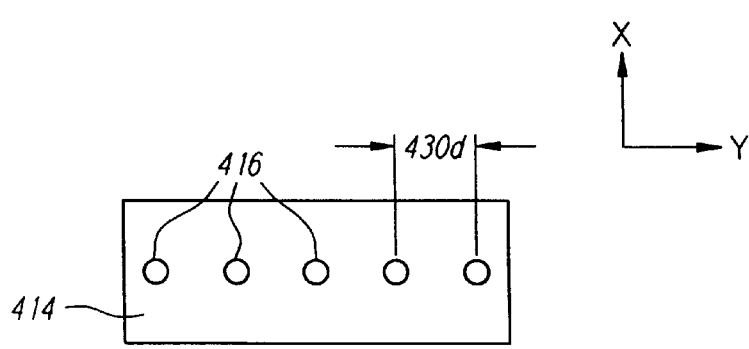
Figure 10D:
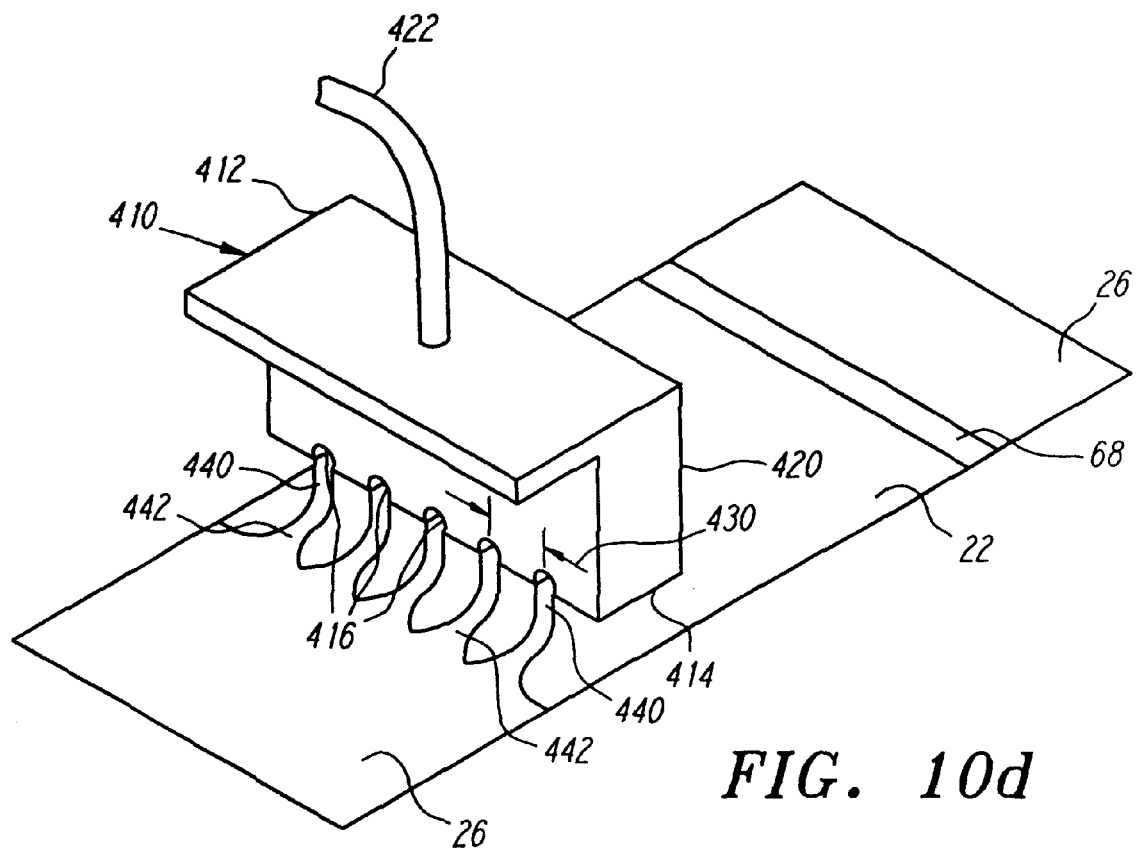
FIG. 10d shows the applicator of FIG. 10a dispensing material.

FIG. 10d depicts applicator 410 as it sweeps over previously formed object cross-section 22. The width of applicator 410 is preferably wider than the width of object cross-section 22 to be coated and is preferably oriented so as to be able to completely sweep over all portions of object cross-section 22 in a single pass. More particularly in the preferred embodiment the width of applicator 410 is slightly less than the width of vat 14 holding building material 16. As shown, applicator 410 is generally swept in the X-direction over top surface 22 to dispense a building material layer 24.

Applicator 410 may be coupled to the SLA by a frame (not shown) and drive mechanism (not shown) which is preferably computer controlled. As shown, applicator 410 may comprise manifold 412 having a bottom surface 414 which includes an array of apertures 416, examples of alternative aperture arrays being shown in more detail in FIGS. 10b and 10c. Alternatively, applicator 410 may include dispensing apertures 416 located on the trailing edge 418 of manifold 412 as opposed to or in addition to apertures on its bottom 414. Similarly, manifold 412 may include dispensing apertures 416 located on its front edge 420 or both its front edge 420 and its rear edge 418.

Each aperture 416 dispenses building material 16 to surface 22 as well as to other portions of working surface 26. One or more feeder lines 422 extend from vat 14 or other source (not shown) and supply material 16 to manifold 412 for distribution to each aperture 416. Between each aperture 416 is a desired spacing. Examples of such spacings are depicted in FIG. 10b as lengths 430a, 430b and 430c (collectively spacing 430). The preferred range for spacing 430 is discussed below.

FIG. 10d shows applicator 410 with its lower rear quadrant removed to more clearly depict the dispensing of material 16 from bottom surface 414 to surface 22. As shown, applicator 410 forms layer 24 by dispensing streams 440 of material 16 from each aperture 416. As discussed below, spacing 430 between apertures 416 is preferably large enough so that streams 440 do not touch each other between the bottom surface 414 of manifold 412 and surface 22. In the event a meniscus of material bridges the gap between the bottom 414 of applicator 410 and the surface 22, the independent streams 440 will form a single sheet of material. Though in this current embodiment this result is not preferred, such a material sheet may form desired coatings as described in previously incorporated U.S. patent application Ser. No. 08/299,879, pending.

In any event, spacing 430 is preferably still close enough so that when streams 440 contact surface 22, at which point they become lines 442 of dispensed material, lines 442 quickly merge together and flatten to form building material layer 24 as shown. In the most preferred embodiment, lines 442 immediately contact each other upon being formed due to the natural spreading and flattening of streams 440 as they contact surface 22. This initial merging results in the ability of surface tension to immediately aid in the flattening of the dispensed material into a layer of uniform thickness as opposed to surface tension inhibiting the merging of independent lines 442 which could significantly increase the time necessary to form layer 24 of uniform thickness.

Figure 10E:
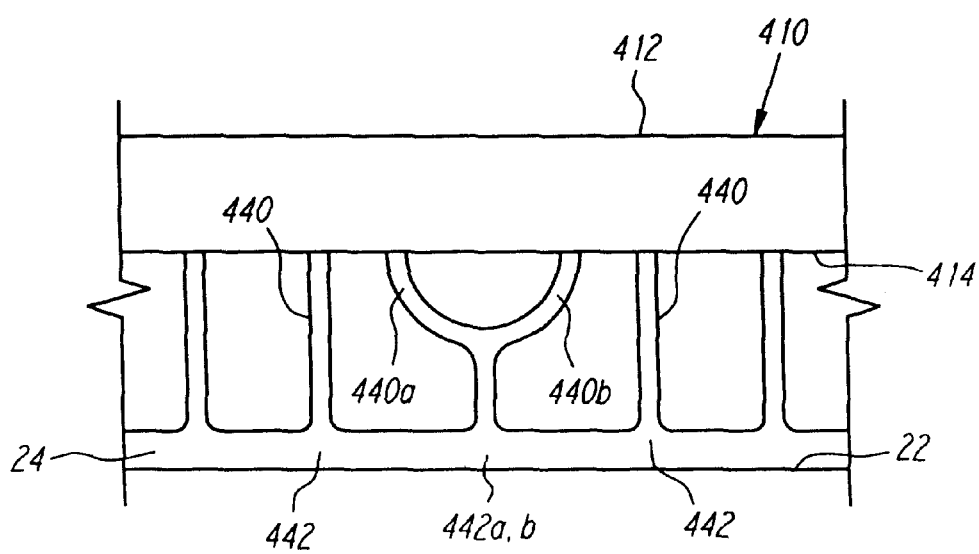
FIG. 10e shows streams of material from an applicator merging before reaching the intended surface.
Figure 10F:
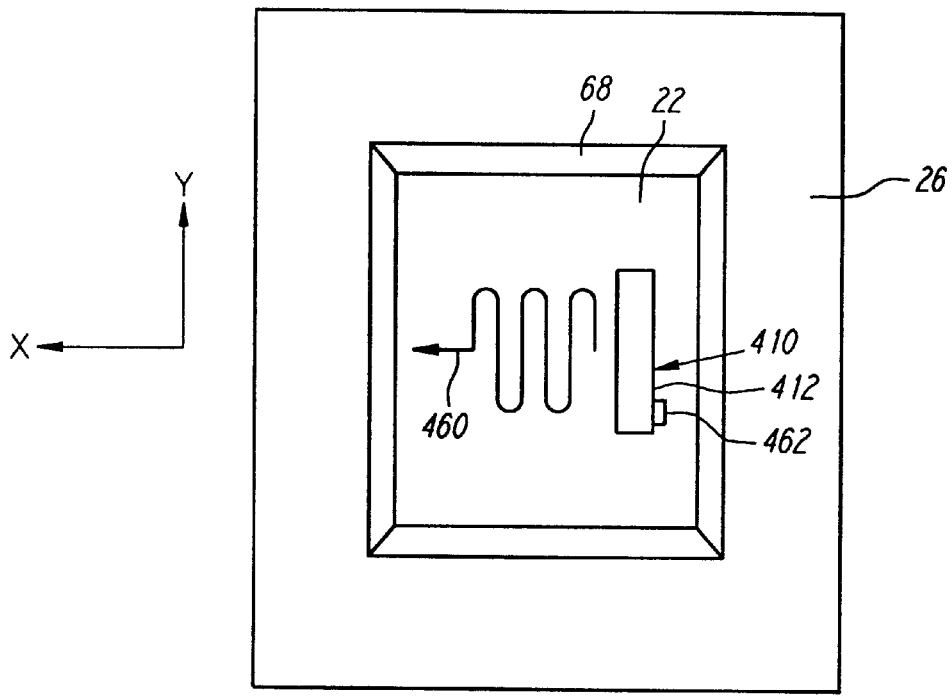
FIG. 10f shows the eccentric motion of an applicator including a spray nozzle array.
Figure 10G:
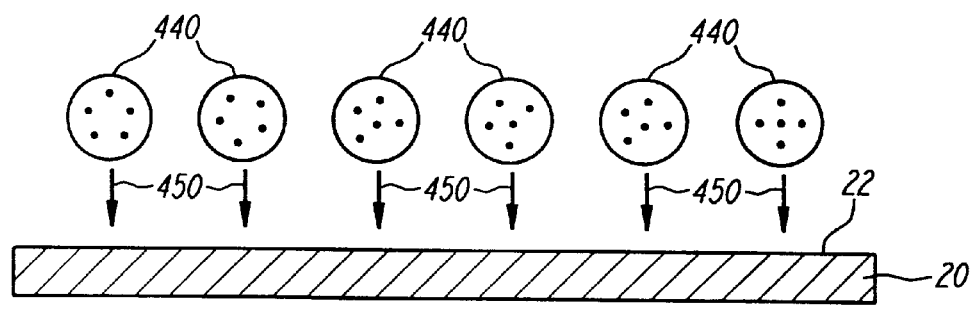
FIG. 10g shows streams of material before reaching the intended surface.
Figure 10H:
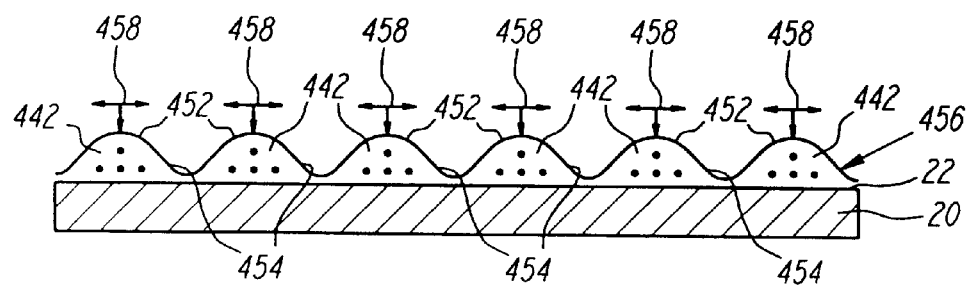
FIG. 10h shows lines of material after having reached the intended surface.

This preferred separation of streams 440 and immediate merging of lines 442 are depicted in FIGS. 10g and 10h. FIG. 10g depicts streams 440 just before contacting surface 22 of the last-formed object cross-section 20. Arrows 450 depict that streams 440 are falling toward surface 22. FIG. 10h depicts streams 440 after they have become lines 442 and have immediately merged due to the flattening of lines 442 resulting from contacting surface 22. Though the initial merging still leaves regions 452 of excess thickness and 454 of deficient thickness, both gravity and surface tension tend to flatten initial coating 456 into a uniform coating 24 as depicted by arrows 458 depicting the downward and horizontal flow of material 16.

The time for material to flow from regions 452 of excess thickness depends on the spacing between the excess thickness regions 452 and deficient thickness regions 454, the viscosity of building material 16 and the layer thickness. To minimize this smoothing time, the spacing between regions 452, 454 is preferably minimized and thus the spacing between successive streams 440 is preferably minimized while maintaining the independence of streams 440. Similarly, the viscosity of building material 16 should be as low as possible.

For desired merging of lines 442 to occur, one or both of two conditions are preferably met: 1) layer thickness must be relatively large so that surface tension effects have little or no effect on the ability of building material 16 to wet surface 22 of the solidified building material forming object cross-section 20 and 2) the surface energy of building material 16 should be equal to or less than that of the solidified material. If the second criteria is not met, thin coatings of material will tend to bead on surface 22 of object cross-section 20 as opposed to smoothly forming a layer 24. This results in a lower limit on the range of layer thicknesses that may be formed.

In the event that the merging of lines 442 or the subsequent smoothing does not occur quickly enough on its own, a smoothing device (not shown) may be positioned to follow behind applicator 410 in order to aid the spreading of material in lines 442. This smoothing device may comprise a rigid or flexible doctor blade, combs including teeth located to correspond to regions 452 of excess thickness, brushes or other sweeping device that generally aids the distribution of material from regions 452 to deficient regions 454. Alternatively, the smoothing device may comprise elements which induce vibrational energy to enhance the flow of material 16.

To form a completely uniform layer 24, each aperture 416 preferably dispenses material 16 at substantially the same flow rate. Alternatively, applicator 410 may comprise two or more manifolds 412 that are swept one behind the other and where the second manifold 412 deposits streams 440 and lines 442 of material 16 which interleave with the streams 440 and lines 442 deposited by the first manifold. One or more applicators 410 may also be similarly used. This dual applicator approach allows wider separation of streams 440 in each applicator 410 thereby increasing the likelihood that streams 440 will not inadvertently merge prior to contacting upper surface 22.

Reference to the problems associated with previously proposed "curtain" applicators serves to explain the advantages of applicator 410 of the current embodiment. Previous curtain applicators typically include a slit extending along the length of the applicator through which a curtain of material is delivered. However, these curtain coaters must typically dispense the material above a minimum flow rate to maintain the curtain in stable condition. This minimum flow rate is dictated by the Rayleigh limit of the specific curtain coater as combined with the properties of the material being dispensed, especially material viscosity.

The minimum flow rate for a given curtain coater in turn dictates the speed at which the coater must sweep over the object being formed in order to form a layer of desired thickness. That is, the curtain coater must sweep at a high enough velocity to avoid dispensing too large a volume of material which would in turn create a layer of excess thickness.

Several problems with previous curtain coaters arise due to the required high sweeping velocities typically associated therewith. First, the corresponding air flows surrounding the curtain typically disturb its uniformity thereby leading to the formation of nonuniform layers. Second, high sweep velocities also lead to the situation where pockets of air become trapped between the curtain and the previous object cross-section. And as the curtain is laid down on the previous object cross-section, these air pockets also cause nonuniformity of and bubbles in the layer so formed. Third, that the coater travels at high velocity means that it experiences large accelerations and decelerations at the ends of each sweep which also lead to nonuniform layers if the flow rate is not adjusted.

Accordingly, previous curtain coaters are typically unable to form thin layers that are acceptable for use in stereolithography. It should be also pointed out that the foregoing problems are not solved by maintaining the curtain coater stationary and moving the vat containing the object and surrounding building material to and fro. This is because such to and fro motion of the vat would lead to disturbances in the material surrounding the object being built which in turn would likely damage the object. Also, the vat would in any event experience accelerations and decelerations at the end of each sweep which would again lead to nonuniform layers being formed.

The current applicator 410 overcomes these problems by using a plurality of small apertures 416, instead of a long slit, which serves to decrease the overall area through which material may be dispensed and which thus reduces the overall volume of material dispensed by the applicator per unit time. However, the large flow rates necessary to stably dispense viscous materials may still be maintained through each aperture 416 which, because of the lower net volumetric flow rate, will not dispense too much material, thereby allowing layer 24 to be formed thin enough for stereolithographic purposes.

The most preferred material for use in this technique is LMB 5463 (for use with approximately 325 nm radiation of synergistic stimulation—as output by a HeCd laser or the like) manufactured by Ciba Geigy. This material has a relatively low viscosity of about 500 centipoise and shows good ability to wet previously solidified object cross-sections while forming thin layers, e.g., layer thicknesses of 2 to 4 mils. Other Ciba Geigy materials including SL 5170 (for use with 325 nm radiation) and SL 5180 (for use with approximately 351 nm radiation as output by an argon ion laser or the like) which have relatively low viscosities, e.g., about 200 centipoise, are considered reasonable candidates for this recoating technique but are not as preferred as LMB 5463 due to their decreased ability in wetting previously solidified cross-sections when layers to be formed are thinner than about 4 to 6 mils. Other Ciba Geigy resins such as SL 5149, 5154, 5081 and 5131 have higher viscosities, e.g., about 2,000 to 2,500 centipoise, but exhibit favorable wetting characteristics and are also considered reasonable candidates for this technique.

In any event, it is preferred that the building material used in this embodiment exhibit a viscosity of less than 10,000 centipoise, more preferably less than about 2,500 centipoise, and most preferably less than about 500 centipoise so that lines 442 thereof may quickly merge and flatten. As noted above, the material 16 used preferably has a surface energy in the liquid state less than or equal to that in the solid state. This facilitates the flowability of the deposited material 16 on surface 22 thereby facilitating quick merging of lines 442.

As noted above, streams 440 preferably do not merge before contacting surface 22 since this merging process may result in a curtain or partial curtain having unpredictable flow characteristics. This in turn would likely cause material dispensed in some adjacent streams 440 to form lines 442 closer together than desired while making other adjacent lines 442 further from the joined mass. Such increased separation of adjacent lines 442 increases the time period for the isolated line 442 to merge and a uniform layer 24 to be formed. An example of this is shown in FIG. 10e wherein streams 440a and 440b have prematurely merged and have been pulled closer together before reaching surface 22. This results in regions 459 between adjacent streams 440 and lines 442 being wider than desired. Associated with the increased width of regions 459 is an increase in time for lines 442 resulting from normal streams 440 to merge with lines 442a,b resulting from prematurely-merged streams 440a,b.

The locations, diameters and/or shapes of apertures 416 may be varied to avoid this premature merger of streams 440. Where applicator 410 moves primarily in the X-direction, apertures 416 may be configured as shown in FIG. 10b where the spacing 430 in the Y-direction is large enough to avoid streams 440 from touching, but still small enough so that lines 442 will merge, i.e., spacing 430a and 430c or alternatively spacing 430a and a combination of spacings 430b and 430c. Alternatively, fewer apertures 416 may be used as in FIG. 10c. With the applicator of FIG. 10c, the spacing 430d may be too large thereby preventing lines 442 from merging. In this case, a second interleaving applicator 410 may be used or alternatively the single applicator 410 may be made to perform a second pass wherein it is shifted slightly in the Y-direction for the later pass so that interleaving results. Alternatively Y-direction shifting may occur simultaneously with X-direction shifting to effectively bring streams 440 and thus lines 442 closer together. As an additional alternative, applicator 410 may be oriented at an angle other than perpendicular to the direction in which it sweeps. The more applicator 410 is so angled, the smaller the effective spacing 430 between apertures 416 becomes.

Because streams 440 may fan out or merge as they travel toward surface 22 due to various instabilities such as air flow or a meniscus climbing up streams 440 from working surface 26, applicator 410 is preferably positioned close enough to surface 22 to limit the possibility and extent of such fanning out or other instability to avoid, or at least reduce, merger of streams 440. The preferred height of manifold bottom 414 above surface 22 depends on the configuration of applicator 410 as well as the material 16 used. However, to minimize premature merger problems, the preferred spacing is less than about 200 mils and more preferably less than about 100 mils. However, as noted above it is preferred that a meniscus not connect the bottom 414 of the applicator to working surface 26 which results in a preferred minimum separation of between 20 to 60 mils, depending on the material being used.

To reduce the amount of fanning out, apertures 416 may comprise high-pressure nozzles which force material 16 out of applicator 410 at a high rate downward. Suitable nozzles would be those used in airless paint spraying which are designed to spray material through a predetermined angle. As a further alternative, apertures 416 may comprise nozzles having a rectangular cross-section with the longer of the two axes parallel to the direction of translation of applicator 410.

It is intended that the flow of material 16 from applicator 410 be controlled so that building material layer 24 achieves the desired thickness. To this end, the following relationship may be used for an applicator 410 travelling in the X-direction with a width W: The cumulative flow rate (cm$^3$/sec) of material through all apertures 416 divided by both the transport rate in the X-direction (cm/sec) and the width W of the applicator (cm) equals the desired building material layer thickness (cm). This equation assumes that: 1) the width of the applicator is wider than the width of surface 22, 2) material is extracted from vat 14 and redeposited back into the vat by applicator 410 and 3) the applicator is traveling at a fixed velocity over surface 22. If net material is being added with the formation of each layer 24 then one must: 1) dispense sufficient additional material away from surface 22 to account for any regions of working surface 26 not swept over by applicator 410, and 2) to account for any excess material dispensed during acceleration and deceleration of applicator 410.

To ease material dispensing control burdens, it is preferred that accelerations and decelerations occur beyond the region occupied by surface 22 for each object cross-section. To form a uniform coating of material 16, it is also preferred that each aperture 416 dispense approximately the same amount of material. As an example, it is contemplated that an applicator 410 having forty (40) nozzles each delivering 0.16 cc/sec, could deliver 6.25 cc of building material in one (1) second, and could thus form a building material layer 250 mm on a side and having a thickness of 0.1 mm in one (1) second.

An alternative embodiment involving applicator 410 is shown in FIG. 10*f* which shows a top view of applicator 410 and depicts its motion while recoating the top surface 22 of the last formed object cross-section 20. As shown, applicator 410 moves in a sinusoidal or other eccentric pattern 460 as it translates across surface 22. Apertures 416 preferably comprise spray nozzles as described above, and the eccentric motion 460 of applicator 410 results in the spray also being eccentric. To aid applicator's 410 eccentric motion 460, counterbalance 462 may be added to manifold 412. Alternatively a second applicator 410 may be added which moves with the opposite Y-direction motion as that of the first applicator 410.

Errors which may accumulate from layer to layer for reasons such as nonuniform dispensing of material by applicator 410, shrinkage of material upon curing or improper amount of material dispensed may be detected and corrected, or held to an acceptable level, by performing a correction technique periodically. These corrections may take the form of deep dipping periodically or dispensing what is known to be an excess coating periodically and removing the excess by utilizing a doctor blade or the like, e.g., moving applicator 410 down to a desired position and using its bottom 414 like a doctor blade or alternatively super elevate the partially formed object 12 so that it is appropriately positioned relative to applicator 410 and again use applicator 410 as a doctor blade. Where applicator 410 and more particularly manifold 412 is used as a doctor blade, it is preferred that manifold 412 move slowly to avoid leading edge bulge and trapped volume problems. Alternatively, a separate doctor blade may be used in connection with applicator 410.

Further embodiments may also be derived by combining the teachings herein regarding independent stream embodiments with each other, or with the teachings regarding the other recoating techniques described above.

It is always preferred, as with the other embodiments discussed above, to use an independent liquid level detection device and adjustment device to maintain working surface 26 at a desired position relative to the source 28 of synergistic stimulation. Applicator 410 may also be used to correct errors by dispensing excess material or dispensing deficient material wherein the dispensing of excessive or deficient material may occur away from object 12 or over the object 12 as well as other areas depending on exactly what is being corrected.

Though a number of specific techniques and embodiments have been discussed above, many additional embodiments and combinations will be apparent to those of skill in the art after studying the present disclosure. It is thus intended that the present invention not be limited by the disclosure above but only by the claims attached hereto.

What is claimed is:

1. An apparatus for forming at least a portion of a three-dimensional object on a substantially cross-sectional basis from a liquid material capable of physical transformation upon exposure to synergistic stimulation, comprising:

means for supplying data descriptive of the object;

means for forming layers of material adjacent to any previously formed object cross-sections including a counter-rotating roller which sweeps at or near at least a portion of a desired upper surface of at least some of the layers to render the layers of desired thickness; and a source of synergistic stimulation for exposing the layers according to the descriptive data.

2. The apparatus of claim 1, further comprising:

means to deep-dip and raise the previously formed object cross-section before the counter-rotating roller sweeps across the surface of the layer.

3. The apparatus of claim 1, further comprising:

a dam positioned in proximity to the counter-rotating roller for limiting the amount of material that passes from a front portion of the roller to a rear portion of the roller.

4. The apparatus of claim 3, wherein the dam is positioned between ½ to 4 mils from the counter-rotating roller.

5. The apparatus of claim 1, further comprising:

a material dispenser for depositing a quantity of material in front of the counter-rotating roller.

6. The apparatus of claim 1, further comprising:

a material transporter located adjacent to the counter-rotating roller for removing material accumulated in front of the counter-rotating roller.

7. A method for forming at least a portion of a three-dimensional object on a substantially cross-sectional basis from a liquid material capable of physical transformation upon exposure to synergistic stimulation, comprising:

supplying data descriptive of the object;

forming a layer of material adjacent to a previously formed object cross-session including sweeping a counter-rotating roller at or near at least a portion of a desired upper surface of the layer;

exposing selected portions of the layer to synergistic stimulation according to the descriptive data to form a successive object cross-section adjacent to the previously formed object cross-section; and repeating said forming and exposing a plurality of times to form the at least portion of the object.

8. The method of claim 7, further comprising deep-dipping and raising the previously formed object cross-section before sweeping the counter-rotating roller over the surface of the layer.

9. The method of claim 7, further comprising limiting the amount of material that passes from a front portion of the roller to a rear portion of the roller.

10. The method of claim 9, further comprising providing a dam positioned between ½ to 4 mils from the counter-rotating roller.

11. The method of claim 7, further comprising dispensing a quantity of material in front of the counter-rotating roller.

12. The method of claim 7, further comprising transporting away material accumulated in front of the counter-rotating roller.

13. An apparatus for forming at least a portion of a three-dimensional object on a substantially cross-sectional basis from a material capable of physical transformation upon exposure to synergistic stimulation, comprising:

means for supplying data descriptive of the object;

means for forming layers of material over areas and adjacent to any previously formed object cross-sections, said areas being larger than regions of said layers to be transformed, comprising an ink-jet dispenser for depositing material over at least a portion of at least some of any previously formed object cross-sections;

a source of synergistic stimulation; and means for exposing the layers to said synergistic stimulation according to the data descriptive of the object to form and adhere successive object cross-sections.

14. A method for forming at least a portion of a three-dimensional object on a substantially cross-sectional basis from a material capable of physical transformation upon exposure to synergistic stimulation, comprising:

supplying data descriptive of the object;

exposing a first region of a first layer of material to synergistic stimulation according to the descriptive data to form a first object cross-section;

forming a second layer of material over an area larger than a second region to be transformed and adjacent to said first object cross-section including dispensing material from an ink-jet dispenser over selected locations of said area;

exposing the second region of the second layer to synergistic stimulation according to the data descriptive of the object to form a second object cross-section adjacent to and adhered to the first formed object cross-section; and repeating said forming a second layer and said exposing the second region to form subsequent layers and cross-sections over previously formed layers and cross-sections to form the at least portion of the object from a plurality of adhered layers.

15. An apparatus for forming at least a portion of a three-dimensional object on a substantially cross-sectional basis from a material capable of physical transformation upon exposure to synergistic stimulation, comprising:

means for supplying data descriptive of the object;

an applicator for dispensing material over at least a portion of any previously formed object cross-sections to form layers of material, the applicator including a housing, a spinning member mounted within the housing, and a source of material for delivering material to the spinning member wherein the spinning member ejects the delivered material toward a surface of the previously formed object cross-sections; and a source of synergistic stimulation for exposing the layers according to the data descriptive of the object to form successive object cross-sections.

16. A method for forming at least a portion of a three-dimensional object on a substantially cross-sectional basis from a material capable of physical transformation upon exposure to synergistic stimulation, comprising:

supplying data descriptive of the object;

forming a layer over at least a portion of a previously formed object cross-section including dispensing material from an applicator comprising a housing, a spinning member mounted within the housing, and a source of material for delivering material to the spinning member wherein the spinning member ejects the delivered material toward a surface of the previously formed object cross-section;

exposing selected portions of the layer to synergistic stimulation according to the descriptive data to form a successive object cross-section; and repeating said forming and exposing to form subsequent layers and cross-sections to form the at least portion of the object.

17. An apparatus for forming at least a portion of a three-dimensional object on a substantially cross-sectional basis from a material capable of physical transformation upon exposure to synergistic stimulation, comprising:

means for supplying data descriptive of the object;

a container for containing a volume of material having a working surface;

an applicator for forming layers of material over at least portions of previously formed object cross-sections, the applicator having a bottom opening located in proximity to the working surface;

a device coupled to the applicator for drawing up material from the working surface through the bottom opening and into the applicator;

means for sweeping the applicator across at least a portion of at least some of the previously formed object cross-sections; and a source of synergistic stimulation for exposing the layers according to the descriptive data to form the at least portion of the object from a plurality of object cross-sections.

18. A method for forming at least a portion of a three-dimensional object on a substantially cross-sectional basis from a material capable of physical transformation upon exposure to synergistic stimulation, comprising:

supplying data descriptive of the object;

containing a volume of material having a working surface;

locating an applicator having a bottom opening in proximity to the working surface;

forming a meniscus of material between the applicator and working surface;

drawing up material from the working surface into the applicator through the bottom opening thereby at least partially filling the applicator;

forming a layer over at least a portion of a previously formed object cross-section including dispensing material from the applicator by sweeping the applicator across at least a portion of the previously formed object cross-section;

exposing selected portions of the layer to synergistic stimulation according to the descriptive data to form an object cross-section adhered to the previously formed object cross-section; and repeating said forming and exposing to form subsequent layers and cross-sections to form the at least portion of the object.

19. An apparatus for forming at least a portion of a three-dimensional object on a substantially cross-sectional basis from a material capable of physical transformation upon exposure to synergistic stimulation, comprising:

means for supplying data descriptive of the object;

an applicator for forming layers of material over at least portions of any previously formed object cross-sections, the applicator including a plurality of apertures for dispensing streams of material, the apertures having an effective spacing therebetween which is large enough so that the streams remain substantially independent before contacting the previously formed object cross-sections and which is small enough so that the streams merge substantially immediately after contacting the previously formed object cross-sections;

means for sweeping the applicator across at least a portion of the previously formed object cross-sections; and a source of synergistic stimulation for exposing the layers according to the descriptive data.

20. A method for forming at least a portion of a three-dimensional object on a substantially cross-sectional basis from a material capable of physical transformation upon exposure to synergistic stimulation, comprising:

supplying data descriptive of the object;

forming a layer over at least a portion of a previously formed object cross-section by dispensing material from an applicator having a plurality of apertures for dispensing streams of material, the apertures having an effective spacing therebetween which is large enough so that the streams remain substantially independent before contacting the previously formed object cross-section and which is small enough so that the streams merge substantially immediately after contacting the previously formed object cross-section;

sweeping the applicator across at least a portion of the previously formed object cross-section;

exposing selected portions of the layer to synergistic stimulation according to the descriptive data to form a successive object cross-section; and repeating said layer-forming and layer-exposing to form the at least portion of the object.

21. A method for forming at least a portion of a three-dimensional object on a substantially cross-sectional basis from a material capable of physical transformation upon exposure to synergistic stimulation, comprising:

supplying data descriptive of the object;

containing a volume of material having a working surface;

determining a minimum region of the working surface including performing a Boolean union operation on data descriptive of the last formed cross-sectional region of the object and data descriptive of at least one other cross-sectional region of the object preceding the last formed cross-sectional region of the object;

forming a layer over at least the minimum region of the working surface including moving a coating device over at least the minimum region of the working surface;

exposing the layer to a source of synergistic stimulation according to the descriptive data to form a successive object cross-section; and repeating said forming and exposing a plurality of times to form the at least portion of the object;

wherein the coating device is not moved over the entire working surface during the process of forming at least some layers;

wherein an extent of movement of the recoating device is different for at least some of the layers formed;

wherein the recoating device has a direction of movement over the last formed cross-section; and wherein, for at least some layers, the layer is formed over a last formed cross-section which has an extent which is less than an extent of the at least one cross-section formed prior to the last formed cross-section in the direction of movement.

22. The method of claim 21 additionally comprising locating the coating device beyond a region to be exposed when forming a next cross-sectional region following the last formed cross-sectional region.

23. An apparatus for forming at least a portion of a three-dimensional object on a substantially cross-sectional basis from a material capable of physical transformation upon exposure to synergistic stimulation, comprising:

means for supplying data descriptive of the object;

a container for containing a volume of material having a working surface;

means for determining a minimum region of the working surface including means for performing a Boolean union operation on data descriptive of the last formed cross-sectional region of the object and at least one other cross-sectional region preceding the last formed cross-section of the object;

a coating device for forming layers over at least the minimum region of the working surface; and a source of synergistic stimulation for exposing the layers according to the descriptive data;

wherein the coating device does not move over the entire working surface during the formation of at least some layers;

wherein a region coated by the coating device is different for at least some of the layers formed;

wherein the coating device is moved with a direction of movement over the last formed cross-section; and wherein, for at least some layers, the layer is formed over a last formed cross-section which has an extent which is less than an extent of the at least one cross-section formed prior to the last formed cross-section in the direction of movement.

24. The apparatus of claim 23 Boolean operation performs the operation between (1) a last-formed cross-sectional region, (2) a cross-sectional region to be exposed next, and (3) at least one cross-sectional region formed below additionally comprising means for locating the coating device beyond a region to be exposed when forming a next cross-sectional region following the last formed cross-sectional region.

25. The apparatus of claim 17 wherein the device coupled to the applicator comprises a vacuum pump.

26. The apparatus of claim 17 wherein the device coupled to the applicator comprises a fluid pump.

27. The method of claim 18 wherein said drawing up material comprises evacuating an internal portion of the applicator.

28. The method of claim 18 where said drawing up material comprises operating a pump which pulls material into the dispenser.

29. The apparatus of claim 3 wherein the material is a photopolymer and the source of synergistic stimulation is a source of electromagnetic radiation.

30. The method of claim 9 wherein the material is a photopolymer.

31. The apparatus of claim 13 wherein the material is a photopolymer and the source of synergistic stimulation is a source of electromagnetic radiation.

32. The method of claim 14 wherein the material is a photopolymer.

33. The apparatus of claim 15 wherein the material is a photopolymer and the source of synergistic stimulation is a source of electromagnetic radiation.

34. The method of claim 16 wherein the material is a photopolymer.

35. The apparatus of claim 19 wherein the material is a photopolymer and the source of synergistic stimulation is a source of electromagnetic radiation.

36. The method of claim 20 wherein the material is a photopolymer.

37. The method of claim 21 wherein the material is a photopolymer.

38. The apparatus of claim 23 wherein the material is a photopolymer and the source of synergistic stimulation is a source of electromagnetic radiation.

39. A method of forming at least a portion of a three-dimensional object on a substantially cross-sectional basis from a material capable of physical transformation upon exposure to synergistic stimulation, comprising:
   supplying data descriptive of the object;
   containing a volume of material having a working surface;
   deriving a tailored coating region of the working surface for a layer including deriving combined extents of: (1) a region exposed when forming a last formed object cross-section, and (2) a region exposed when forming at least one object cross-section formed prior to forming the last formed object cross-section;
   forming a layer of material in preparation for forming a successive object cross-section, including moving a recoating device to aid in the formation of a coating over the tailored coating region;
   exposing the layer to synergistic stimulation according to the data descriptive of the object to form the successive object cross-section; and
   repeating said layer forming and exposing a plurality of times to form the at least portion of the three-dimensional object;
   wherein the recoating device is moved over less than the entire working surface during the process of forming at least some layers;
   wherein an extent of movement of the recoating device is different for at least some of the layers formed; and
   wherein the at least portion of the object includes a first object cross-section formed prior to a second object cross-section, which first object cross-section extends beyond an extent of the second object cross-section in a direction of movement of the recoating device when forming a layer above and adjacent to the first object cross-section.

40. The method of claim 39 additionally comprising ultimately locating the recoating device beyond a region of the working surface to be exposed when forming a next object cross-section immediately following the formation of the last object cross-section.

41. The method of claim 39 wherein the at least one cross-section formed prior to the last formed cross-section is at least two cross-sections formed immediately preceeding the last formed cross-section.

42. The method of claim 41 wherein each of the at least two cross-sections formed immediately preceeding the last formed cross-section has a thickness and wherein a summed thickness of the at least two cross-sections is at least as great as a thickness of a predefined shallow troublesome depth.

43. The method of claim 42 additionally comprising ultimately locating the recoating device beyond a region of the working surface to be exposed in forming a next object cross-section immediately following the formation of the last object cross-section.

44. The method of claim 39 wherein the extent for moving and ultimately locating the recoating device is based on inclusion of a preset minimum distance beyond the combined extents of: (1) the last formed cross-section, and (2) the cross-section formed prior to the last formed cross-section.

45. The method of claim 44 wherein the extent for moving and ultimately locating the recoating device is additionally based on inclusion of a preset minimum distance beyond the combined extents of: (1) the last formed cross-section, (2) the cross-section formed prior to the last formed cross-section, and (3) a cross-section to be formed next.

46. The method of claim 43 wherein the material is a photopolymer.

47. A method of forming at least a portion of a three-dimensional object on a substantially cross-sectional basis from a material capable of physical transformation upon exposure to synergistic stimulation, comprising:
   forming a layer of building material in preparation for forming a successive object cross-section, including moving a recoating device over (1) a region exposed when forming a last-formed object cross-section, and (2) a region exposed when forming at least one cross-section formed prior to the last formed cross-section; and
   exposing the layer to synergistic stimulation to form the successive object cross-section; and
   repeating said forming and exposing a plurality of times to form the at least portion of the three-dimensional object;
   wherein the recoating device is moved over less than the entire working surface during the process of forming at least some layers;
   wherein an extent of movement of the recoating device is different for at least some of the layers formed; and
   wherein the at least portion of the object includes a first object cross-section formed prior to a second object cross-section, which first object cross-section extends beyond an extent of the second object cross-section in a direction of movement of the recoating device when forming a layer above and adjacent to the first object cross-section.

48. The method of claim 47 additionally comprising ultimately locating the recoating device beyond a region of the working surface to be exposed in forming a next object cross-section immediately following the formation of the last object cross-section.

49. The method of claim 47 wherein the at least one cross-section formed prior to the last formed cross-section is at least two cross-sections formed immediately preceding the last formed cross-section.

50. The method of claim 49 wherein each of the at least two cross-sections formed immediately preceding the last formed cross-section has a thickness and wherein a summed thickness of the at least two cross-sections is at least as great as a thickness of a predefined shallow troublesome depth.

51. The method of claim 50 additionally comprising ultimately locating the recoating device beyond a region of the working surface to be exposed in forming a next object cross-section immediately following the formation of the last object cross-section.

52. The method of claim 51 wherein the extent for moving and ultimately locating the recoating device comprises inclusion of a preset minimum distance beyond the combined extents of: (1) the last formed cross-section, and (2) the cross-section formed prior to the last formed cross-section.

53. The method of claim 51 wherein the extent for moving and ultimately locating the recoating device additionally comprises inclusion of a preset minimum distance beyond the combined extents of: (1) the last formed cross-section, (2) the cross-section formed prior to the last formed cross-section, and (3) the cross-section to be formed next.

54. The method of claim 51 wherein the material is a photopolymer.

55. A method of forming at least a portion of a three-dimensional object on a substantially cross-sectional basis from a material capable of physical transformation upon exposure to synergistic stimulation, comprising:
    forming a layer of building material in preparation for forming a subsequent object cross-section, including: (1) moving a recoating device over a region exposed when forming a last-formed object cross-section, (2) locating the recoating device beyond a region to be exposed in forming a next cross-section of the object, and (3) locating the recoating device beyond the combined extents of (1) and (2) by a predetermined amount;
    exposing the layer to synergistic stimulation to form the successive object cross-section; and
    repeating said forming and exposing a plurality of times to form the at least portion of the three-dimensional object;
        wherein the recoating device is moved over less than the entire working surface during the process of forming at least some layers;
        wherein an extent of movement of the recoating device is different for at least some of the layers formed; and
        wherein the at least portion of the object includes a first object cross-section formed prior to a second object cross-section, which first object cross-section extends beyond an extent of the second object cross-section in a direction of movement of the recoating device when forming a layer above and adjacent to the first object cross-section.

56. The method of claim 55 wherein said moving the recoating device comprises moving the recoating device over (1) the region exposed when forming a last-formed object cross-section, and (2) a region exposed when forming at least one cross-section formed prior to the last formed cross-section.

57. The method of claim 56 wherein the at least one cross-section formed prior to the last formed cross-section is at least two cross-sections formed immediately preceeding the last formed cross-section.

58. The method of claim 57 wherein each of the at least two cross-sections formed immediately preceeding the last formed cross-section has a thickness and wherein a summed thickness of the at least two is at least as great as a thickness of a predefined shallow troublesome depth.

59. The method of claim 56 wherein the material is a photopolymer.

60. An apparatus for forming at least a portion of a three-dimensional object on a substantially cross-sectional basis from a material capable of physical transformation upon exposure to synergistic stimulation, comprising:
    a memory device for receiving data descriptive of the object;
    a container for holding a volume of material having a working surface;
    a computer configured to derive a tailored coating region of the working surface for a layer including deriving combined extents of: (1) a region exposed when forming a last formed object cross-section, and (2) a region exposed when forming at least one object cross-section formed prior to forming the last formed object cross-section;
    a recoating device for forming a layer of material in preparation for forming a successive object cross-section,
    a recoating device control system for moving the recoating device to aid in the formation of a coating over the tailored coating region;
    an exposure system for exposing the layer to synergistic stimulation according to the data descriptive of the object to form the successive object cross-section; and
    a control system for repeatedly operating the recoating device and exposure system a plurality of times to form the at least portion of the three-dimensional object;
        wherein the recoating device is controlled to move over less than the entire working surface during the process of forming at least some layers;
        wherein an extent of movement of the recoating device is different for at least some of the layers formed; and
        wherein the at least portion of the object includes a first object cross-section formed prior to a second object cross-section, which first object cross-section extends beyond an extent of the second object cross-section in a direction of movement of the recoating device when forming a layer above and adjacent to the first object cross-section.

61. The apparatus of claim 60 wherein the recoating device control system ultimately locates the recoating device beyond a region of the working surface to be exposed when forming a next object cross-section immediately following the formation of the last object cross-section.

62. The apparatus of claim 60 wherein the computer is configured to derive a tailored coating region of the working surface wherein the at least one cross-section formed prior to the last formed cross-section is at least two cross-sections formed immediately preceding the last formed cross-section.

63. The apparatus of claim 62 wherein the computer is configured to derive a tailored coating region of the working surface wherein each of the at least two cross-sections formed immediately preceding the last formed cross-section has a thickness and wherein a summed thickness of the at least two cross-sections is at least as great as a thickness of a predefined shallow troublesome depth.

64. The apparatus of claim 63 wherein the recoating device control system ultimately locates the recoating device beyond a region of the working surface to be exposed in forming a next object cross-section immediately following the formation of the last object cross-section.

65. The apparatus of claim 60 wherein the recoating device control system ultimately locates the recoating device to a position which is a preset minimum distance beyond the combined extents of: (1) the last formed cross-section, and (2) the cross-section formed prior to the last formed cross-section.

66. The apparatus of claim 65 wherein the recoating device control system ultimately locates the recoating device to a position which is a preset minimum distance beyond the combined extents of: (1) the last formed cross-section, (2) the cross-section formed prior to the last formed cross-section, and (3) a cross-section to be formed next.

67. The apparatus of claim 64 wherein the material comprises a photopolymer and the exposure system includes a source of synergistic stimulation comprising a source of electromagnetic radiation.

68. An apparatus for forming at least a portion of a three-dimensional object on a substantially cross-sectional basis from a material capable of physical transformation upon exposure to synergistic stimulation, comprising:
    a recoating device for forming a layer of building material in preparation for forming a successive object cross-section;
    a recoating device control system for moving the recoating device over: (1) a region exposed when forming a last-formed object cross-section, and (2) a region exposed when forming at least one cross-section formed prior to the last formed cross-section; and
    an exposure system for exposing the layer to synergistic stimulation to form the successive object cross-section; and
    a control system for repeatedly operating the recoating device and the exposure system a plurality of times to form the at least portion of the three-dimensional object;
        wherein the recoating device is moved over less than the entire working surface during the process of forming at least some layers;
        wherein an extent of movement of the recoating device is different for at least some of the layers formed; and
        wherein the at least portion of the object includes a first object cross-section formed prior to a second object cross-section, which first object cross-section extends beyond an extent of the second object cross-section in a direction of movement of the recoating device when forming a layer above and adjacent to the first object cross-section.

69. The apparatus of claim 68 wherein the recoating device control system ultimately locates the recoating device beyond a region of the working surface to be exposed in forming a next object cross-section immediately following the formation of the last object cross-section.

70. The apparatus of claim 68 wherein the recoating device control system is configured to move the recoating device over: (1) a region exposed when forming a last-formed object cross-section, and (2) a region exposed when forming at least two cross-sections formed immediately preceding the last formed cross-section.

71. The apparatus of claim 70 wherein the recoating device control system is configured with a predefined shallow troublesome depth parameter and wherein each of the at least two cross-sections formed immediately preceding the last formed cross-section has a thickness and wherein a summed thickness of the at least two cross-sections is at least as great as a thickness of the predefined shallow troublesome depth.

72. The apparatus of claim 71 wherein the recoating device control system ultimately locates the recoating device beyond a region of the working surface to be exposed in forming a next object cross-section immediately following the formation of the last object cross-section.

73. The apparatus of claim 72 wherein the recoating device control system ultimately locates the recoating device to a position which is a preset minimum distance beyond the combined extents of: (1) the last formed cross-section, and (2) the cross-section formed prior to the last formed cross-section.

74. The apparatus of claim 72 wherein the recoating device control system ultimately locates the recoating device to a position which is a preset minimum distance beyond the combined extents of: (1) the last formed cross-section, (2) the cross-section formed prior to the last formed cross-section, and (3) a cross-section to be formed next.

75. The apparatus of claim 72 wherein the material comprises a photopolymer and the exposure system includes a source of synergistic stimulation that produces electromagnetic radiation.

76. An apparatus for forming at least a portion of a three-dimensional object on a substantially cross-sectional basis from a material capable of physical transformation upon exposure to synergistic stimulation, comprising:
    a recoating device for forming a layer of building material in preparation for forming a subsequent object cross-section;
    a recoating device control system for: (1) moving a recoating device over a region exposed when forming a last-formed object cross-section, (2) locating the recoating device beyond a region to be exposed in forming a next cross-section of the object, and (3) locating the recoating device beyond the combined extents of (1) and (2) by a predetermined amount;
    an exposure system for exposing the layer to synergistic stimulation to form the successive object cross-section; and
    a control system for repeatedly operating the recoating device and exposure system a plurality of times to form the at least portion of the three-dimensional object;
        wherein the recoating device is moved over less than the entire working surface during the process of forming at least some layers;
        wherein an extent of movement of the recoating device is different for at least some of the layers formed; and
        wherein the at least portion of the object includes a first object cross-section formed prior to a second object cross-section, which first object cross-section extends beyond an extent of the second object cross-section in a direction of movement of the recoating device when forming a layer above and adjacent to the first object cross-section.

77. The apparatus of claim 76 wherein the recoating device control system moves the recoating device over (1) the region exposed when forming a last-formed object cross-section, and (2) a region exposed when forming at least one cross-section formed prior to the last formed cross-section.

78. The apparatus of claim 77 wherein the recoating device control system is configured to move the recoating device over: (1) a region exposed when forming a last-formed object cross-section, and (2) a region exposed when forming at least two cross-sections formed immediately preceding the last formed cross-section.

79. The apparatus of claim 78 wherein the recoating device control system is configured with a predefined shallow troublesome depth parameter and wherein each of the at least two cross-sections formed immediately preceding the last formed cross-section has a thickness and wherein a summed thickness of the at least two cross-sections is at least as great as a thickness of the predefined shallow troublesome depth.

80. The apparatus of claim 78 wherein the material comprises a photopolymer and the exposure system includes a source of synergistic stimulation that produces electromagnetic radiation.

81. An apparatus for forming at least a portion of a three-dimensional object on a substantially cross-sectional basis from a material capable of physical transformation upon exposure to synergistic stimulation, comprising:

means for supplying data descriptive of the object;

a container for containing a volume of material having a working surface;

an applicator for forming layers of material over at least portions of previously formed object cross-sections, the applicator having a bottom opening located in proximity to the working surface;

a vacuum pump coupled to the applicator for drawing up material from the working surface through the bottom opening and into the applicator;

means for sweeping the applicator across at least a portion of at least some of the previously formed object cross-sections; and a source of synergistic stimulation for exposing the layers according to the descriptive data to form the at least portion of the object from a plurality of object cross-sections.

82. A method for forming at least a portion of a three-dimensional object on a substantially cross-sectional basis from a material capable of physical transformation upon exposure to synergistic stimulation, comprising supplying data descriptive of the object;

containing a volume of material having a working surface;

locating an applicator having a bottom opening in proximity to the working surface;

forming a meniscus of material between the applicator and working surface;

using a vacuum pump to draw up material from the working surface into the applicator through the bottom opening thereby at least partially filling the applicator;

forming a layer over at least a portion of a previously formed object cross-section including dispensing material from the applicator by sweeping the applicator across at least a portion of the previously formed object cross-section;

exposing selected portions of the layer to synergistic stimulation according to the descriptive data to form an object cross-section adhered to the previously formed object cross-section; and repeating said forming and exposing to form subsequent layers and cross-sections to form the at least portion of the object.

* * * * *

UNITED STATES PATENT AND TRADEMARK OFFICE
CERTIFICATE OF CORRECTION

PATENT NO. : 5,902,537
DATED : May 11, 1999
INVENTOR(S) : Almquist et al.

It is certified that error appears in the above-identified patent and that said Letters Patent are hereby corrected as shown below:

Column 56, Lines 64-66  "The apparatus of claim 23 Boolean operation performs the operation between (1) a last-formed cross-sectional region, (2) a cross-sectional region to be exposed next, and (3) at least one cross-sectional region formed below additionally comprising..." should read --The apparatus of claim 23 additionally comprising...".

Signed and Sealed this

Twenty-second Day of May, 2001

Attest:

NICHOLAS P. GODICI

*Attesting Officer*    Acting Director of the United States Patent and Trademark Office